(12) United States Patent
Lu et al.

(10) Patent No.: US 11,635,669 B1
(45) Date of Patent: Apr. 25, 2023

(54) OPTICAL DEVICE BASED ON TUNABLE POLARIZATION VOLUME HOLOGRAM

(71) Applicant: Meta Platforms Technologies, LLC, Menlo Park, CA (US)

(72) Inventors: Lu Lu, Kirkland, WA (US); Hao Yu, Kent, OH (US); Mengfei Wang, Seattle, WA (US); Junren Wang, Mercer Island, WA (US); Yun-Han Lee, Redmond, WA (US); Nicholas John Diorio, Kirkland, WA (US); Barry David Silverstein, Kirkland, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 85 days.

(21) Appl. No.: 17/005,247

(22) Filed: Aug. 27, 2020

(51) Int. Cl.
*G02F 1/29* (2006.01)
*G02F 1/1337* (2006.01)

(52) U.S. Cl.
CPC ........ *G02F 1/292* (2013.01); *G02F 1/133757* (2021.01); *G02F 1/133769* (2021.01)

(58) Field of Classification Search
CPC ....................................................... G02F 1/292
See application file for complete search history.

(56) References Cited

U.S. PATENT DOCUMENTS

| | | | |
|---|---|---|---|
| 2005/0002101 A1* | 1/2005 | Kim | G02F 1/292 359/573 |
| 2021/0208471 A1* | 7/2021 | Kroll | G02F 1/292 |
| 2022/0066075 A1* | 3/2022 | Saitoh | G02B 5/1857 |

OTHER PUBLICATIONS

Crawford G., et al., "Liquid-crystal diffraction grating using polarization holography alignment techniques," Journal of Applied Physics, 98, 123102 (2005), pp. 123102-1 to 123102-10 (10 pages).
Yousefzadeh C., et al., "Design of a large aperture, tunable Pancharatnam phase beam steering device," Optics Express, vol. 28, No. 2, Jan. 20, 2020, pp. 991-1001 (11 pages).
Yuan R., et al., "Continuously adjustable period optical grating based on flexoelectric effect of a bent-core nematic iquid crystal in planar cells," Optics Express, vol. 26, No. 4, Feb. 19, 2018, pp. 4288-4299 (12 pages).

* cited by examiner

*Primary Examiner* — Paisley L Wilson
(74) *Attorney, Agent, or Firm* — Millburn IP PLLC

(57) ABSTRACT

A device includes a first substrate and a second substrate. The device also includes a birefringent medium layer disposed between the first substrate and the second substrate. Orientations of directors of optically anisotropic molecules included in the birefringent medium layer varying periodically with an in-plane pitch tunable by an external field to adjust a diffraction angle of a light beam diffracted by the birefringent medium layer.

20 Claims, 26 Drawing Sheets

Table 1

| $P_v$=205nm | Diffraction Efficiency | Diffraction Angle (°) | |
|---|---|---|---|
| $P_{in}$ (nm) | via FDTD | via FDTD | via Grating Eq. |
| 400 | 0.52 | 62.4 | 62.4 |
| 420 | 0.98 | 57.6 | 57.6 |
| 440 | 0.99 | 53.7 | 53.7 |
| 460 | 0.99 | 50.5 | 50.4 |
| 480 | 0.99 | 47.7 | 47.6 |
| 500 | 0.98 | 45.2 | 45.1 |
| 520 | 0.99 | 43.0 | 43.0 |
| 540 | 0.97 | 41.0 | 41.0 |
| 560 | 0.63 | 39.3 | 39.3 |
| 580 | 0.54 | 37.7 | 37.7 |
| 600 | 0.27 | 36.3 | 36.2 |

FIG. 3B

Table 2

| $P_v$=350nm | Diffraction Efficiency | Diffraction Angle (°) |
|---|---|---|
| $P_{in}$ (nm) | via FDTD | via FDTD |
| 530 | 0.05 | 82.7 |
| 550 | 0.96 | 78.0 |
| 570 | 0.99 | 70.7 |
| 590 | 0.99 | 65.8 |
| 610 | 0.99 | 61.9 |
| 630 | 0.97 | 58.6 |
| 650 | 0.93 | 55.9 |
| 670 | 0.61 | 53.5 |
| 690 | 0.14 | 51.2 |

FIG. 3D

OPTICAL DEVICE BASED ON TUNABLE POLARIZATION VOLUME HOLOGRAM

TECHNICAL FIELD

The present disclosure relates generally to optical devices and, more specifically, to an optical device based on a tunable polarization volume hologram ("PVH").

BACKGROUND

Beam steering devices have numerous applications in a large variety of fields, such as target tracking, three-dimensional ("3D") imaging and sensing, free-space optical communications countermeasures, directed energy weapons, fiber optic switching devices, lithography, 3D printing, etc. Conventional beam steering devices include mechanical beam steering devices such as micro electro-mechanical system ("MEMS") mirrors, rotating mirrors or prisms, etc., and non-mechanical beam steering devices such as acousto-optic deflectors, electro-optic deflectors, liquid crystal ("LC") based beam steering devices, etc. LCs have been widely applied in beam steering devices due to their advantages of low cost, low power consumption, and simple preparation. Conventional LC-based beam steering devices have two categories: a category based on a non-uniform electric field distribution in LCs induced by patterned electrodes on one or both substrates, and another category based on a periodic refractive index profile induced by multiple alignment regions or holographic recordings in a polymer-network liquid crystal composite. Desirable features of beam steering devices include compactness, high power efficiency, large steering range with options of continuous beam steering or discrete beam steering, wavelength selectivity, incident angle selectivity and/or polarization selectivity, and polarization conversion in addition to beam steering.

SUMMARY OF THE DISCLOSURE

Consistent with an aspect of the present disclosure, a device is provided. The device includes a first substrate and a second substrate. The device also includes a birefringent medium layer disposed between the first substrate and the second substrate. Orientations of directors of optically anisotropic molecules included in the birefringent medium layer vary periodically with an in-plane pitch tunable by an external field to adjust a diffraction angle of a light beam diffracted by the birefringent medium layer.

Consistent with another aspect of the present disclosure, a device is provided. The device includes a birefringent medium layer. The birefringent medium layer includes optically anisotropic molecules with directors rotating periodically with an in-plane pitch tunable by an external field to adjust a diffraction angle of a light beam diffracted by the birefringent medium layer.

Other aspects of the present disclosure can be understood by those skilled in the art in light of the description, the claims, and the drawings of the present disclosure. The foregoing general description and the following detailed description are exemplary and explanatory only and are not restrictive of the claims.

BRIEF DESCRIPTION OF THE DRAWINGS

The following drawings are provided for illustrative purposes according to various disclosed embodiments and are not intended to limit the scope of the present disclosure. In the drawings:

FIGS. 3A and 3B illustrate simulation results showing diffraction angle and diffraction efficiency as a function of an in-plane pitch of a PVH for a visible incident light beam, according to an embodiment of the present disclosure;

FIGS. 3C and 3D illustrate simulation results showing diffraction angle and diffraction efficiency as a function of an in-plane pitch of a PVH for a near infrared incident light beam, according to an embodiment of the present disclosure;

DETAILED DESCRIPTION

Figure 1A:
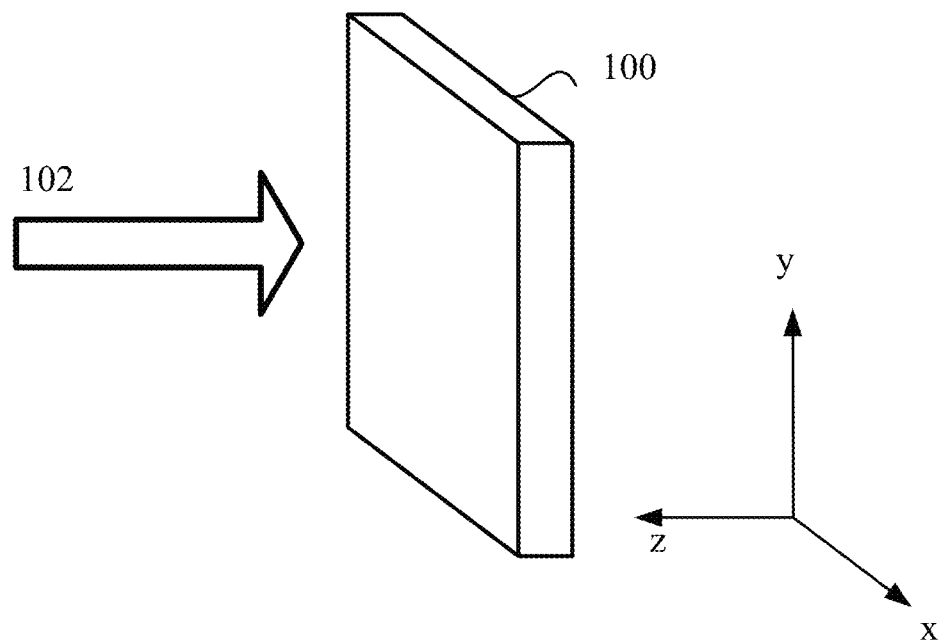
FIG. 1A illustrates a schematic three-dimensional ("3D") view of a polarization volume hologram ("PVH"), according to an embodiment of the present disclosure.

Embodiments consistent with the present disclosure will be described with reference to the accompanying drawings, which are merely examples for illustrative purposes and are not intended to limit the scope of the present disclosure. Wherever possible, the same reference numbers are used throughout the drawings to refer to the same or similar parts, and a detailed description thereof may be omitted.

Further, in the present disclosure, the disclosed embodiments and the features of the disclosed embodiments may be combined. The described embodiments are some but not all of the embodiments of the present disclosure. Based on the disclosed embodiments, persons of ordinary skill in the art may derive other embodiments consistent with the present disclosure. For example, modifications, adaptations, substitutions, additions, or other variations may be made based on the disclosed embodiments. Such variations of the disclosed embodiments are still within the scope of the present disclosure. Accordingly, the present disclosure is not limited to the disclosed embodiments. Instead, the scope of the present disclosure is defined by the appended claims.

As used herein, the terms "couple," "coupled," "coupling," or the like may encompass an optical coupling, a mechanical coupling, an electrical coupling, an electromagnetic coupling, or any combination thereof. An "optical coupling" between two optical elements refers to a configuration in which the two optical elements are arranged in an optical series, and a light beam output from one optical element may be directly or indirectly received by the other optical element. An optical series refers to optical positioning of a plurality of optical elements in a light beam path, such that a light beam output from one optical element may be transmitted, reflected, diffracted, converted, modified, or otherwise processed or manipulated by one or more of other optical elements. In some embodiments, the sequence in which the plurality of optical elements are arranged may or may not affect an overall output of the plurality of optical elements. A coupling may be a direct coupling or an indirect coupling (e.g., coupling through an intermediate element).

The phrase "at least one of A or B" may encompass all combinations of A and B, such as A only, B only, or A and B. Likewise, the phrase "at least one of A, B, or C" may encompass all combinations of A, B, and C, such as A only, B only, C only, A and B, A and C, B and C, or A and B and C. The phrase "A and/or B" may be interpreted in a manner similar to that of the phrase "at least one of A or B." For example, the phrase "A and/or B" may encompass all combinations of A and B, such as A only, B only, or A and B. Likewise, the phrase "A, B, and/or C" has a meaning similar to that of the phrase "at least one of A, B, or C." For example, the phrase "A, B, and/or C" may encompass all combinations of A, B, and C, such as A only, B only, C only, A and B, A and C, B and C, or A and B and C.

When a first element is described as "attached," "provided," "formed," "affixed," "mounted," "secured," "connected," "bonded," "recorded," or "disposed," to, on, at, or at least partially in a second element, the first element may be "attached," "provided," "formed," "affixed," "mounted," "secured," "connected," "bonded," "recorded," or "disposed," to, on, at, or at least partially in the second element using any suitable mechanical or non-mechanical manner, such as depositing, coating, etching, bonding, gluing, screwing, press-fitting, snap-fitting, clamping, etc. In addition, the first element may be in direct contact with the second element, or there may be an intermediate element between the first element and the second element. The first element may be disposed at any suitable side of the second element, such as left, right, front, back, top, or bottom.

When the first element is shown or described as being disposed or arranged "on" the second element, term "on" is merely used to indicate an example relative orientation between the first element and the second element. The description may be based on a reference coordinate system shown in a figure, or may be based on a current view or example configuration shown in a figure. For example, when a view shown in a figure is described, the first element may be described as being disposed "on" the second element. It is understood that the term "on" may not necessarily imply that the first element is over the second element in the vertical, gravitational direction. For example, when the assembly of the first element and the second element is turned 180 degrees, the first element may be "under" the second element (or the second element may be "on" the first element). Thus, it is understood that when a figure shows that the first element is "on" the second element, the configuration is merely an illustrative example. The first element may be disposed or arranged at any suitable orientation relative to the second element (e.g., over or above the second element, below or under the second element, left to the second element, right to the second element, behind the second element, in front of the second element, etc.).

When the first element is described as being disposed "on" the second element, the first element may be directly or indirectly disposed on the second element. The first element being directly disposed on the second element indicates that no additional element is disposed between the first element and the second element. The first element being indirectly disposed on the second element indicates that one or more additional elements are disposed between the first element and the second element.

The term "processor" used herein may encompass any suitable processor, such as a central processing unit ("CPU"), a graphics processing unit ("GPU"), an application-specific integrated circuit ("ASIC"), a programmable logic device ("PLD"), or any combination thereof. Other processors not listed above may also be used. A processor may be implemented as software, hardware, firmware, or any combination thereof.

The term "controller" may encompass any suitable electrical circuit, software, or processor configured to generate a control signal for controlling a device, a circuit, an optical element, etc. A "controller" may be implemented as software, hardware, firmware, or any combination thereof. For example, a controller may include a processor, or may be included as a part of a processor.

The term "non-transitory computer-readable medium" may encompass any suitable medium for storing, transferring, communicating, broadcasting, or transmitting data, signal, or information. For example, the non-transitory computer-readable medium may include a memory, a hard disk, a magnetic disk, an optical disk, a tape, etc. The memory may include a read-only memory ("ROM"), a random-access memory ("ROM"), a flash memory, etc.

The term "communicatively coupled" or "communicatively connected" indicates that related items are coupled or connected through an electrical and/or electromagnetic coupling or connection, such as a wired or wireless communication connection, channel, or network.

The wavelength ranges, spectra, or bands mentioned in the present disclosure are for illustrative purposes. The disclosed optical device, system, element, assembly, and method may be applied to a visible wavelength range, as well as other wavelength ranges, such as an ultraviolet ("UV") wavelength range, an infrared ("IR") wavelength range, or a combination thereof.

The term "film" or "layer" may include rigid or flexible, self-supporting or free-standing film, coating, or layer, which may be disposed on a supporting substrate or between substrates. The phrases "in-plane direction," "in-plane orientation," "in-plane rotation," "in-plane alignment pattern," and "in-plane pitch" refer to a direction, an orientation, a rotation, an alignment pattern, and a pitch in a plane of a film or a layer, respectively, e.g., a surface or a surface plane of the film or layer, or a plane parallel to the surface plane of the film or layer.

Mechanical beam steering devices may be limited by relatively small deflection angles and/or poor size scaling properties. Non-mechanical beam steering devices may be limited by poor efficiency (e.g., substantially low first order diffraction efficiency), temperature instability, high absorption, high loss, high scattering, small steering range, small resolution, small aperture, large physical size, and/or large weight. Non-mechanical beam steering devices may include optical phased arrays based on LC spatial-light-modulators or electrowetting devices, LC blazed gratings, Pancharatnam Berry Phase ("PBP") gratings coupled with switchable half-wave plates, polarization volume holograms ("PVHs") coupled with switchable half-wave plates, tunable gratings based on flexoelectric effects, switchable Bragg gratings, compound blazed gratings, LC-cladding waveguides, and metasurfaces integrated with LCs. Desirable features of beam steering devices include compactness, high power efficiency, large steering range with continuous or discrete beam steering, wavelength selectivity, incident angle selectivity, polarization selectivity, and/or polarization conversion. Conventional beam steering devices may not provide one or more of these desirable features.

PVH elements (also referred to as polarization volume holograms, or PVHs) have gained increasing interests for applications in optics, for example in beam steering devices, waveguides, and display technologies. PVHs may be configured to diffract an incident light beam via Bragg diffraction, and may possess features such as a large diffraction angle and a high diffraction efficiency. For example, a first order diffracted light beam may have a diffraction angle of 70° or larger, with a diffraction efficiency of 90% or more. These features render PVHs suitable for beam steering applications.

The present disclosure provides an optical device based on tunable PVHs. The optical device may function as a beam steering device. The optical device may include a first substrate and a second substrate disposed facing the first substrate, and a birefringent medium layer disposed between the first and second substrates. The birefringent medium layer may include optically anisotropic molecules arranged in a plurality of series of parallel Bragg planes within a volume of the birefringent medium layer. Directors of the optically anisotropic molecules disposed in close proximity to (including at) a surface of the birefringent medium layer may be arranged in a continuous rotation pattern, i.e., may rotate continuously, in a predetermined direction along the surface or in a plane parallel with the surface (e.g., an in-plane rotation). For example, the optically anisotropic molecules may be rod-like LC molecules. The rod-like LC molecule may have a longitudinal direction (or a length direction) and a lateral direction (or a width direction). The longitudinal direction of the LC molecule may be referred to as a director of the LC molecule or an LC director. In some embodiments, the rotation pattern (or orientation pattern) of the directors may have a uniform or constant periodicity. An in-plane pitch of the rotation pattern may be defined as a distance over which the orientations of the directors change by 180° in the predetermined direction along the surface or in the plane parallel with the surface. Thus, in some embodiments, the in-plane pitch may be uniform or constant. When the directors of the molecules continuously rotate, orientations of directors of the optically anisotropic molecules may vary continuously and periodically (e.g., vary linearly or non-linearly) in the predetermined direction along the surface or in the plane parallel with the surface with an in-plane pitch. The orientations of directors of the optically anisotropic molecules may also be referred to as local optic axis orientations (or orientations of local optic axis) of the birefringent medium layer. Thus, the local optic axis orientations along the surface or in the plane parallel with the surface of the birefringent medium layer may vary periodically in the predetermined direction with an in-plane pitch. In some embodiments, the in-plane pitch may be uniform (or same) in the predetermined direction. In some embodiments, at least two in-plane pitches in the predetermined direction may be different (i.e., the in-plane pitch may vary in the predetermined direction). The predetermined direction along the surface or in the plane parallel with the surface of the birefringent medium layer may be referred to as a predetermined in-plane direction (e.g., a direction in a surface plane or in a plane parallel with the surface plane).

In some embodiments, the in-plane pitch of the birefringent medium layer may be tunable by an external field to adjust a diffraction angle of a light beam diffracted by the birefringent medium layer. The external field may include at least one of an electric field, a light field, a magnetic field, or a mechanical force (a mechanical force field). At the surface of the birefringent medium layer or in the plane parallel with the surface, the rotations of the directors of the optically anisotropic molecules in a predetermined rotation direction (e.g., a clockwise direction or a counter-clockwise direction) may exhibit a handedness, e.g., right handedness or left handedness.

The optically anisotropic molecules of the birefringent medium layer may be arranged to form a plurality of parallel planes, referred to as "optically anisotropic molecule director planes" (or referred to as "molecule director planes"), within the volume of the birefringent medium layer. An optically anisotropic molecule director plane (or a molecule director plane) refers to a plane formed by and including directors of the optically anisotropic molecules. In some embodiments, an angle between a Bragg plane and a molecule director plane may be an acute angle. Such a birefringent medium layer may function as transmissive PVH. In some embodiments, a Bragg plane may be substantially parallel with a molecule director plane (i.e., the angle between a Bragg plane and a molecule director plane may be 0° or 180°). Such a birefringent medium layer may also function as a reflective PVH. In some embodiments, a birefringent medium layer may include a plurality of helical structures with a plurality of helical axes and a helical pitch along the helical axes. Each helical structure may include a helical axis. The helical pitch may be a constant helical pitch or a gradient helical pitch. The optical anisotropic molecules included in a same helical structure along the helical axis may rotate in a predetermined rotation direction (e.g., clockwise direction or counter-clockwise direction) around the helical axis of the helical structure. Accordingly, the helical structure may exhibit a handedness, e.g., right handedness or left handedness. In some embodiments, the birefringent medium layer may be configured to substantially diffract a polarized input light beam having a handedness that is the same as a handedness of the helical structures, and substantially transmit (e.g., with negligible diffraction) a polarized input light beam having a handedness that is opposite to the handedness of the helical structures.

In some embodiments, a Bragg plane may be substantially perpendicular to a molecule director plane (i.e., the angle between a Bragg plane and a molecule director plane may be 90°). Such a birefringent medium layer may function as a transmissive PVH. In some embodiments, the birefringent medium layer may be configured to substantially diffract a polarized input light beam having a handedness that is the same as a handedness of a rotation of the directors of the optically anisotropic molecules at the molecule director plane, and substantially transmit (e.g., with negligible diffraction) a polarized input light beam having a handedness that is opposite to the handedness of the rotation of the directors of the optically anisotropic molecules at the molecule director plane.

In some embodiments, the optical device may include a plurality of electrodes disposed at one or both of the first and second substrates. The electrodes may generate an electric field across the birefringent medium layer in one or more directions. The in-plane pitch of the birefringent medium layer may be tunable through adjusting a magnitude and/or a frequency of the electric field generated through the electrodes across the birefringent medium layer. The electrodes may be continuous planar electrodes, patterned electrodes, and/or protrusion electrodes. In some embodiments, the optical device may include a surface relief grating ("SRG") coupled to the birefringent medium layer. The in-plane pitch of the birefringent medium layer may be tunable through adjusting a period of the SRG, e.g., via an electric field, a mechanical force field, etc.

In some embodiments, the optical device may include one or more alignment structures disposed at one or both of the first and second substrates. An alignment structure may be configured to provide periodic surface anchoring conditions to the optically anisotropic molecules that are disposed in contact with the alignment structure. The in-plane pitch of the birefringent medium layer may be tunable through adjusting the periodic surface anchoring conditions provided by the alignment structure. In some embodiments, the alignment structure may include an alignment layer, e.g., a photo-alignment material ("PAM") layer. The in-plane pitch of the birefringent medium layer may be tunable by adjusting a periodicity of a polarization interference pattern applied to the PAM layer. In some embodiments, the polarization interference pattern may be formed by two coherent circularly polarized light beams with opposite handednesses. In some embodiments, the alignment structure may include a plurality of microstructures. For example, the alignment structure may include an SRG with or without an additional alignment material. The in-plane pitch of the birefringent medium layer may be tunable through adjusting a period of the SRG, e.g., via an electric field, a mechanical force field, etc.

The disclosed optical device may include features such as a large tuning range of diffraction angles, a high power efficiency (due to a high first order diffraction efficiency), a small form factor, wavelength selectivity, incident angle selectivity, polarization selectivity, and a polarization conversion, etc. In some embodiments, the optical device may function as a beam steering device, which may include features such as a broad steering angular range with continuous beam steering or discrete beam steering, a high diffraction efficiency, a small form factor, wavelength selectivity, incident angle selectivity, polarization selectivity, and polarization conversion in addition to beam steering. The beam steering angular range may be further broadened by stacking two or more of the disclosed optical devices. In some embodiments, two or more of the disclosed optical devices configured to steer a light beam in two different axes (or dimensions, directions) may be stacked to realize a two-dimensional ("2D") beam steering optical device.

FIG. 1A illustrates a schematic three-dimensional ("3D") view of a PVH 100 with an incident light beam 102 incident onto the PVH 100 along a −z-axis, according to an embodiment of the present disclosure. The PVH 100 may include a birefringent medium in a form of a layer (or a film, a plate). The layer is also referred to as a birefringent medium layer. The birefringent medium layer may include optically anisotropic molecules configured in a three-dimensional ("3D") orientational pattern to provide an optical function of the PVH 100.

In some embodiments, the PVH 100 may be fabricated based on a birefringent material including optically anisotropic molecules having an intrinsic orientational order that can be locally controlled. The birefringent material may exhibit a chirality. In some embodiments, the chirality of the birefringent material may be introduced by chiral dopants doped into a host birefringent material, e.g., introduced by chiral dopants doped into achiral nematic liquid crystals ("LCs"), or introduced by chiral reactive mesogens ("RMs") doped into achiral RMs. In some embodiments, the chirality of the birefringent material may be a property of the birefringent material, such as an intrinsic molecular chirality. For example, the birefringent material may include chiral liquid crystal molecules, or the birefringent material may include molecules having one or more chiral functional groups. In some embodiments, the birefringent material with a chirality may include twist-bend nematic LCs (or LCs in twist-bend nematic phase), in which liquid crystal ("LC") directors may exhibit periodic twist and bend deformations forming a conical helix with doubly degenerate domains having opposite handednesses. The LC directors of twist-bend nematic LCs may be tilted with respect to the helical axis. Thus, the twist-bend nematic phase may be considered as the generalized case of the conventional nematic phase in which the LC directors are orthogonal with respect to the helical axis.

For example, a photo-alignment material ("PAM") layer may be first coated onto a surface of a substrate (e.g., a first substrate and a second substrate). The PAM layer may include directional molecules that may be aligned according to a polarization field. The PAM layer may be exposed to a polarization interference formed by two coherent circularly polarized light beams with opposite handednesses to have the directional molecules aligned in a predetermined pattern (e.g., a grating pattern). The first substrate with a first exposed PAM layer and the second substrate with a second exposed PAM layer may be arranged in parallel to form a cell. An LC mixture including a nematic LC host and chiral dopants may be filled into the cell. The chiral dopants in the LC mixture may promote self-assembly of LCs into helical structures following the direction or orientation of the directional molecules in the PAM layers (the predetermined pattern recorded in the PAM layers).

In some embodiments, the PVH 100 may be fabricated based on photosensitive polymers, such as amorphous polymers, liquid crystal ("LC") polymers, etc., which may generate an induced (e.g., photo-induced) optical anisotropy and induced (e.g., photo-induced) local optic axis orientations when subjected to a polarized light irradiation. When subjected to a polarized light irradiation, the efficiency of photochemical reaction in the photosensitive polymers may depend on a polarization of an exciting light beam that results in a photo-induced orientation. The molecules of photosensitive polymers may include polarization-sensitive photoreactive groups embedded in a main polymer chain or a side polymer chain. In some embodiments, the polarization sensitive groups may include an azobenzene group, a cinnamate group, or a coumarin group, etc. In some embodiments, the photosensitive polymer may include an LC polymer with polarization sensitive cinnamate group incorporated in a side polymer chain. For example, a mixture including a photosensitive polymer may be first filled into a cell formed by the first and second substrates or coated on a substrate as a film. Then the cell filled with the photosensitive polymer or the coated film may be exposed to a polarization interference formed by two coherent circularly polarized light beams with opposite handednesses to record a 3D polarization field into the photosensitive polymers. In some embodiments, the photo-induced optical anisotropy in the LC polymers may be further enhanced by a subsequent heat treatment (e.g., annealing) in a temperature range corresponding to liquid crystalline state of the LC polymers due to intrinsic self-organization of the LC polymers. PVHs or PVH elements as described herein can also be created by various other methods, such as holographic interference, laser direct writing, and various other forms of lithography. Thus, a "hologram" as described herein is not limited to creation by holographic interference, or "holography."

Figure 1B:
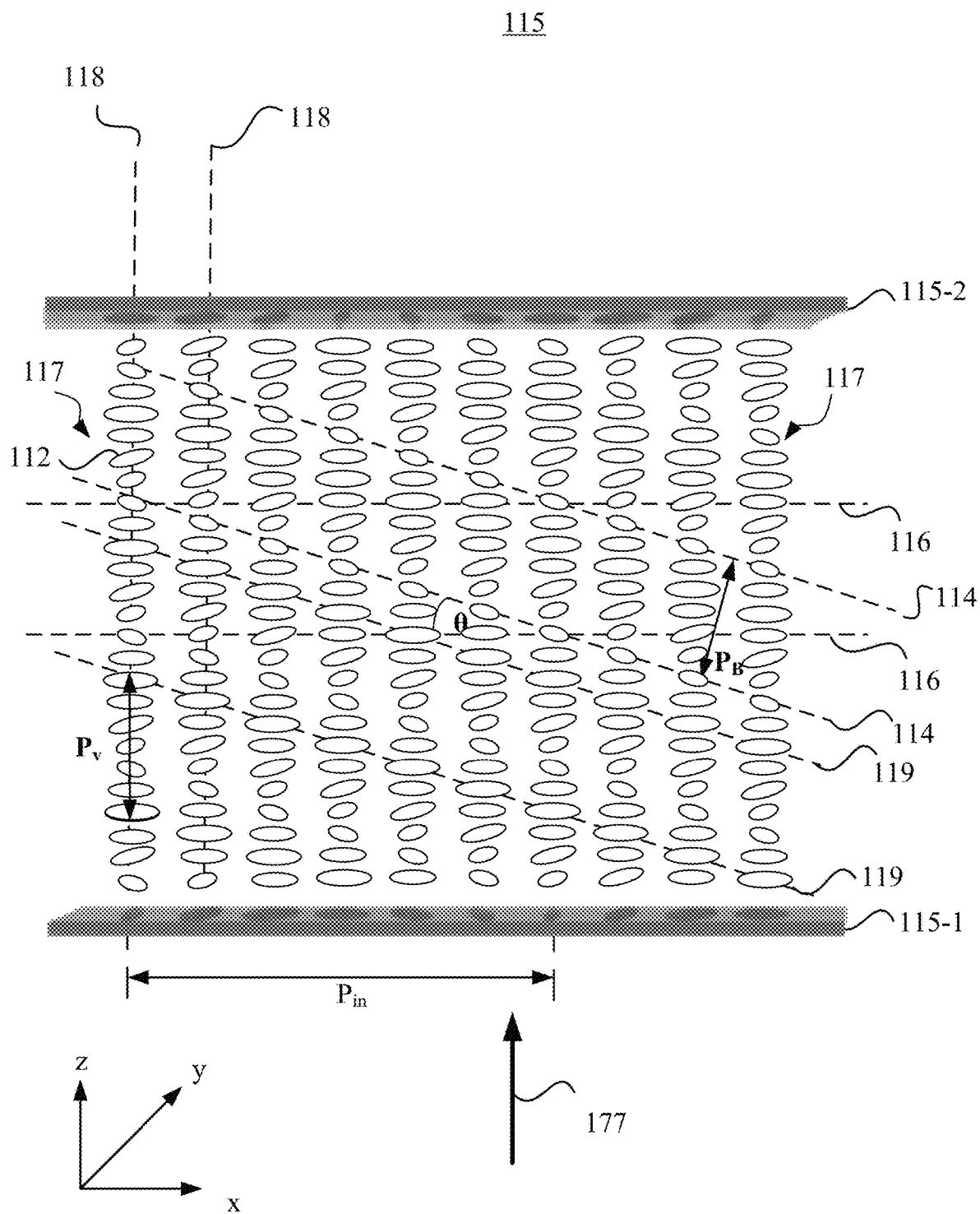
FIG. 1B illustrates a portion of a schematic 3D orientational pattern of optically anisotropic molecules of a PVH, according to an embodiment of the present disclosure.
Figure 1C:
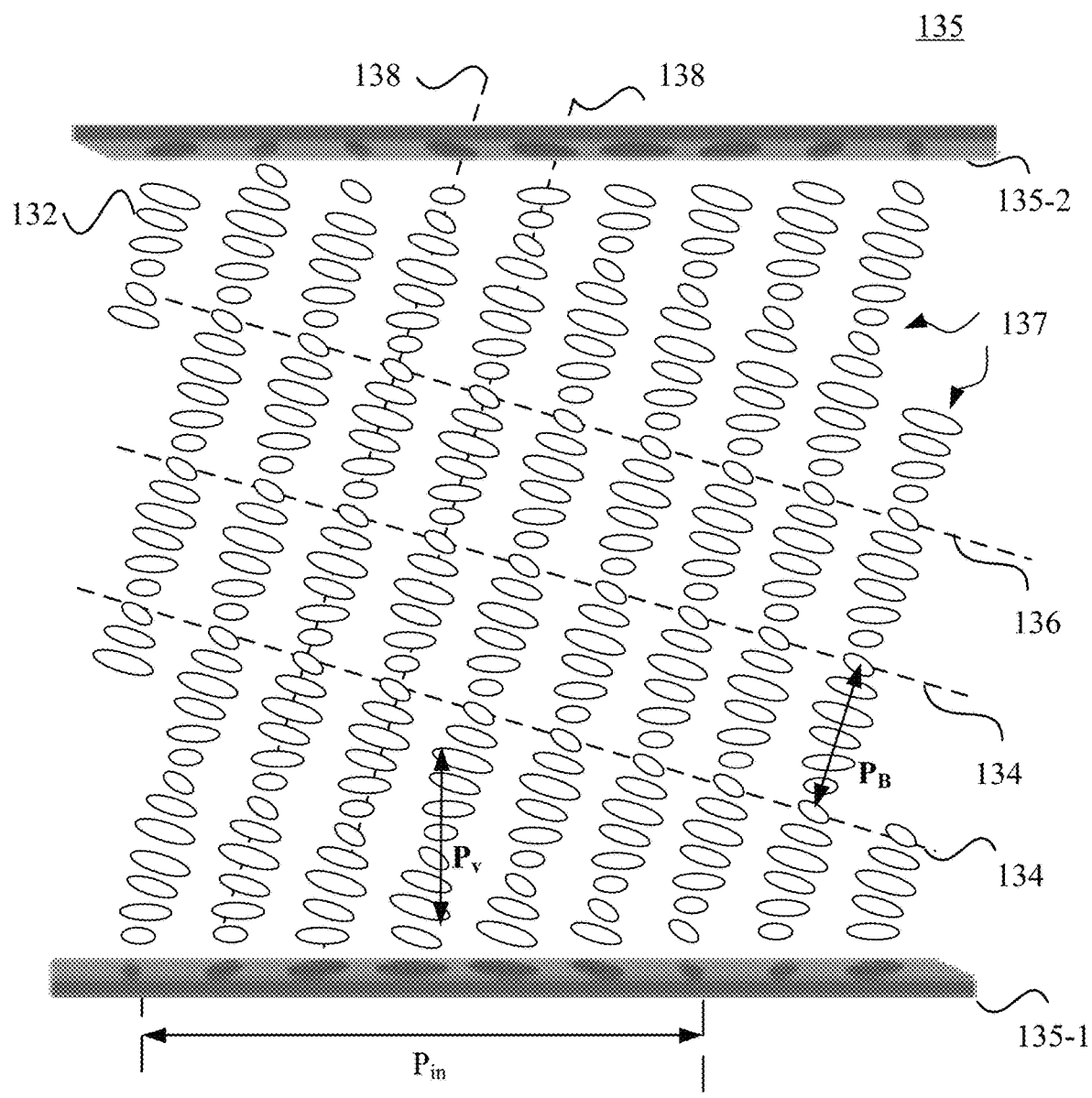
FIG. 1C illustrates a portion of a schematic 3D orientational pattern of optically anisotropic molecules of a PVH, according to another embodiment of the present disclosure.
Figure 1D:
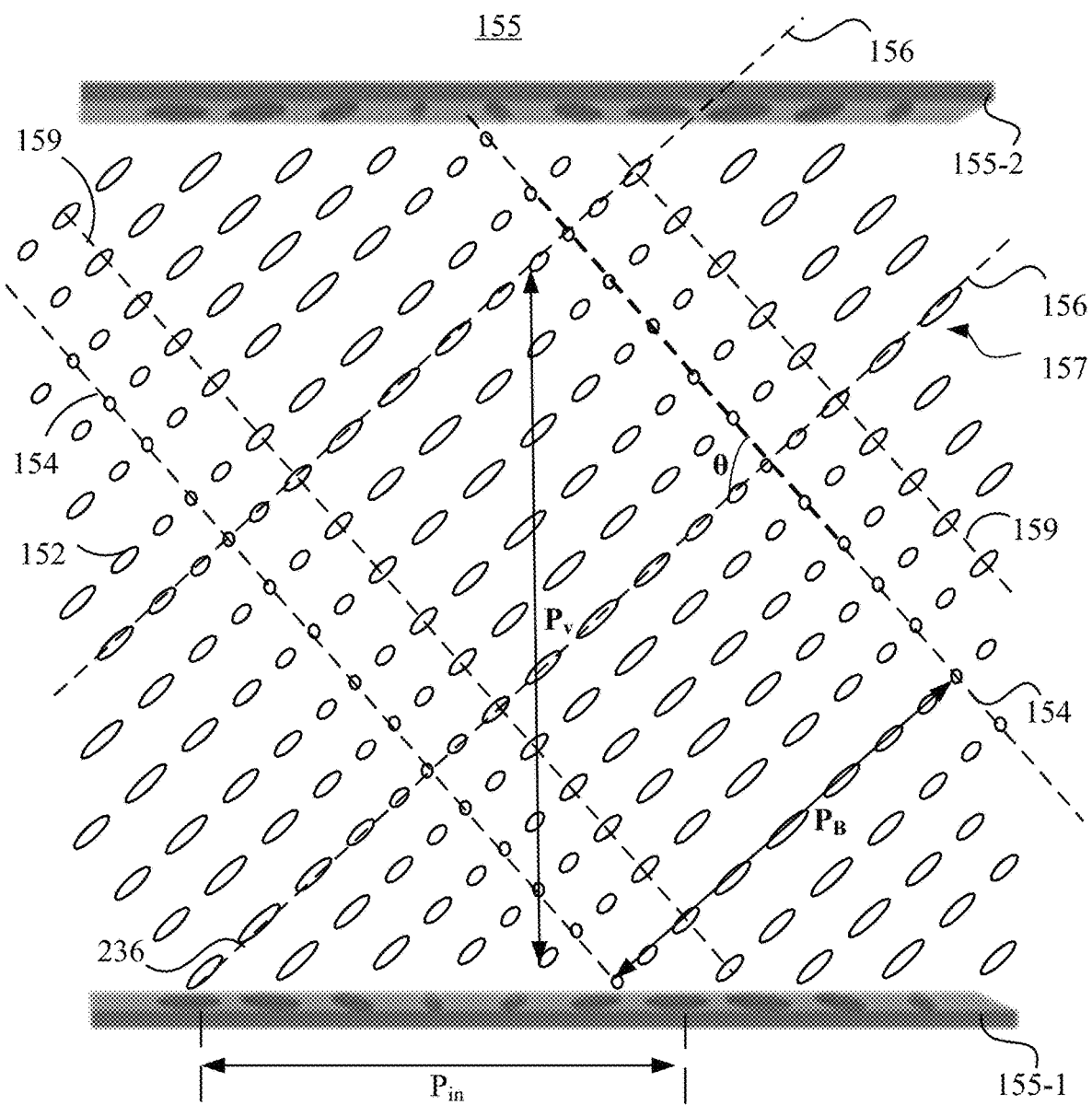
FIG. 1D illustrates a portion of a schematic 3D orientational pattern of optically anisotropic molecules of a PVH, according to another embodiment of the present disclosure.
Figure 1E:
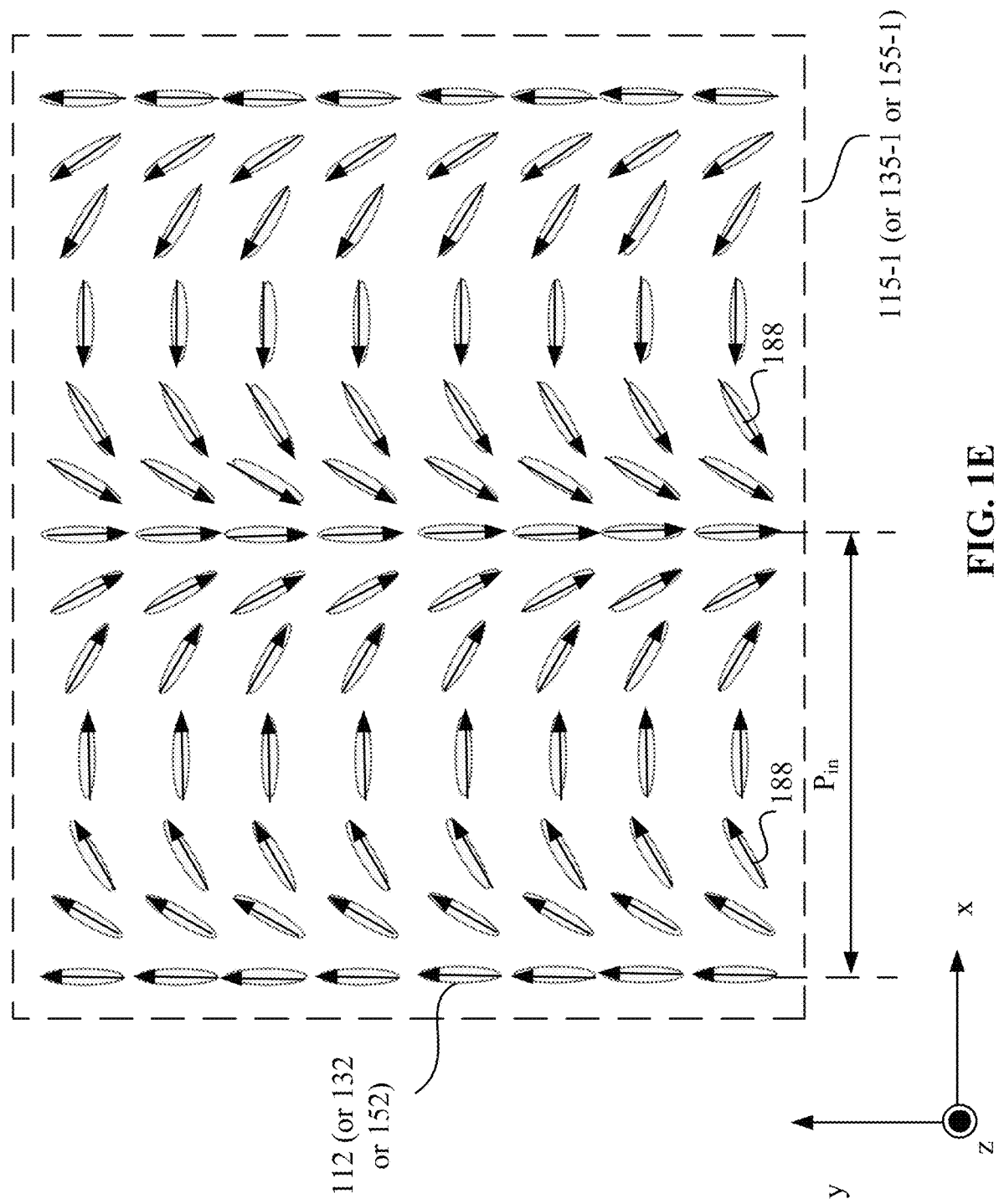
FIG. 1E illustrates a portion of a schematic in-plane orientational pattern of optically anisotropic molecules of the PVH shown in FIGS. 1B-1D, according to an embodiment of the present disclosure.
Figure 1F:
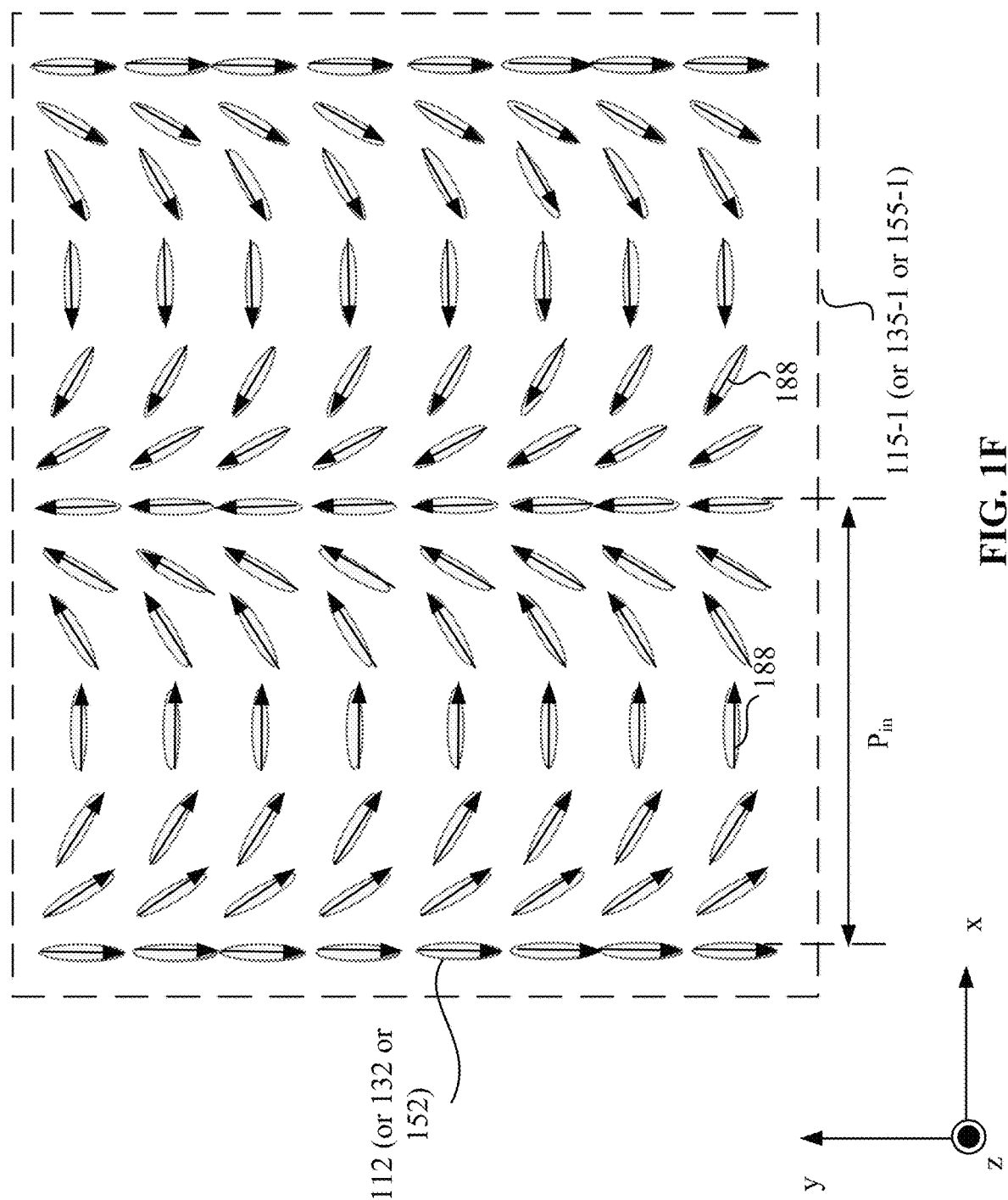
FIG. 1F illustrates a portion of a schematic in-plane orientational pattern of optically anisotropic molecules in the PVH shown in FIGS. 1B-1D, according to another embodiment of the present disclosure.
Figure 1G:
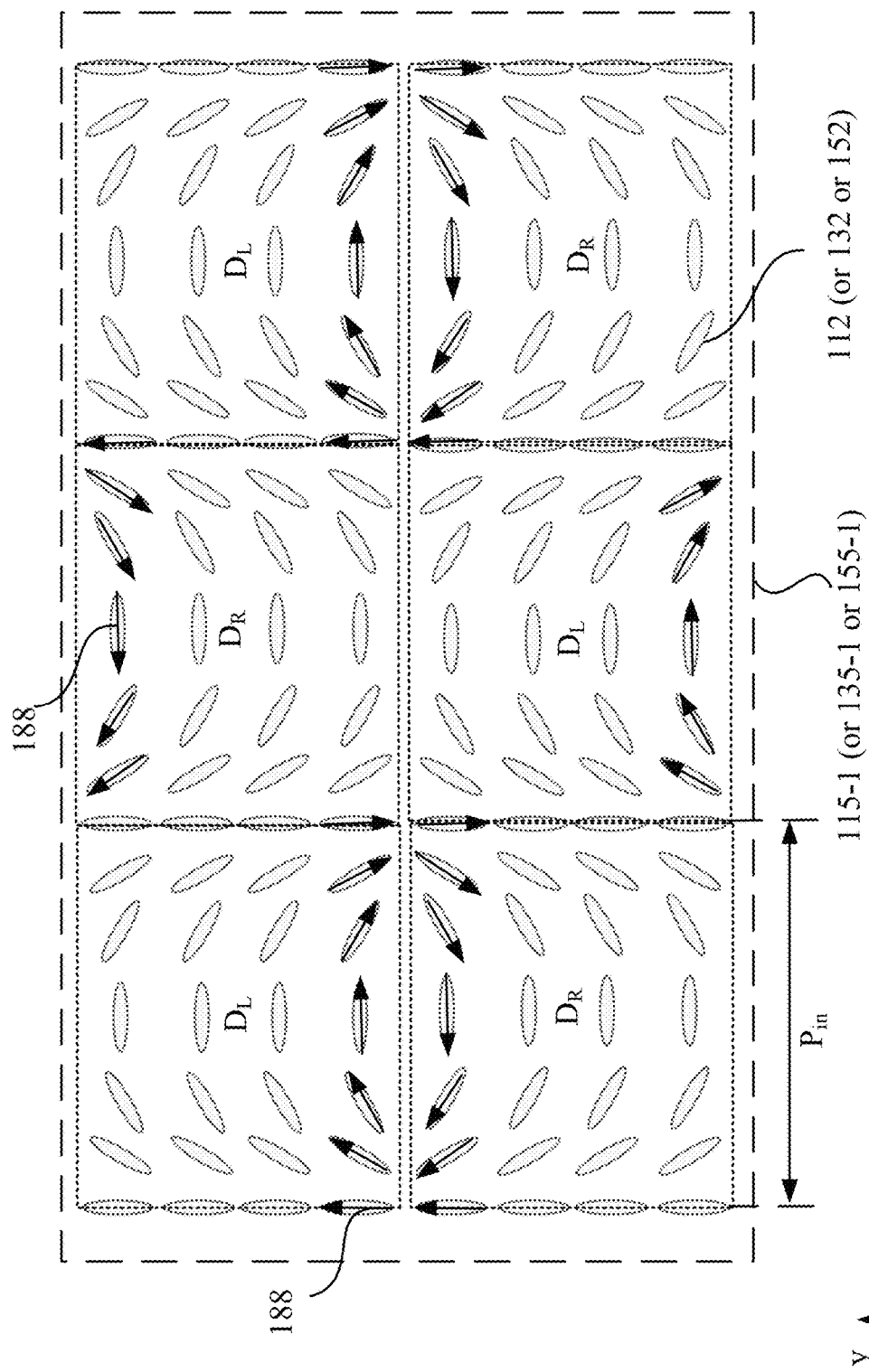
FIG. 1G illustrates a portion of a schematic in-plane orientational pattern of optically anisotropic molecules in the PVH shown in FIGS. 1B-1D, according to another embodiment of the present disclosure.

FIGS. 1B-1D schematically illustrate portions of 3D orientational patterns of optically anisotropic molecules included in a birefringent medium layer of the PVH 100, according to various embodiments of the present disclosure. FIGS. 1E-1G schematically illustrate portions of periodic in-plane orientation patterns of the optically anisotropic molecules located in close proximity to (including those at) at least one of a first surface or a second surface of the birefringent medium layer shown in FIGS. 1B-1D, according to various embodiments of the present disclosure. For discussion purposes, LC molecules are used as examples of the optically anisotropic molecules of the birefringent medium layer. Each LC molecule in FIGS. 1B-1G is depicted as having a longitudinal direction (or a length direction) and a lateral direction (or a width direction). The longitudinal direction of the LC molecule is referred to as a director of the LC molecule or an LC director.

FIG. 1B schematically illustrates a portion of a 3D orientational pattern of LC molecules 112 included in a birefringent medium layer 115. As shown in FIG. 1B, the birefringent medium layer 115 may have a first surface 115-1 and a second surface 115-2 facing the first surface 115-1. Although the birefringent medium layer 115 is shown as flat for illustrative purposes, the birefringent medium layer 115 may have a non-flat shape (e.g., a curved shape). In a volume of the birefringent medium layer 115, the LC molecules 112 may be arranged in a plurality of helical structures 117 with a plurality of helical axes 118 and a helical pitch $P_h$. Directors of the LC molecules 112 included in a same helical structure 117 along a helical axis 118 may continuously rotate around the helical axis 118 in a predetermined rotation direction (e.g., clockwise direction or counter-clockwise direction). Accordingly, the helical structure 117 may exhibit a handedness, e.g., right handedness or left handedness. The helical pitch $P_h$ is defined as a distance along the helical axis 118 over which the LC directors (or azimuthal angles of the LC molecules) rotate by 360°. The azimuthal angle of the LC molecules 112 is defined as an angle between the LC director and a direction (e.g., a +x-axis direction) in a plane parallel with a surface of the birefringent medium layer 115.

In the embodiment shown in FIG. 1B, the helical axes 118 of the helical structures 117 may be parallel with one another. The helical axes 118 may have a direction that is substantially perpendicular to the first surface 115-1 and/or the second surface 115-2 of the birefringent medium layer 115. In other words, the helical axes 118 of the helical structures 117 may have a direction along a thickness direction (e.g., a z-axis direction) of the birefringent medium layer 115. In some embodiments, the LC molecules 112 may be aligned to have substantially small pretilt angles (including zero degree pretilt angle), and the LC directors of the LC molecules 112 may be regarded as substantially orthogonal to the helical axis 118. The birefringent medium layer 115 (or the PVH 100 including the birefringent medium layer 115) may have a vertical pitch $P_v$, which is defined as a distance along the thickness direction of the birefringent medium layer 115 over which the LC directors rotate by 180°. In the embodiment shown in FIG. 1B, the vertical pitch $P_v$ may be half of the helical pitch $P_h$.

In some embodiments, the LC molecules 112 located in close proximity to or at a surface (e.g., at least one of the first surface 115-1 or the second surface 115-2) of the birefringent medium layer 115, may be configured with LC directors continuously rotating in a predetermined direction (e.g., an x-axis direction) along the surface (or in a plane parallel with the surface). The continuous rotation of the LC directors may form a periodic rotation pattern with a uniform (e.g., same) in-plane pitch $P_{in}$. The predetermined direction may be any suitable direction along the surface (or in a plane parallel with the surface) of the birefringent medium layer 115. For illustrative purposes, FIG. 1B shows that the predetermined direction is the x-axis direction. The predetermined direction may be referred to as an in-plane direction, the pitch $P_{in}$ along the in-plane direction may be referred to as an in-plane pitch or a horizontal pitch. The pattern with the uniform (or same) in-plane pitch $P_{in}$ may be referred to as a periodic LC director in-plane orientation patterns.

FIG. 1E schematically illustrates a portion of the periodic in-plane orientation pattern of the directors (indicated by arrows 188 in FIG. 1E) of the LC molecules 112 located in close proximity to or at a surface (e.g., at least one of the first surface 115-1 or the second surface 115-2) of the birefringent medium layer 115, according to an embodiment of the present disclosure. The in-plane pitch $P_{in}$ is defined as a distance along the in-plane direction (e.g., the x-axis direction) over which the LC directors rotate by 180°. In other words, in a region substantially close to (including at) the surface of the birefringent medium layer 115, local optic axis orientations of the birefringent medium layer 115 may vary periodically in the in-plane direction (e.g., the x-axis direction) with a pattern having the uniform (or same) in-plane pitch $P_{in}$. In addition, at a surface (e.g., at least one of the first surface 115-1 or the second surface 115-2) of the birefringent medium layer 115, the directors of the LC molecules 112 may rotate in a predetermined rotation direction, e.g., a clockwise direction or a counter-clockwise direction. Accordingly, the rotation of the directors of the LC molecules 112 at the surface of the birefringent medium layer 115 may exhibit a handedness, e.g., right handedness or left handedness. In some embodiments, the periodic LC director in-plane orientation pattern or the periodic local optic axis orientation pattern of the birefringent medium layer 115 may be obtained by patterning a recording medium or an alignment surface using various techniques, such as holography techniques. In the embodiment shown in FIG. 1E, at the surface (e.g., at least one of the first surface 115-1 or the second surface 115-2) of the birefringent medium layer 115, the directors of the LC molecules 112 may rotate in a clockwise direction. Accordingly, the rotation of the directors of the LC molecules 112 at the surface of the birefringent medium layer 115 may exhibit a left handedness.

FIG. 1F schematically illustrates a portion of the periodic in-plane orientation pattern of the directors (indicated by arrows 188 in FIG. 1F) of the LC molecules 112 located in close proximity to or at a surface (e.g., at least one of the first surface 115-1 or the second surface 115-2) of the birefringent medium layer 115, according to another embodiment of the present disclosure. In the embodiment shown in FIG. 1F, at the surface (e.g., at least one of the first surface 115-1 or the second surface 115-2) of the birefringent medium layer 115, the directors of the LC molecules 112 may rotate in a counter-clockwise direction. Accordingly, the rotation of the directors of the LC molecules 112 at the surface of the birefringent medium layer 115 may exhibit a right handedness. The directors of the LC molecules 112 located in close proximity to or at a surface of the birefringent medium layer 115 shown in FIG. 1E and the directors of the LC molecules 112 located in close proximity to or at a surface of the birefringent medium layer 115 shown in FIG. 1F may be mirror symmetric orientation patterns.

FIG. 1G schematically illustrates a portion of the periodic in-plane orientation pattern of the directors (indicated by arrows 188 in FIG. 1G) of the LC molecules 112 located in close proximity to or at a surface (e.g., at least one of the first surface 115-1 or the second surface 115-2) of the birefringent medium layer 115, according to another embodiment of the present disclosure. It is noted that in FIG. 1G, only some directors are indicated by arrows 188. Arrows are not shown for all directors for the simplicity of illustration. In the embodiment shown in FIG. 1G, at the surface (e.g., at least one of the first surface 115-1 or the second surface 115-2) of the birefringent medium layer 115, domains in which the directors of the LC molecules 112 may rotate in a clockwise direction (referred to as domains DL) and domains in which the directors of the LC molecules 112 may rotate in a counter-clockwise direction (referred to as domains DR) may be alternatingly arranged in both x-axis and y-axis direction. The domains DL and the domains DR are sche-matically enclosed by dotted squares. In some embodiments, the DL and the domains DR may have substantially the same size. The width of each domain may be substantially equal to the value of the in-plane pitch $P_{in}$. Although not shown, in some embodiments, the domains DL and the domains DR may be alternatingly arranged in at least one direction along the surface of the (e.g., at least one of the first surface 115-1 or the second surface 115-2) of the birefringent medium layer 115. In some embodiments, the width of each domain may be an integer multiple of the values of the in-plane pitch $P_{in}$. In some embodiments, the domains DL and the domains DR may have different sizes.

Referring back to FIG. 1B, the LC directors of the LC molecules 112 stacked over the LC molecules 112 located in close proximity to or at the surface of the birefringent medium layer 115 may twist in a helical fashion around and along the helical axes 118. As the LC molecules 112 located in close proximity to or at the surface of the birefringent medium layer 115 are configured with LC directors continuously and periodically rotating in the in-plane direction (e.g., the x-axis direction), the plurality of helical structures 117 may form a plurality of series of slanted and parallel refractive index planes periodically distributed within the volume of the birefringent medium layer 115. The plurality of series of slanted and parallel refractive index planes may include a first series of slanted and parallel refractive index planes 114 periodically distributed within the volume, a second series of slanted and parallel refractive index planes 119 periodically distributed within the volume, etc. Other series of slanted and parallel refractive index planes are not marked with a reference number. The slanted and parallel refractive index planes in a same series may be periodically distributed within the volume in a predetermined direction (e.g., in a direction perpendicular to the planes). The parallel planes in a same series may have the same refractive index. When the number of the refractive index planes (or the thickness of the birefringent medium film) reaches a sufficient value, Bragg diffraction may be established according to the principles of volume gratings. Thus, the slanted and parallel refractive index planes 114 (or 119) may also be referred to as Bragg planes 114 (or 119). In some embodiments, the Bragg planes 114 (or 119) may be tilted (e.g., to the left or to the right) with respect to a surface (e.g., at least one of the first surface 115-1 or the second surface 115-2) of the birefringent medium layer 115, parallel with the surface, or perpendicular to the surface.

Each Bragg plane 114 (or 119) may be formed by the LC molecules 112 having substantially the same orientation of LC directors from different helical structures 117. The Bragg planes 114 in the same series formed by the LC molecules 112 having substantially the same orientation of LC directors may have a substantially same refractive index. In other words, the LC molecules 112 having substantially the same orientation of LC directors from different helical structures 117 may form slanted and parallel refractive index planes (or Bragg planes) 114 of a substantially same refractive index periodically distributed within the volume of the birefringent medium layer 115. Likewise, the Bragg planes 119 in the same series formed by the LC molecules 112 having substantially the same orientation of LC directors may have a substantially same refractive index. The refractive indices at the Bragg planes 114 and 119 in different series may be different. A distance (or a period) between adjacent Bragg planes 114 (or between adjacent Bragg planes 119) of the same series may be referred to as a Bragg period PB. The plurality of different series of Bragg planes (e.g., first series, second series, and so on) formed within the volume of the birefringent medium layer 115 (or the volume of the PVH 100) may produce a varying refractive index profile (e.g., a profile of varying refractive indices) that is periodically distributed in the volume of the birefringent medium layer 115. The varying refractive index profile may include a series of refractive indices corresponding to the first series of refractive index planes 114, the second series refractive index planes 119, and other series of refractive index planes. The birefringent medium layer 115 (or the PVH 100) may diffract an input light beam satisfying the Bragg condition through Bragg diffraction (or through slanted multiplayer diffraction).

As shown in FIG. 1B, the birefringent medium layer 115 (or the PVH 100 including the birefringent medium layer 115) may also include a plurality of optically anisotropic molecule director planes (or molecule director planes) 116 arranged in parallel with one another within the volume of the birefringent medium layer 115. An optically anisotropic molecule director plane (or a molecule director plane) 116 may be a plane formed by or including the directors of the optically anisotropic molecules. The directors in the molecule director plane may or may not have the same orientation. In the example shown in FIG. 1B, the directors in the molecule director plane 116 have different orientations, i.e., the orientations of the directors vary in the x-axis direction. The Bragg plane 114 (or 119) may form an angle θ with respect to the optically anisotropic molecule director plane 116. In the embodiment shown in FIG. 1B, the angle θ may be an acute angle, e.g., 0°<θ<90°. The PVH 100 including the birefringent medium layer 115 shown in FIG. 1B may function as a transmissive PVH. When the optically anisotropic molecules include LC molecules, the optically anisotropic molecules director plane 116 may also be referred to as an LC director plane 116. In the following descriptions, the LC director plane is used as an example of the optically anisotropic molecule director plane.

FIG. 1C illustrates a portion of a 3D orientational pattern of LC molecules 132 included in a birefringent medium layer 135, according to another embodiment of the present discourse. As shown in FIG. 1C, the birefringent medium layer 135 may have a first surface 135-1 and a second surface 135-2 facing the first surface 135-1. Although the birefringent medium layer 135 is shown as having a flat shape for illustrative purposes, the birefringent medium layer 135 may have a non-flat shape (e.g., a curved shape). Within a volume of the birefringent medium layer 135, the LC molecules 132 may be arranged in a plurality of helical structures 137 with a plurality of helical axes 138 and a helical pitch $P_h$. Each helical structure 137 may include a helical axis 138. The LC molecules 132 included in a same helical structure 137 along the helical axis 138 may rotate around a helical axis 138 in a predetermined rotation direction, e.g., clockwise direction or counter-clockwise direction. Accordingly, the helical structures 137 may exhibit a handedness, e.g., right handedness or left handedness.

In the embodiment shown in FIG. 1C, the helical axes 138 of the helical structures 137 may be tilted with respect to the first surface 135-1 and/or the second surface 135-2 of the birefringent medium layer 135. For example, the helical axes 138 of the helical structures 137 may be tilted from the normal of the first surface 135-1 and/or the second surface 135-2 of the birefringent medium layer 135, e.g., forming an acute angle with respect to the normal of the first surface 135-1 and/or the second surface 135-2 of the birefringent medium layer 135. In some embodiments, the LC directors of the LC molecule 132 may be substantially orthogonal to the helical axis 138. In some embodiments, the LC directors of the LC molecule 132 may be tilted with respect to the helical axis 138 at an acute angle. The birefringent medium layer 135 (or the PVH 100 including the birefringent medium layer 135) may also have a vertical pitch $P_v$.

Similar to the LC molecules 112 located in close proximity to or at a surface (e.g., at least one of the first surface 115-1 or the second surface 115-2) of the birefringent medium layer 115 shown in FIG. 1B and FIGS. 1E-1G, the LC molecules 132 located in close proximity to or at a surface (e.g., at least one of the first surface 135-1 or the second surface 135-2) of the birefringent medium layer 135 may be configured with LC directors continuously rotating (e.g., periodically rotating) in a predetermined in-plane direction (e.g., an x-axis direction) along the surface (or in a plane parallel with the surface). The continuous rotation of the LC directors may form a periodic rotation pattern with a uniform (e.g., same) in-plane pitch $P_{in}$. FIGS. 1E-1G also show portions of periodic LC director in-plane orientation patterns of the LC molecules 132 located in close proximity to or at the surface of the birefringent medium layer 135.

Returning to FIG. 1C, the LC directors of the LC molecules 132 stacked over the LC molecules 132 located in close proximity to or at the surface of the birefringent medium layer 135 may twist in a helical fashion along the direction of the helical axes 138. As the LC molecules 132 located in close proximity to or at the surface (e.g., at least one of the first surface 135-1 or the second surface 135-2) of the birefringent medium layer 135 are configured with LC directors continuously rotating (e.g., periodically rotating) in an in-plane direction (e.g., the x-axis direction), the plurality of helical structures may generate a plurality of series of slanted and parallel refractive index planes (or Bragg planes) periodically distributed within the volume the birefringent medium layer 135. Only a first series of Bragg planes 134 are labeled in FIG. 1C, and other series of Bragg planes are not labeled for the simplicity of illustration. Descriptions of the Bragg planes can refer to the above descriptions rendered in connection with FIG. 1B.

The birefringent medium layer 135 (or the PVH 100 including the birefringent medium layer 135) may also include a plurality of optically anisotropic molecule director planes 136 (or referred to as "LC director planes 136" or "molecule director planes 136") arranged in parallel within the volume of the birefringent medium layer 135. In the embodiment shown in FIG. 1C, an angle θ (not shown) between the LC director plane 136 and the Bragg plane (e.g., Bragg plane 134) may be substantially 0° or 180°. That is, the LC director plane 136 may be substantially parallel with the Bragg plane 134. The directors in a molecule director plane 136 may have the same orientation or may have different orientations. In the example shown in FIG. 1C, the orientations of the directors in the molecule director plane 136 may have the same orientations. The PVH 100 including the birefringent medium layer 135 shown in FIG. 1C may function as a reflective PVH.

FIG. 1D illustrates a portion of a schematic 3D orientational pattern of LC molecules 152 included in a birefringent medium layer 155, according to another embodiment of the present discourse. As shown in FIG. 1D, the birefringent medium layer 155 may include a first surface 155-1 and a second surface 155-2 facing the first surface 155-1. Although the birefringent medium layer 155 is shown as having a flat shape for illustrative purposes, the birefringent medium layer 155 may have a non-flat shape (e.g., a curved shape). In a volume of the birefringent medium layer 155, the LC molecules 152 may not be arranged in helical structures. The LC molecules 152 may be arranged in a plurality of series of slanted and parallel refractive index planes (or Bragg planes) (e.g., a first series of Bragg planes 154, a second series of Bragg planes 159, and other series) within the volume of the birefringent medium layer 155. Descriptions of the Bragg planes 154 (or 159) can refer to the above descriptions rendered in connection with FIG. 1B. The birefringent medium layer 155 (or the PVH 100 including the birefringent medium layer 155) may also have a vertical pitch $P_v$ in a thickness direction of the birefringent medium layer 155.

Similar to the LC molecules 112 located in close proximity to or at a surface (e.g., at least one of the first surface 115-1 or the second surface 115-2) of the birefringent medium layer 115 shown in FIG. 1B, the LC molecules 152 located in close proximity to or at a surface (e.g., at least one of the first surface 155-1 or the second surface 155-2) of the birefringent medium layer 155 may be configured with LC directors continuously rotating (e.g., periodically rotating) in a predetermined in-plane direction (e.g., an x-axis direction) along the surface. The continuous rotation may be in a periodic pattern with a uniform (or same) in-plane pitch $P_{in}$. FIGS. 1E-1G also show portions of periodic LC director in-plane orientation patterns of the LC molecules 152 located in close proximity to or at the surface of the birefringent medium layer 155.

Returning to FIG. 1D, the birefringent medium layer 155 (or the PVH 100 including the birefringent medium layer 155) may also include a plurality of LC director planes 156 arranged in parallel within the volume of the birefringent medium layer 155. In the embodiment shown in FIG. 1D, an angle θ between the LC director plane 156 and the Bragg plane (e.g., 154 or 159) may be a substantially right angle, e.g., θ=90°. That is, the LC director plane 156 may be substantially orthogonal to the Bragg plane (e.g., 154 or 159). The directors in an LC director plane 156 may or may not have the same orientations. In the example shown in FIG. 1D, the directors in an LC director plane 156 may have different orientations. In some embodiments, the PVH 100 including the birefringent medium layer 155 shown in FIG. 1D may function as a transmissive PVH.

For discussion purposes, FIGS. 1B-1D shows the LC molecules located in close proximity to each of the first surface and the second surface of the birefringent medium layer may be configured with LC directors arranged in a periodic LC director in-plane orientation pattern. The in-plane pitches $P_{in}$ of two periodic LC director in-plane orientation patterns may be the same. In some embodiments, the in-plane pitches $P_{in}$ of two periodic LC director in-plane orientation patterns may be different. Although not shown, in some embodiments, the LC molecules located in close proximity to one surface of the birefringent medium layer may be configured with LC directors arranged in a periodic in-plane orientation pattern, while the LC molecules located in close proximity to the other surface of the birefringent medium layer may not be configured with LC directors arranged in a periodic in-plane orientation pattern.

The PVH 100 including a birefringent medium layer (e.g., 115 in FIG. 1B, 135 in FIG. 1C, or 155 in FIG. 1D) may be configured to selectively interact with an incident light beam based on a polarization, a wavelength, and/or an incident angle of the light beam. The PVH 100 may be configured to primarily (or substantially) diffract a circularly polarized light beam (or an elliptically polarized light) having a predetermined handedness, and primarily (or substantially) transmit (e.g., with negligible diffraction) a circularly polarized light beam (or an elliptically polarized light) having a handedness that is opposite to the predetermined handedness. An unpolarized light beam or a linearly polarized light beam may be decomposed into two circularly polarized components with opposite handednesses. A first component having a predetermined handedness may be primarily diffracted by the PVH 100, and a second component having an opposite handedness may be primarily transmitted (e.g., with negligible diffraction) by the PVH 100. It is understood that the PVH 100 may also diffract the second component having the opposite handedness, with a much smaller diffraction efficiency than the first component having the predetermined handedness. The PVH 100 may also transmit (e.g., with negligible diffraction) the first component having the predetermined handedness, with a much smaller light transmittance than the second component having the opposite handedness. In some embodiments, the PVH 100 may be configured to primarily (or substantially) forwardly or backwardly diffract the circularly polarized light beam (or the elliptically polarized light) having the predetermined handedness. When the PVH 100 is configured to primarily (or substantially) forwardly diffract the circularly polarized light beam (or the elliptically polarized light) having the predetermined handedness, the PVH 100 may be referred to as a transmissive PVH. When the PVH 100 is configured to primarily (or substantially) backwardly diffract the circularly polarized light beam (or the elliptically polarized light) having the predetermined handedness, the PVH 100 may be referred to as a reflective PVH.

In some embodiments, as shown in FIG. 1B or FIG. 1C, the handedness of the helical structures (e.g., 117 in FIG. 1B or 137 in FIG. 1C) may define the polarization selectivity of the PVH 100. The PVH 100 including the birefringent medium layer 115 shown in FIG. 1B or the birefringent medium layer 135 shown in FIG. 1C may be configured to primarily (or substantially) diffract a circularly polarized light beam (or an elliptically polarized light) having a handedness that is the same as the handedness of the helical structures, and primarily (or substantially) transmit (e.g., with negligible diffraction) a circularly polarized light beam (or an elliptically polarized light) having a handedness that is opposite to the handedness of the helical structures. It is understood that the PVH 100 including the birefringent medium layer 115 shown in FIG. 1B or the birefringent medium layer 135 shown in FIG. 1C may also transmit (e.g., with negligible diffraction) the circularly polarized light beam (or an elliptically polarized light) having the handedness that is the same as the handedness of the helical structures, with a much smaller light transmittance than the circularly polarized light beam (or an elliptically polarized light) having the handedness that is opposite to the handedness of the helical structures. the PVH 100 including the birefringent medium layer 115 shown in FIG. 1B or the birefringent medium layer 135 shown in FIG. 1C may also diffract the circularly polarized light beam (or the elliptically polarized light) having the handedness that is opposite to the handedness of the helical structures, with a much smaller diffraction efficiency than the circularly polarized light beam (or the elliptically polarized light) having the handedness that is the same as the handedness of the helical structures.

In some embodiments, the PVH 100 including the birefringent medium layer 115 shown in FIG. 1B may function as a transmissive PVH, which may be configured to primarily (or substantially) forwardly diffract the circularly polarized light beam (or the elliptically polarized light) having the handedness that is the same as the handedness of the helical structures, and primarily (or substantially) transmit (e.g., with negligible diffraction) the circularly polarized light beam (or the elliptically polarized light) having the handedness that is opposite to the handedness of the helical structures. In some embodiments, the PVH 100 including the birefringent medium layer 135 shown in FIG. 1C may function as a reflective PVH, which may be configured to primarily (or substantially) backwardly diffract the circularly polarized light beam (or the elliptically polarized light) having the handedness that is the same as the handedness of the helical structures, and primarily (or substantially) transmit (e.g., with negligible diffraction) the circularly polarized light beam (or the elliptically polarized light) having the handedness that is opposite to the handedness of the helical structures.

In some embodiments, as shown in FIG. 1D, directors of the LC molecules 152 at (or in) the LC director planes 156 may have different orientations. That is, the directors in an LC director plane 156 may rotate in a predetermined rotation direction (e.g., clockwise or counter-clockwise) along the dashed line direction in the LC director plane 156 shown in FIG. 1D. The predetermined rotation direction may define a handedness of the rotation of the directors of the LC molecules 152 at the LC director planes 156. The handedness of the rotation of the directors of the LC molecules 152 may define the polarization selectivity of the PVH 100. In some embodiments, the handedness of the rotation of the directors of the LC molecules 152 at the LC director planes 156 may correspond to the handedness of the rotation of the directors of the LC molecules 152 at a surface (e.g., the first surface 155-1 and/or the second surface 155-2) of the birefringent medium layer 155. The PVH 100 including the birefringent medium layer 155 shown in FIG. 1D may be configured to primarily (or substantially) diffract a circularly polarized light beam (or an elliptically polarized light) having a handedness that is the same as the handedness of the rotation of the directors of the LC molecules at the LC director planes 156, and primarily (or substantially) transmit (e.g., with negligible diffraction) a circularly polarized light beam (or an elliptically polarized light) having a handedness that is opposite to the handedness of the rotation of the directors of the LC molecules at the LC director planes 156.

It is understood that the PVH 100 including the birefringent medium layer 155 shown in FIG. 1D may also transmit (e.g., with negligible diffraction) the circularly polarized light beam (or the elliptically polarized light) having the handedness that is the same as the handedness of the rotation of the directors of the LC molecules at the LC director planes 156, with a much smaller light transmittance than the circularly polarized light beam (or the elliptically polarized light) having the handedness that is opposite to the handedness of the rotation of the directors of the LC molecules at the LC director planes 156. It is understood that the PVH 100 including the birefringent medium layer 155 shown in FIG. 1D may also diffract the circularly polarized light beam (or the elliptically polarized light) having the handedness that is opposite to the handedness of the rotation of the directors of the LC molecules at the LC director planes 156, with a much smaller diffraction efficiency than the circularly polarized light beam (or the elliptically polarized light) having the handedness that is the same as the handedness of the rotation of the directors of the LC molecules at the LC director planes 156.

In some embodiments, the PVH 100 including the birefringent medium layer 155 shown in FIG. 1D may function as a transmissive PVH, which may be configured to primarily (or substantially) forwardly diffract the circularly polarized light beam (or the elliptically polarized light) having the handedness that is the same as the handedness of the rotation of the directors of the LC molecules at the LC director planes 156, and primarily (or substantially) transmit (e.g., with negligible diffraction) the circularly polarized light beam (or the elliptically polarized light) having the handedness that is opposite to the handedness of the rotation of the directors of the LC molecules at the LC director planes 156.

In some embodiments, when the birefringent medium layer 115 shown in FIG. 1B, the birefringent medium layer 135 shown in FIG. 1C, or the birefringent medium layer 155 shown in FIG. 1D is configured to have a periodic in-plane orientation pattern with domains DL and domains DR alternatingly arranged (e.g., one shown in FIG. 1G), the polarization selectivity of the PVH 100 may be reduced as compared to the polarization selectivity of the PVH 100 that includes the birefringent medium layer 115 shown in FIG. 1B, the birefringent medium layer 135 shown in FIG. 1C, or the birefringent medium layer 155 shown in FIG. 1D having a periodic in-plane orientation pattern shown in FIG. 1E or FIG. 1F.

In some embodiments, depending on the handedness of the helical structures in the birefringent medium layer 115 shown in FIG. 1B, the birefringent medium layer 135 shown in FIG. 1C, or the handedness of the rotation of the directors of the LC molecules at the LC director planes 156 in the birefringent medium layer 155 shown in FIG. 1D, the PVH 100 may be referred to as a left-handed PVH or a right-handed PVH. For example, a left-handed PVH may be configured to primarily (forwardly or backwardly) diffract a left-handed circularly polarized ("LHCP") light beam, and primarily transmit (e.g., with negligible diffraction) a right-handed circularly polarized ("RHCP") light beam. A right-handed PVH may be configured to primarily (forwardly or backwardly) diffract an RHCP light beam and primarily transmit (e.g., with negligible diffraction) an LHCP light beam. In some embodiments, depending on the 3D orientational pattern (or alignment pattern) of the optically anisotropic molecules in the PVH 100, the PVH 100 may also be configured with an optical power to converge or diverge the incident light beam.

In some embodiments, the helical structures (e.g., 117 in FIG. 1B, 137 in FIG. 1C) may also define the wavelength selectivity of the PVH 100. The PVH 100 may be configured to primarily diffract circularly polarized light beams with wavelengths substantially close to the helical pitch $P_h$ (e.g., the difference between the wavelength of the light beam and the helical pitch $P_h$ is within a predetermined range) and primarily transmit (e.g., with negligible diffraction) circularly polarized light beams with other wavelengths (e.g., the difference between the wavelength of the light beam and the helical pitch $P_h$ is out of the predetermined range). In some embodiments, the predetermined pitch associated with the rotation of the LC directors in the LC director plane (e.g., 156 in FIG. 1D) may define the wavelength selectivity of the PVH 100.

Referring to FIGS. 1B-1G, the in-plane pitch $P_{in}$ of the PVH 100 may determine the diffraction angle of a diffracted light beam. The diffraction angle of a first order diffracted light beam may be calculated by the following grating equation:

$$\sin(\theta_{\mathit{dif}}) \approx \lambda_0/(n * P_{in}),$$

where $\theta_{\mathit{dif}}$ is the diffraction angle of the first order diffracted light beam, $\lambda_0$ is the wavelength of an incident light beam of the PVH 100, n is the refractive index of the PVH 100, and $P_{in}$ is the in-plane pitch of the PVH 100. In some embodiments, the refractive index n of the PVH 100 may be the average refractive index of the birefringent material (e.g., an LC material) forming the PVH 100, where $n=(n_e+n_o)/2$, $n_e$ and $n_o$ are the extraordinary and ordinary refractive indices of the birefringent material (e.g., an LC material), respectively. According to the grating equation, the diffraction angle of the first order diffracted light beam may increase as the in-plane pitch $P_{in}$ decreases. Thus, through changing the in-plane pitch $P_{in}$ of the PVH 100, the diffraction angle of the first order diffracted light beam may be tunable. Accordingly, the PVH 100 may provide a beam steering function. In some embodiments, the PVH 100 may provide a continuous beam steering through changing the in-plane pitch $P_{in}$ in a continuous manner. In some embodiments, the PVH 100 may provide a discrete beam steering through changing the in-plane pitch $P_{in}$ of the PVH 100 in a discrete manner. In some embodiments, the beam steering range may be further increased by stacking two or more PVHs with independently tunable in-plane pitches $P_{in}$. In each of the two or more PVHs, the in-plane pitches $P_{in}$ may be tuned in the same or different manners or profiles. In some embodiments, a two-dimensional ("2D") beam steering may be provided by stacking two PVHs that steer a light beam in two different axes, respectively. In some embodiments, the PVH 100 may provide a polarization conversion in addition to a beam steering.

Figure 2B:
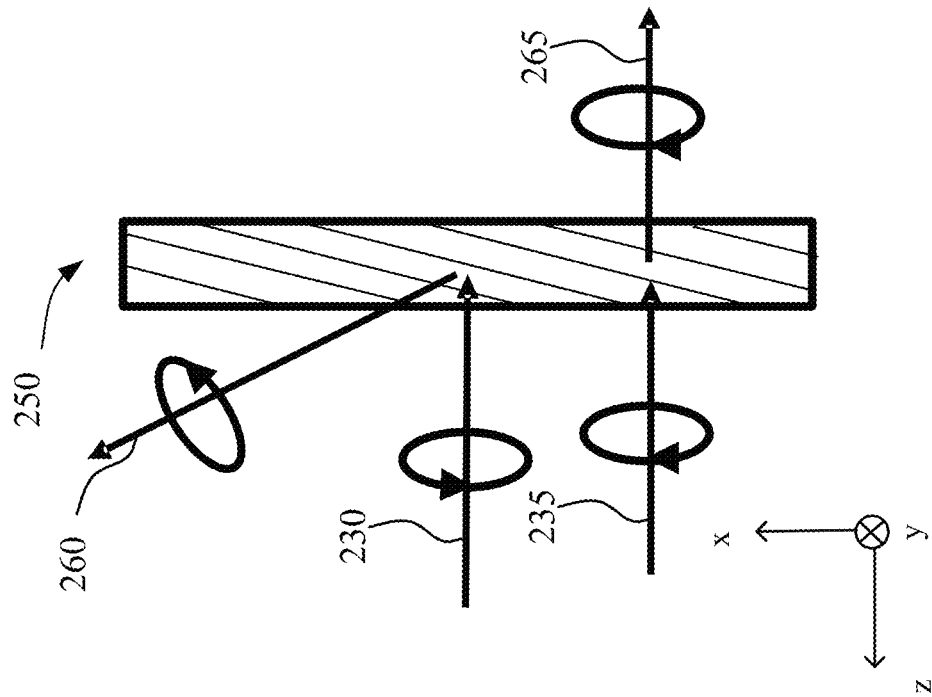
FIG. 2B illustrates diffraction orders of a reflective PVH, according to an embodiment of the present disclosure.
Figure 2A:
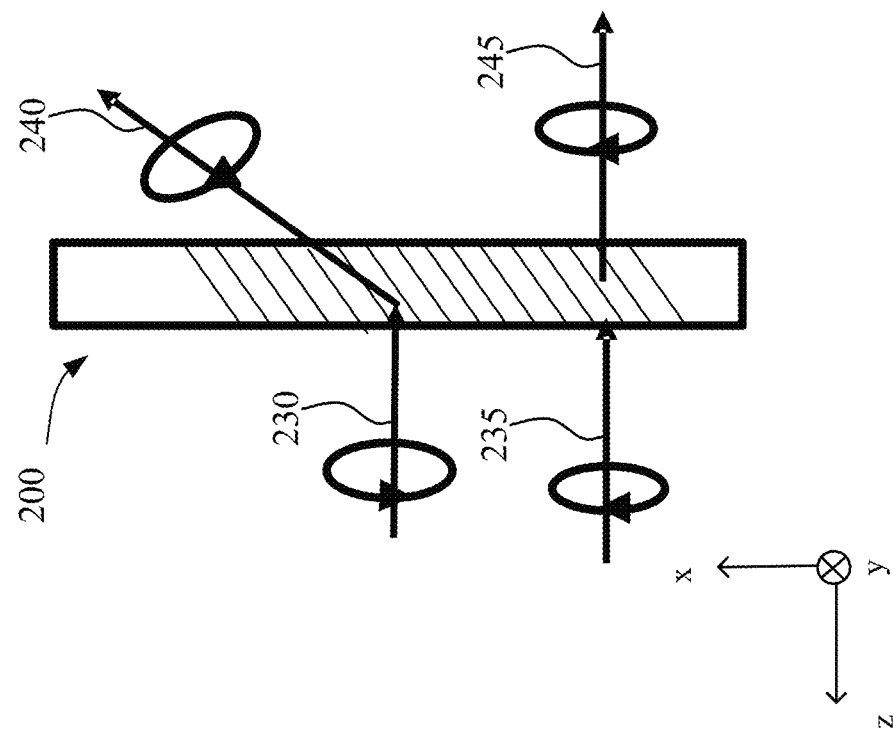
FIG. 2A illustrates diffraction orders of a transmissive PVH, according to an embodiment of the present disclosure.

FIG. 2A illustrates diffraction orders of a transmissive PVH 200, according to an embodiment of the present disclosure. The transmissive PVH 200 may be configured to primarily forwardly diffract a circularly polarized light beam (or an elliptically polarized light beam) having a predetermined handedness (e.g., a handedness that is the same as the handedness of the rotation of the LC directors at the LC director plane or the handedness of the helical structures of the PVH 200) to a diffracted light beam (e.g., the first order diffracted light beam). The transmissive PVH 200 may primarily transmit (e.g., with negligible diffraction) a circularly polarized light beam having a handedness that is opposite to the predetermined handedness (e.g., a handedness that is opposite to the handedness of the rotation of the LC directors at the LC director plane or the handedness of the helical structures of the PVH 200) to a transmitted light beam (the $0^{th}$ order). In some embodiments, the diffracted light beam output from the PVH 200 may be a circularly polarized light beam with a handedness reversed by the transmissive PVH 200. In some embodiments, the transmitted light beam may be a circularly polarized light beam with a handedness substantially maintained by the transmissive PVH 200. Thus, the transmissive PVH 200 may provide a polarization conversion to a light beam in addition to diffraction. For discussion purposes, FIG. 2A shows the PVH 200 is a right-handed transmissive PVH, which is configured to primarily forwardly diffract an RHCP light beam 230 as an LHCP light beam 240, and primarily transmit (e.g., with negligible diffraction) an LHCP light beam 235 to the $0^{th}$ order as an LHCP light beam 245. In some embodiments, the diffracted light beam may be an elliptically polarized light beam or a linearly polarized light beam. In some embodiments, the transmitted light beam may be an elliptically polarized light beam or a linearly polarized light beam.

FIG. 2B illustrates diffraction orders of a reflective PVH 250, according to an embodiment of the present disclosure. The reflective PVH 250 may be configured to primarily backwardly diffract a circularly polarized light beam (or an elliptically polarized light beam) having a predetermined handedness (e.g., a handedness that is the same as the handedness of the helical structures in the PVH 250) to a diffracted light beam (e.g., the first order diffracted light beam), and primarily transmit (e.g., with negligible diffraction) a circularly polarized light beam having a handedness that is opposite to the predetermined handedness (e.g., a handedness that is opposite to the handedness of the helical structures in the PVH) to a transmitted light beam (the $0^{th}$ order). In some embodiments, the diffracted light beam may be a circularly polarized light beam with a handedness substantially maintained by the reflective PVH 250. In some embodiments, the transmitted light beam may be a circularly polarized light beam with a handedness substantially maintained by the reflective PVH 250. For discussion purposes, FIG. 2B shows that the reflective PVH 250 is a right-handed reflective PVH, which is configured to primarily backwardly diffract an RHCP light beam 230 as an RHCP light beam 260, and primarily transmit (e.g., with negligible diffraction) an LHCP light beam 235 to the $0^{th}$ order as an LHCP light beam 265. In some embodiments, the reflective PVH 250 may change the polarization of the diffracted light beam and/or transmitted light beam. In some embodiments, diffracted light beam may be an elliptically polarized light beam or a linearly polarized light beam. In some embodiments, the transmitted light beam may be an elliptically polarized light beam or a linearly polarized light beam.

Figure 3A:
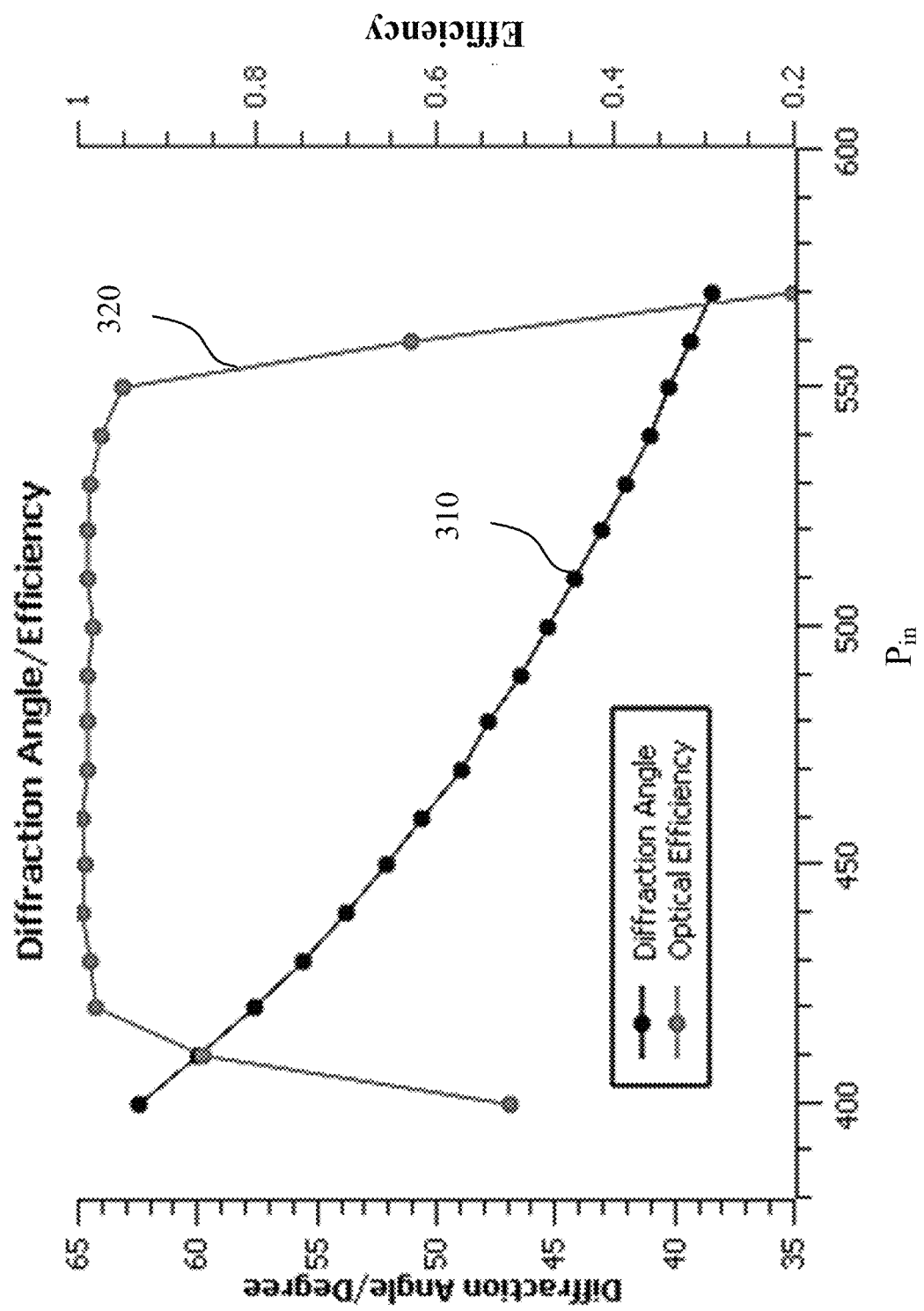

FIGS. 3A and 3B illustrate simulation results of diffraction angle and diffraction efficiency as a function of an in-plane pitch $P_{in}$ of a PVH for a visible incident light beam, according to an embodiment of the present disclosure. As shown in FIG. 3A, the horizontal axis is the in-plane pitch $P_{in}$ (unit: nm) of the PVH, the left vertical axis is the diffraction angle (unit: degree) of a first order diffracted light beam of the PVH, and the right vertical axis is the diffraction efficiency of the first order diffracted light beam. Curves 310 and 320 show the simulated diffraction angle and diffraction efficiency of the first order diffracted light beam as a function of the in-plane pitch $P_{in}$ of the PVH. The vertical pitch of the PVH is 205 nm. The LC materials forming the PVH may have $n_e=1.505$ and $n_e=1.655$. Thus, the refractive index of the PVH may be 1.58. An incident light beam of the PVH has a handedness that is the same as the handedness of the helical structures of the PVH. The wavelength of the incident light beam is 560 nm, and the incidence angle of the incident light beam is zero. The diffraction angle and diffraction efficiency of the first order diffracted light beam vary when the in-plane pitch $P_{in}$ of the PVH changes in the visible spectrum, e.g., from 400 nm to 600 nm. The diffraction angle of the first order diffracted light beam is calculated by both Finite-Difference Time-Domain method ("FDTD") and the grating equation, and the diffraction efficiency of the first order diffracted light beam is calculated by FDTD. Table 1 in FIG. 3B shows the calculated diffraction angle and diffraction efficiency of the first order diffracted light beam.

As shown in FIGS. 3A and 3B, as the in-plane pitch $P_{in}$ of the PVH gradually increases from 400 nm to 600 nm, the diffraction angle of the first order diffracted light beam gradually decreases from about 62.4° to 36.2°. The diffraction efficiency of the first order diffracted light beam first increases from 0.52 (52%) to 0.98 (98%) as the in-plane pitch $P_{in}$ of the PVH increases from 400 nm to 420 nm. As the in-plane pitch $P_{in}$ of the PVH increases from 420 nm to 540 nm, the diffraction efficiency of the first order diffracted light beam remains substantially the same, which is in a range of 0.99 (99%) to 0.97 (97%). As the in-plane pitch $P_{in}$ of the PVH further increases from 540 nm to 600 nm, the diffraction efficiency of the first order diffracted light beam decreases rapidly from 0.97 (97%) to 0.27 (27%). Referring to FIGS. 3A and 3B, as the in-plane pitch $P_{in}$ of the PVH is tuned in the range of 420 nm to 540 nm, the PVH may provide an about 20° steering range with a large diffraction efficiency (e.g., larger than 90%). A broader steering angular range may be achieved by stacking two or more PVHs.

Figure 3C:
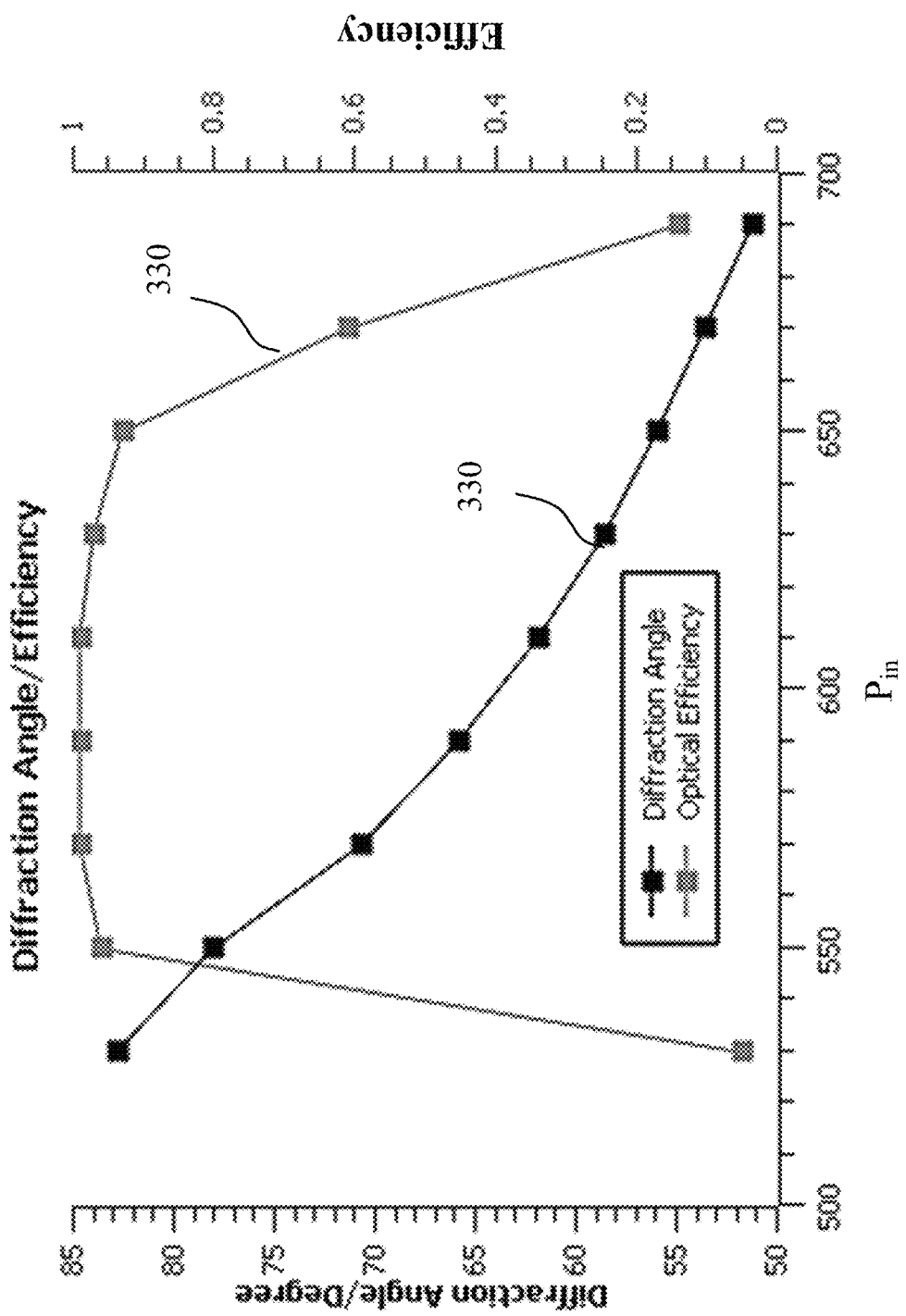

FIGS. 3C and 3D illustrate simulation results of diffraction angle and diffraction efficiency as a function of an in-plane pitch $P_{in}$ of a PVH for a near infrared incident light beam, according to an embodiment of the present disclosure. As shown in FIG. 3C, the horizontal axis is the in-plane pitch $P_{in}$ (unit: nm) of the PVH, the left vertical axis is the diffraction angle (unit: degree) of a first order diffracted light beam of the PVH, and the right vertical axis is the diffraction efficiency of the first order diffracted light beam. Curves 430 and 340 in FIG. 3C show the calculated diffraction angle and diffraction efficiency of the first order diffracted light beam as a function of the in-plane pitch $P_{in}$ of the PVH. The vertical pitch of the PVH is 350 nm. The LC materials forming the PVH may have $n_e$=1.505 and $n_o$=1.655. Thus, the refractive index of the PVH may be 1.58. An incident light beam of the PVH has the same handedness as that of the helical twist of the PVH. The wavelength of the incident light beam is 850 nm, and the incidence angle of the incident light beam is zero degree. The diffraction angle and diffraction efficiency of the first order diffracted light beam vary when the in-plane pitch $P_{in}$ of the PVH changes from 530 nm to 690 nm. The diffraction angle and diffraction efficiency of the first order diffracted light beam are calculated by FDTD. Table 2 in FIG. 3D shows the calculated diffraction angle and diffraction efficiency of the of the first order diffracted light beam.

As shown in FIGS. 3C and 3D, as the in-plane pitch $P_{in}$ of the PVH gradually increases from 530 nm to 690 nm, the diffraction angle of the first order diffracted light beam gradually decreases from about 82.7° to 51.2°. The diffraction efficiency of the first order diffracted light beam first increases from 0.05 (5%) to 0.96 (96%) as the in-plane pitch $P_{in}$ of the PVH increases from 530 nm to 550 nm. As the in-plane pitch $P_{in}$ of the PVH increases from 550 nm to 650 nm, the diffraction efficiency of the first order diffracted light beam remains substantially the same, which is in a range of 0.99 (99%) to 0.93 (93%). As the in-plane pitch $P_{in}$ of the PVH further increases from 650 nm to 690 nm, the diffraction efficiency of the first order diffracted light beam decreases rapidly from 0.93 (93%) to 0.14 (14%). Referring to FIGS. 3C and 3D, as the in-plane pitch $P_{in}$ of the PVH is tuned in the range of 550 nm to 650 nm, the PVH may provide about a 20° steering range with a large diffraction efficiency (e.g., larger than 90%). A broader steering angular range may be achieved by stacking two or more PVHs.

Figure 4A:
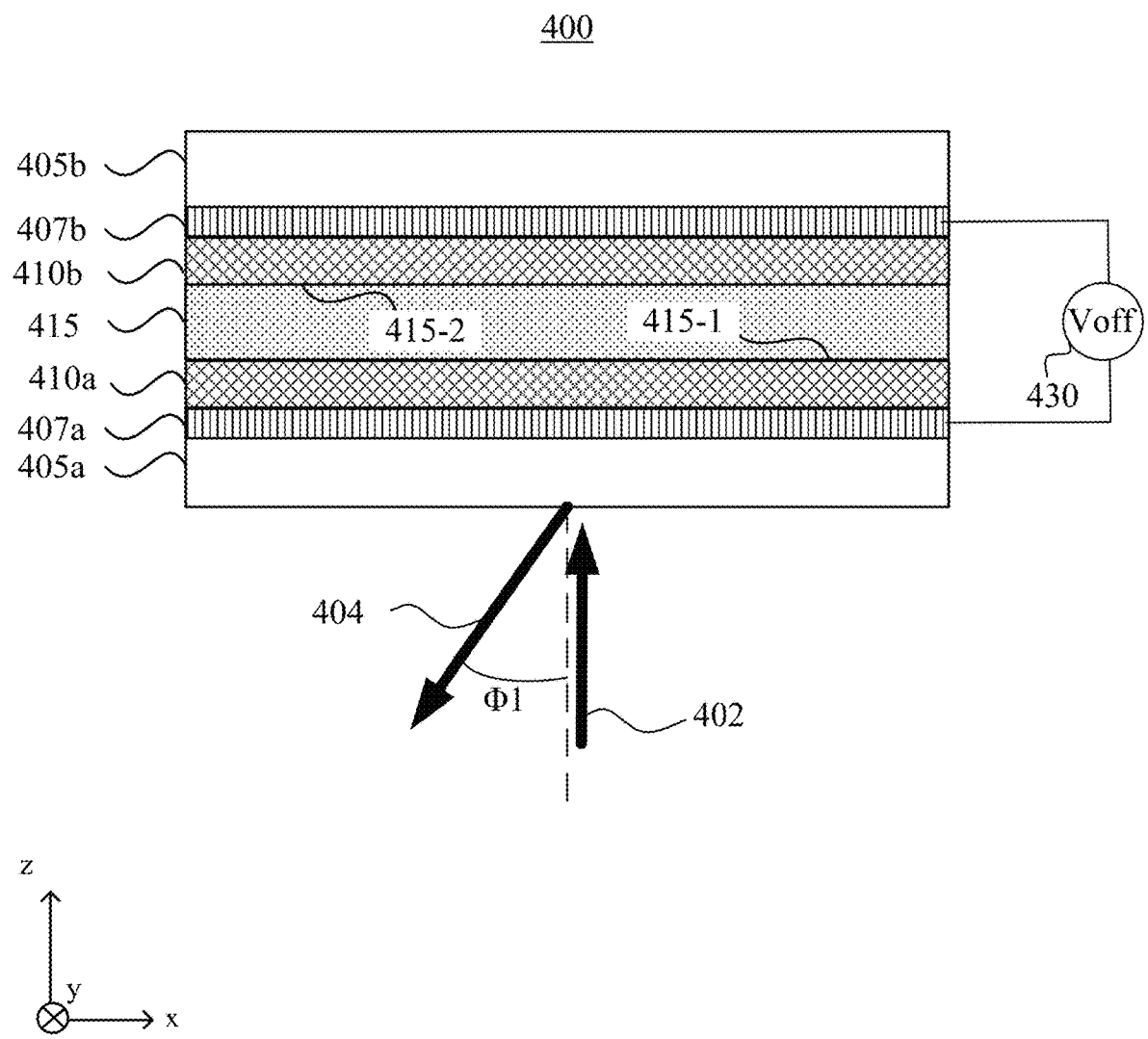
FIG. 4A illustrates a schematic diagram of a beam steering device operating at voltage-off state, according to an embodiment of the present disclosure.

FIG. 4A illustrates an x-z sectional view of a beam steering device 400, according to an embodiment of the present disclosure. As shown in FIG. 4A, the beam steering device 400 may include a first substrate 405a and a second substrate 405b, and a PVH 415 disposed between the first and second substrates 405a and 405b. In some embodiments, the beam steering device 400 may include a first alignment structure 410a and a second alignment structure 410b, which may be disposed at two inner surfaces of the first and second substrates 405a and 405b that face each other, respectively. The PVH 415 may be in contact with both of the first and second alignment structures 410a and 410b. In some embodiments, the beam steering device 400 may include a first electrode 407a and a second electrode 407b disposed at the first substrate 405a and the second substrate 405b, respectively. The first and second electrodes 407a and 407b may be configured to apply a driving voltage provided by a power source 430 to the PVH 415.

The substrates 405a and 405b may be configured to provide support and/or protection to various layers, films, and/or structures disposed at (e.g., on or between) the substrate 405a and 405b. In some embodiments, at least one of the first substrate 405a or the second substrate 405b may be optically transparent (e.g., having a light transmittance of at least about 60% or more) in at least a visible spectrum (e.g., wavelength ranging from about 380 nm to about 700 nm). In some embodiments, at least one of the first substrate 405a or the second substrate 405b may also be transparent in at least a portion of the infrared ("IR") spectrum (e.g., wavelength ranging from about 700 nm to about 1 mm). In some embodiments, the substrates 405a and 405b may include a suitable material that is substantially transparent to light beams of the above-listed wavelength ranges, such as, a glass, a plastic, a sapphire, a polymer, a semiconductor, or a combination thereof, etc. The substrates 405a and 405b may be rigid, semi-rigid, flexible, or semi-flexible. In some embodiments, the substrates 405a and 405b may have one or more surfaces in a flat, a convex, a concave, an asphere, or a freeform shape. In some embodiments, at least one of the first substrate 405a or the second substrate 405b may be a part of another optical element or device, or a part of another opto-electrical element or device. For example, at least one of the first substrate 405a or the second substrate 405b may be a solid optical lens or a part of a solid optical lens, or a part of a functional device (e.g., a display screen).

The PVH 415 may include a birefringent medium layer, which may include LC molecules arranged in a suitable 3D orientation pattern, such as that shown in FIG. 1B, FIG. 1C or FIG. 1D. The PVH 415 may have a first surface 415-1 and a second surface 415-2 facing the first surface 415-1. In some embodiments, the first surface 415-1 may also be an interface between the PVH 415 and the first alignment structure 410a, and the second surface 415-2 may also be an interface between the PVH 415 and the second alignment structure 410b. Although the body of the PVH 415 is shown as flat for illustrative purposes, the body of the PVH 415 may have a curved shape. The first alignment structure 410a and the second alignment structure 410b may be configured to provide a surface alignment to the LC molecules of the PVH 415 that are in close proximity to (including in contact with) the respective alignment structure (or respective interface). In some embodiments, the first alignment structure 410a and the second alignment structure 410b may be configured to provide parallel surface alignments, anti-parallel surface alignments, or hybrid surface alignments (e.g., between parallel and anti-parallel surface alignments) to the LC molecules in contact with the alignment structure.

In some embodiments, at least one (e.g., each) of the first alignment structure 410a or the second alignment structure 410b may be configured to provide a periodic surface alignment pattern (or periodic surface anchoring conditions) to the LC molecules of the PVH 415 that are in close proximity to (including LC molecules that are in contact with) the alignment structure (the interface), thereby aligning the LC molecules of the PVH 415 that are in close proximity to (including in contact with) the alignment structure (or the interface) with LC directors arranged in a periodic LC director in-plane orientation pattern, such as the pattern shown in FIG. 1E, FIG. 1F, or FIG. 1G. In some embodiments, the periodic LC director in-plane orientation patterns provided by the first alignments structure 410a and the second alignment structure 410b may have a substantially same in-plane pitch. In some embodiments, one of the first alignment structure 410a and the second alignment structure 410b may be omitted, and the beam steering device 400 may include one alignment structure disposed at an inner surface of the substrate 405a or 405b.

The first and second alignment structures 410a and 410b may be any suitable alignment structures. For example, the first alignment structure 410a or the second alignment structure 410b may include a polyimide layer, a PAM layer, a plurality of nanostructures or microstructures, an alignment network, or any combination thereof. For example, in some embodiments, the first alignment structure 410a and/or the second alignment structure 410b may include a PAM layer. In some embodiments, the first alignment structure 410a and/or the second alignment structure 410b may include a polymer layer with anisotropic nano-imprint. In some embodiments, the first alignment structure 410a and/or the second alignment structure 410b may include a polymer layer with anisotropic nano-imprint. In some embodiments, the first alignment structure 410a and/or the second alignment structure 410b may include a plurality of microstructures, such as a surface relief grating ("SRG") coated with or without additional alignment materials (e.g., polyimides). In some embodiments, the first alignment structure 410a and/or the second alignment structure 410b may include a ferroelectric or ferromagnetic material configured to provide a surface alignment in a presence of a magnetic field or an electric field.

The first and second electrodes 407a and 407b may be configured to provide a voltage to the PVH 415 to adjust an in-plane pitch $P_{in}$ of the PVH 415, thereby tuning the diffraction angle of a light beam diffracted by the PVH 415. In some embodiments, the first electrode 407a may be disposed between the first substrate 405a and the first alignment structure 410a, and the second electrode 407b may be disposed between the second substrate 405b and the second alignment structure 410b. In some embodiments, both of the first and second electrode 407a and the electrode 407b may be disposed at the same substrate (e.g., at the first substrate 405a or the second substrate 405b), and an electrical insulating layer may be disposed between the first and second electrodes 407a and 407b. The first electrode 407a or the second electrode 407b may be a continuous planar electrode, a patterned planar electrode, or a protrusion electrode. The first and second electrodes 407a and 407b may be any suitable conductive electrodes, such as indium tin oxide ("ITO") electrodes. In some embodiments, the first and second electrodes 407a and 407b may include a flexible transparent conductive layer, such as ITO disposed on a plastic film. In some embodiments, the plastic film may include polyethylene terephthalate ("PET"). In some embodiments, the plastic film may include cellulose triacetate ("TAC"), which is a type of flexible plastic with a substantially low birefringence. For discussion purposes, FIG. 4A shows that the first and second electrode 407a and 407b are planar electrodes disposed at different substrates 405a and 405b.

Figure 4B:
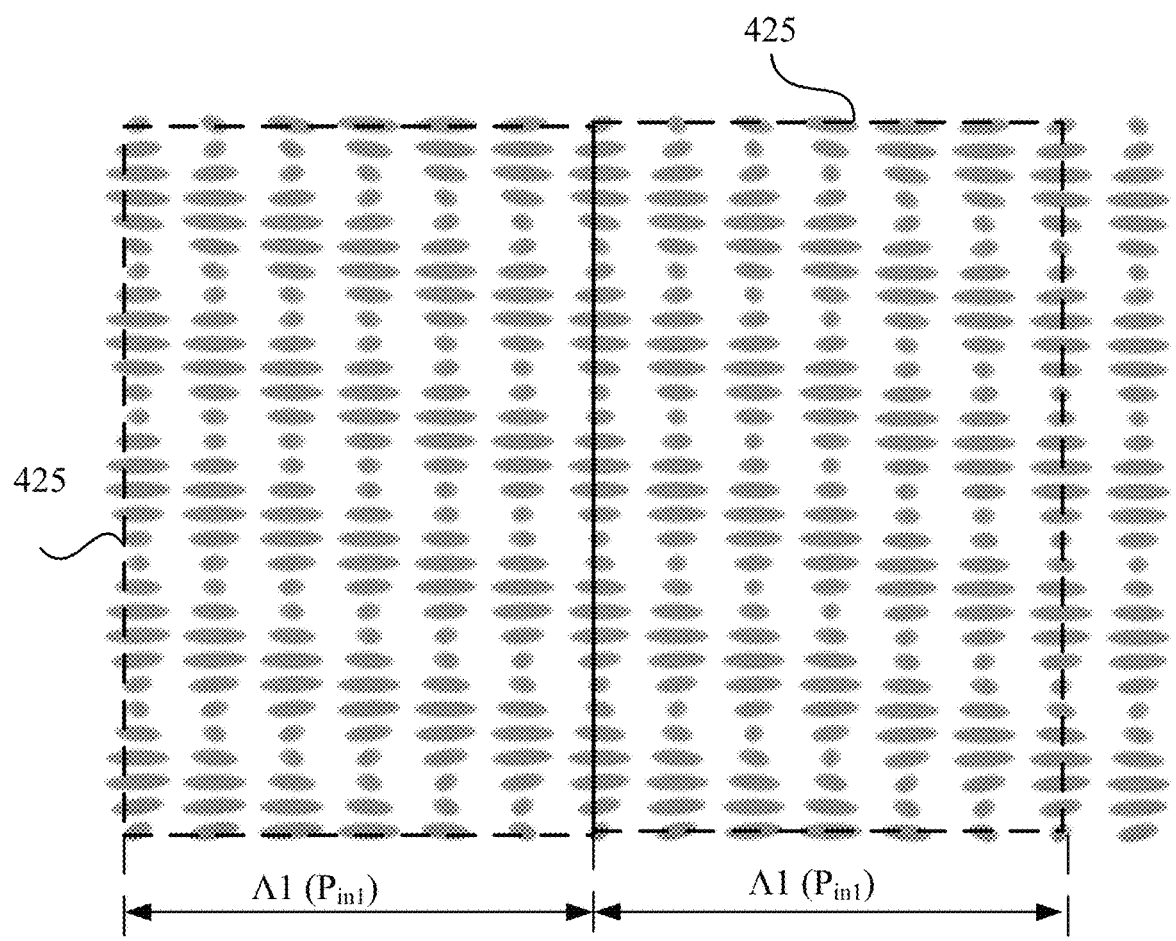
FIG. 4B illustrates a portion of a schematic 3D orientational pattern of optically anisotropic molecules of a PVH included in the beam steering device shown in FIG. 4A, according to an embodiment of the present disclosure.

FIG. 4B illustrates a portion of 3D orientational patterns of the LC molecules of the PVH 415 when the beam steering device 400 operates at a voltage-off state. For discussion purposes, the PVH 415 may include LC molecules arranged in a 3D orientation pattern that is the same as or similar to that shown in FIG. 2B. As shown in FIG. 4B, the PVH 415 may include LC materials with a strong flexoelectric effect (e.g., twist bend nematic LCs), which may exhibit a plurality of flexodomains ("FDs") 425 arranged in a spatially periodic pattern with a uniform pitch Λ1. The pitch Λ1 may be equal to the dimension along the width direction (e.g., an x-axis direction) of a single FD 425, or the pitch Λ1 may be the distance along the x-direction between repeated portions of the pattern. The pitch Λ1 of the FDs 425 in the PVH 415 may be equal to the in-plane pitch $P_{in1}$ of the PVH 415. A single FD 425 may extend in a direction parallel to a length direction of the single FD 425 (e.g., a y-axis direction). For illustrative purposes, FIG. 4B shows two FDs 425, with each single FD 425 denoted by a dashed box.

The structures of the FDs 425 in the PVH 415 may be controlled by various factors, such as the amplitude and/or frequency of the driving voltage provided by the power source 430, the operating temperature, etc. In some embodiments, the driving voltage provided by the power source 430 may be a direct current ("DC") voltage or an ultra-low frequency alternating current ("AC") voltage (e.g., 0.01 Hz AC voltage). For illustrative purposes, FIG. 4A shows that a circularly polarized light beam 402 having a handedness that is the same as the handedness of the helical twists of the PVH 415 is substantially normally incident onto the beam steering device 400. The beam steering device 400 operating at a voltage-off state may diffract the light beam 402 to a first order diffracted light beam 404 with a diffraction angle Φ1. The diffraction angle Φ1 is an angle between the diffracted light beam 404 and the normal of the light beam incident surface. The first order diffracted light beam 404 may be a circularly polarized light beam having a handedness that is the same as the handedness of the light beam 402.

Figure 4C:
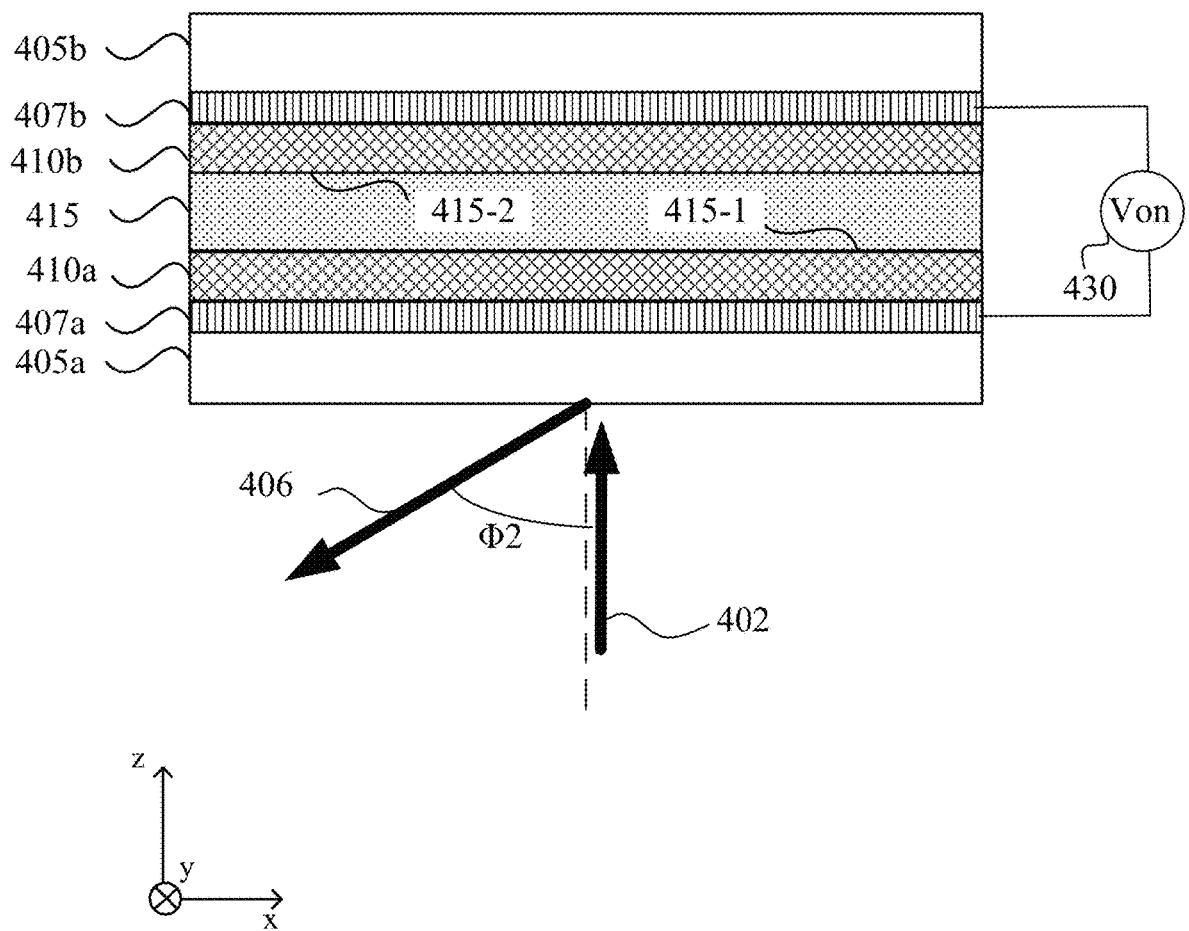
FIG. 4C illustrates a schematic diagram of the beam steering device shown in FIG. 4A operating at a voltage-on state, according to an embodiment of the present disclosure.
Figure 4D:
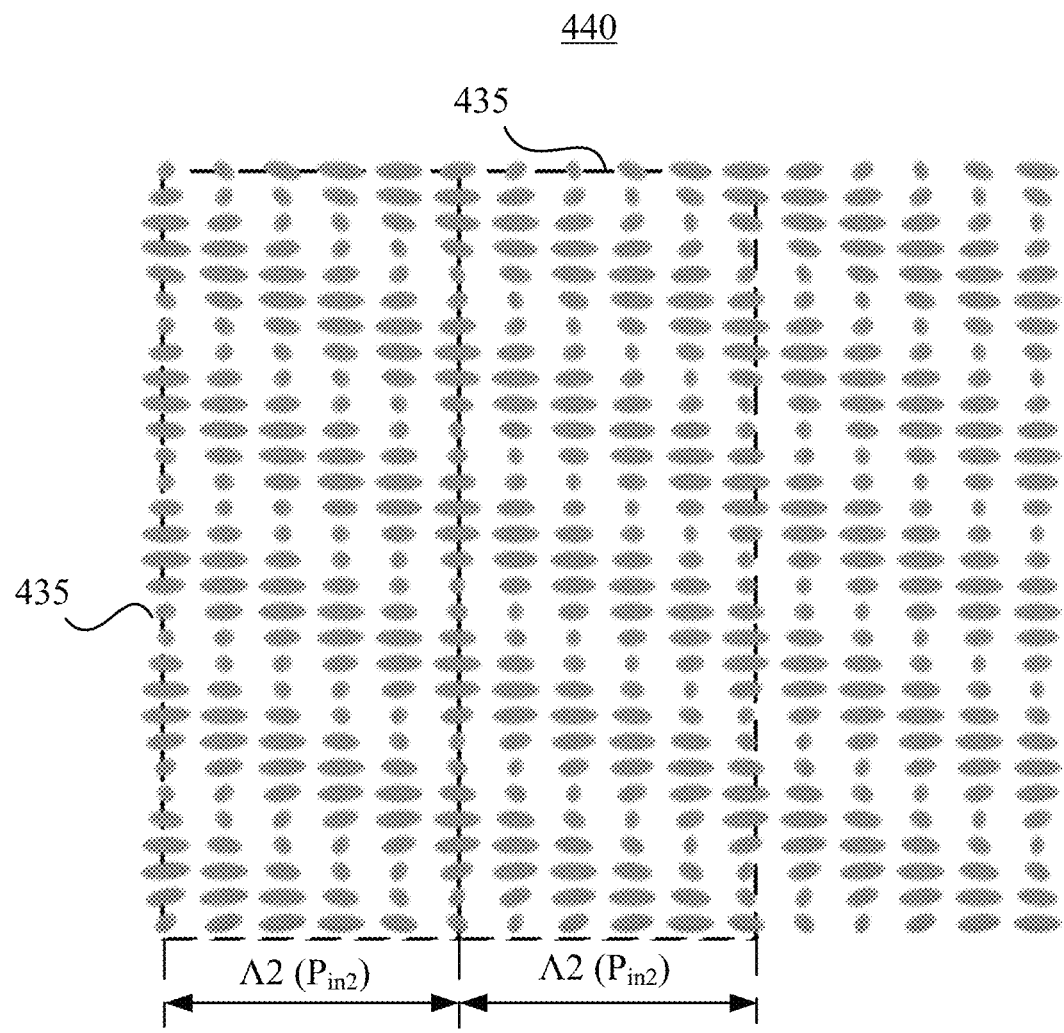
FIG. 4D illustrates a portion of a 3D orientational pattern of the LC molecules of the PVH included in the beam steering device in FIG. 4C, according to an embodiment of the present disclosure.

FIG. 4C illustrates a schematic diagram of the beam steering device 400 shown in FIG. 4A operating at a voltage-on state. FIG. 4D illustrates a portion of 3D orientational patterns of the LC molecules of the PVH 415 when the beam steering device 400 operates at the voltage-on state. As shown in FIG. 4D, when a driving voltage provided by the power source 430 is applied to the beam steering device 400, the pitch Λ2 of the FDs 425 may decrease (i.e., smaller than Λ1 of the FDs 425 shown in FIG. 4B). Accordingly, the in-plane pitch $P_{in2}$ of the PVH 415 may decrease (i.e., smaller than $P_{in1}$ of the PVH 415 shown in FIG. 4B), which may result in an increase in the diffraction angle. For illustrative purposes, FIG. 4D shows two FDs 425 with a reduced pitch Λ2, with each single FD 425 denoted by a dashed box. FIG. 4C shows that when the circularly polarized light beam 402 having a handedness that is the same as the handedness of the helical twists of the PVH 415 is substantially normally incident onto the beam steering device 400, the beam steering device 400 operating at the voltage-on state may diffract the light beam 402 to a first order diffracted light beam 406 with a diffraction angle Φ2. The first order diffracted light beam 406 may be a circularly polarized light beam having a handedness that is the same as the handedness of the light beam 402. The diffraction angle Φ2 of the first order diffracted light beam 406 shown in FIG. 4C is larger than the diffraction angle Φ1 of the first order diffracted light beam 404 shown in FIG. 4A. As the driving voltage applied to the beam steering device 400 further increases, the pitch Λ of the FDs may further decrease. That is, as the driving voltage applied to the beam steering device 400 further increases, the in-plane pitch $P_{in}$ of the PVH 415 may further decrease. Accordingly, the diffraction angle of the first order diffracted light beam may further increase.

When the incident light beam 402 is an unpolarized light beam or a linearly polarized light beam, the incident light beam 402 may be decomposed into two circularly polarized components with opposite handedness. The beam steering device 400 may primarily diffract one circularly polarized component having a handedness that is the same as the handedness of the helical twists of the PVH 415, and primarily transmit (e.g., with negligible diffraction) the other circularly polarized component having a handedness that is opposite to the handedness of the helical twists of the PVH 415. The diffraction angle of a diffracted light beam (e.g., first order diffracted light beam) may increase as the driving voltage applied to the beam steering device 400 increases.

The beam steering device 400 may be configured to provide a continuous beam steering or a discrete beam steering. For example, when the driving voltage applied to the beam steering device 400 continuously changes, the beam steering device 400 may provide a continuous beam steering to a circularly polarized incident light beam (or component) having a handedness that is the same as the handedness of the helical twists of the PVH 415. When the driving voltage applied to the beam steering device 400 discretely changes, the beam steering device 400 may provide a discrete beam steering to a circularly polarized incident light beam (or component) having a handedness that is the same as the handedness of the helical twists of the PVH 415. In some embodiments, the PVH 415 included in the beam steering device 400 may be a transmissive PVH (e.g., having a 3D orientation pattern of LC molecules shown in FIG. 1D), and the beam steering device 400 may be configured to provide a polarization conversion in addition to a beam steering, as the transmissive PVH diffracts an input light beam and changes the handedness of the diffracted light beam to be opposite to that of the input light beam.

Figure 5A:
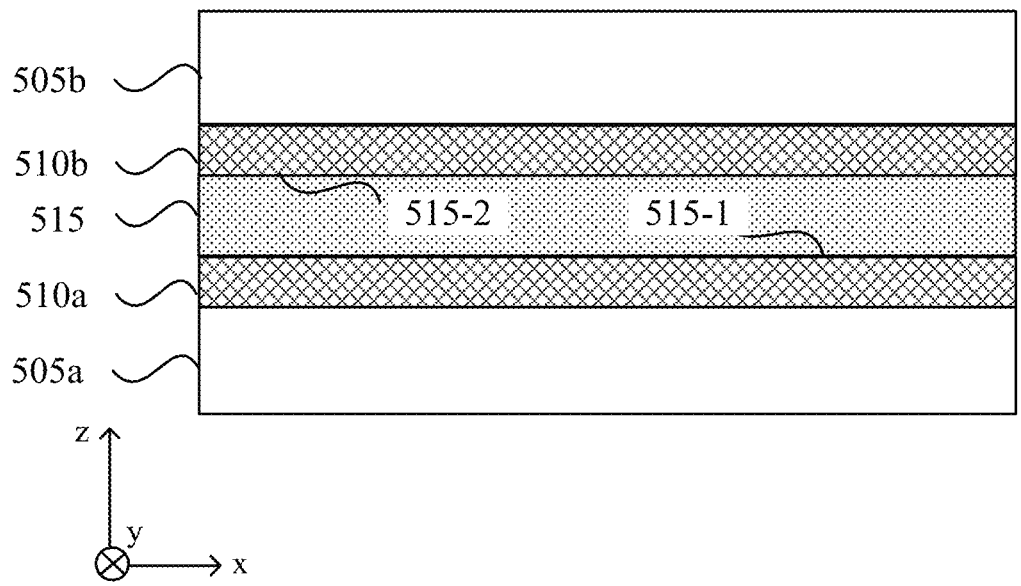
FIG. 5A illustrates a schematic diagram of a beam steering device, according to another embodiment of the present disclosure.

FIG. 5A illustrates a schematic diagram of a beam steering device 500, according to another embodiment of the present disclosure. The beam steering device 500 shown in FIG. 5A may include elements that are the same as or similar to those included in the beam steering device 400 shown in FIG. 4A. Detailed descriptions of the same or similar elements may refer to the above descriptions rendered in connection with FIG. 4A. As shown in FIG. 5A, the beam steering device 500 may include a first substrate 505a and a second substrate 505b, and a PVH 515 disposed between the first substrate 505a and the second substrate 505b. The first and second substrates 505a and 505b may be the same as or similar to the first and second substrates 405a and 405b shown in FIG. 4A. In some embodiments, the beam steering device 500 may also include a first alignment structure 510a and a second alignment structure 510b, which may be disposed at tow inner surfaces of the first and second substrates 505a and 505b that face each other, respectively.

The PVH 515 may include a birefringent medium layer, which may include LC molecules arranged in a suitable 3D orientation pattern, such as that shown in FIG. 1B, FIG. 1C or FIG. 1D. The PVH 515 may have a first surface 515-1 and a second surface 515-2 facing the first surface 515-1. In some embodiments, the first surface 515-1 may also be an interface between the PVH 515 and the first alignment structure 510a, and the second surface 515-2 may also be an interface between the PVH 515 and the second alignment structure 510b. Although the body of the PVH 515 is shown as flat for illustrative purposes, the body of the PVH 515 may have a curved shape. The first and second alignment structures 510a and 510b may be configured to provide a surface alignment to the LC molecules of the PVH 515 that are in close proximity to (including in contact with) the respective alignment structure (or respective interface). In some embodiments, the first and second alignment structures 510a and 510b may be configured to provide parallel surface alignments, anti-parallel surface alignments, or hybrid surface alignments (e.g., between parallel and anti-parallel surface alignments) to the LC molecules in contact with the alignment structure. In some embodiments, one of the first alignment structure 510a and the second alignment structure 510b may be omitted, and the beam steering device 500 may include one alignment structure disposed at an inner surface of the first substrate 505a or the second substrate 505b.

In some embodiments, at least one (e.g., each) of the first alignment structure 510a or the second alignment structure 510b may include a photo-alignment material ("PAM") layer, which may be configured to provide a periodic surface alignment pattern (or periodic surface anchoring conditions) to the LC molecules of the PVH 515 that are in close proximity to (including in contact with) the alignment structure (the interface), thereby aligning the LC molecules of the PVH 515 that are in close proximity to (including in contact with) the alignment structure (or the interface) to have a periodic LC director in-plane orientation pattern, such as the pattern shown in FIG. 1E, FIG. 1F, or FIG. 1G. In some embodiments, the periodic LC director in-plane orientation pattern may have a substantially same in-plane pitch.

In some embodiments, the PAM layer may include polarization sensitive and rewritable organic materials (e.g., rewritable photo-alignment materials ("PAMs")). Due to the rewritability of the polarization sensitive organic materials, the periodicity of the periodic surface alignment pattern (or periodic surface anchoring conditions) provided by the PAM layer may be tunable. In some embodiments, the periodic surface alignment pattern (or periodic surface anchoring conditions) provided by the PAM layer may be generated by exposing the PAM layer to a polarization interference pattern of two coherent circularly polarized light beams with opposite handednesses. A periodicity of the polarization interference pattern may be determined by an angle between the two coherent circularly polarized light beams with opposite handednesses. Thus, through changing the angle between the two coherent circularly polarized light beams with opposite handedness, the periodicity of the polarization interference pattern may be tunable. Accordingly, the periodicity of the periodic surface alignment pattern (or periodic surface anchoring conditions) provided by the PAM layer may be tunable. In a range substantially close to (including at) the surface (515-1 or 515-2) of the PVH 515, local optic axes orientations of the PVH 515 (or LC directors of the LC molecules in the PVH 515) may follow the periodic surface alignment pattern of the PAM layer. Thus, the in-plane pitch $P_{in}$ of the PVH 515 may be tunable, which may result in a tunable diffraction angle.

Figure 5B:
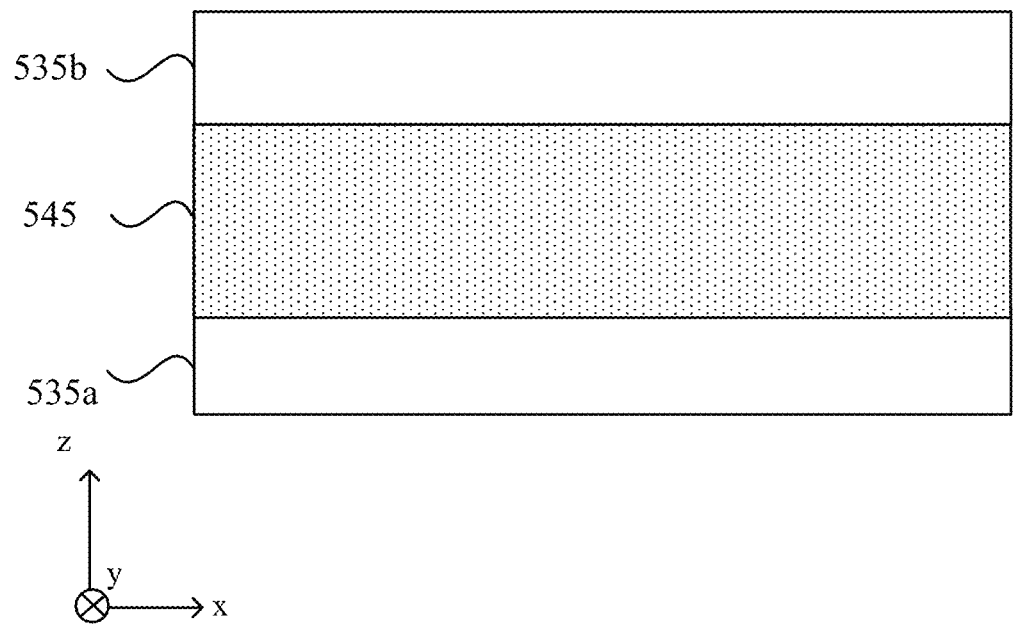
FIG. 5B illustrates a schematic diagram of a beam steering device, according to another embodiment of the present disclosure.

FIG. 5B illustrates a schematic diagram of a beam steering device 530, according to another embodiment of the present disclosure. The beam steering device 530 may include elements that are the same as or similar to those included in the beam steering device 400 shown in FIG. 4A, and/or the beam steering device 500 shown in FIG. 5A. Detailed descriptions of the same or similar elements may refer to the above descriptions rendered in connection with FIG. 4A and/or FIG. 5A. As shown in FIG. 5B, the beam steering device 530 may include a first substrate 535a and a second substrate 535b, and a PVH 545 disposed between the first and second substrates 535a and 535b. The first and second substrates 535a and 535b may be the same as or similar to the first and second substrates 405a and 405b shown in FIG. 4A. The PVH 545 may include a birefringent medium layer, which may include LC molecules arranged in a suitable 3D orientation pattern, such as that shown in FIG. 1B, FIG. 1C, or FIG. 1D. Although the body of the PVH 545 is shown as flat for illustrative purposes, the body of the PVH 545 may have a curved shape.

In some embodiments, the PVH 545 may be fabricated based on a photo-reactive material, which may include polarization sensitive and rewritable organic materials (e.g., re-writable photo-alignment materials ("PAMs")). The photo-reactive material may generate a photo-induced birefringence and a photo-induced orientational order of optically anisotropic molecules when exposed under a polarized light irradiation. For example, a photo-reactive material may be first filled into a cell formed by the first and second substrates 535a and 535b. The cell may be subjected to a polarization interference exposure formed by two coherent circularly polarized light beams with opposite handednesses to record a 3D polarization field into the photo-reactive material. In some embodiments, after annealing at an elevated temperature, the photo-induced birefringence of the photo-reactive material may increase. Due to the rewritability of the polarization sensitive organic materials included in the photo-reactive material based on which the PVH 545 is fabricated, a periodicity of the 3D polarization field recorded into the photo-reactive material may be tunable through changing the angle between the two coherent circularly polarized light beams with opposite handednesses. As a result, the in-plane pitch $P_{in}$ of the PVH 545 may be tunable, which results in a tunable diffraction angle.

Figure 5C:
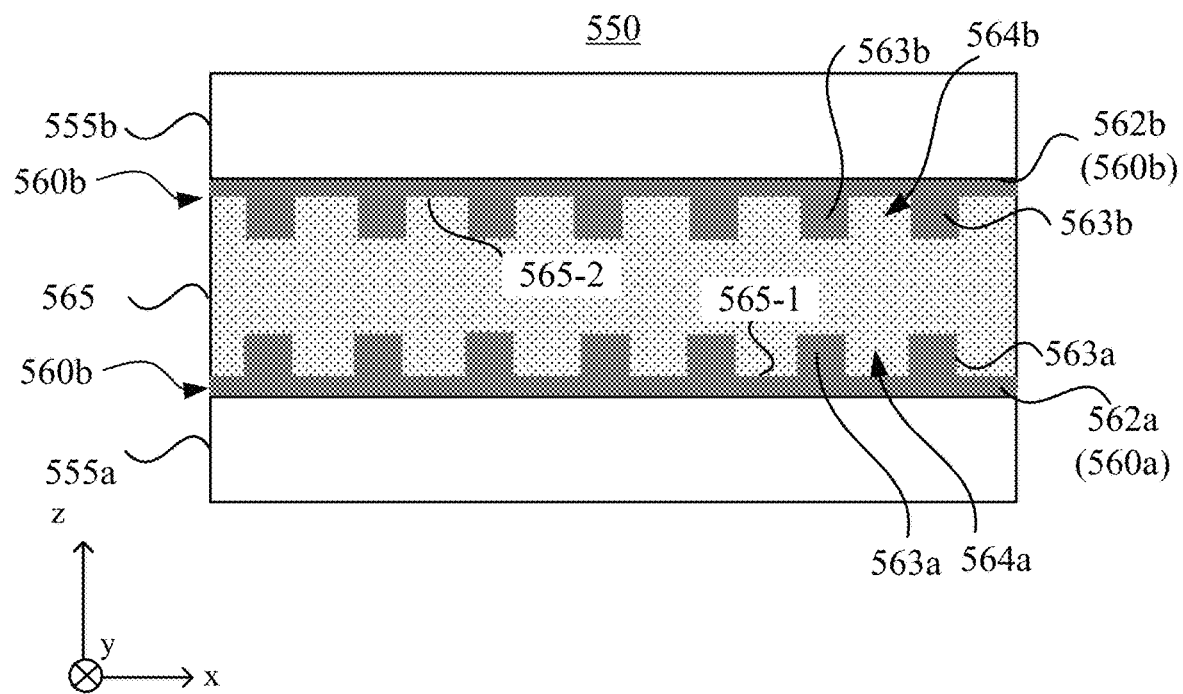
FIG. 5C illustrates a schematic diagram of a beam steering device, according to another embodiment of the present disclosure.

FIG. 5C illustrates a schematic diagram of a beam steering device 550, according to another embodiment of the present disclosure. The beam steering device 550 shown in FIG. 5C may include elements that are the same as or similar to those included in the beam steering device 400 shown in FIG. 4A, the beam steering device 500 shown in FIG. 5A, and/or the beam steering device 530 shown in FIG. 5B. Detailed descriptions of the same or similar elements may refer to the above descriptions rendered in connection with FIGS. 4A, 5A, and/or 5B. As shown in FIG. 5C, the beam steering device 550 may include a first substrate 555a and a second substrate 555b, and a PVH 565 disposed between the first substrate 555a and second substrate 555b. The first substrate 555a and second substrate 555b may be the same as or similar to the first and second substrates 405a and 405b shown in FIG. 4A. In some embodiments, the beam steering device 550 may also include a first alignment structure 560a and a second alignment structure 560b, which may be disposed at two inner surfaces of the first and second substrates 555a and 555b that face each other, respectively. In this embodiment, the first alignment structure 560a may be provided by, or may include, a first surface relief grating ("SRG") 562a, and the second alignment structure 560b may be provided by, or may include, a second SRG 562b. The first SRG 562a and the second SRG 562b may be fabricated based on a material that can provide a surface alignment to anisotropic molecules included in the PVH 565. In some embodiments, the first SRG 562a and the second SRG 562b may include an organic material, such as a polymer, photo-crosslinkable pre-polymeric compositions, reactive mesogens ("RMs"), or a combination thereof. In some embodiments, the first SRG 562a or second SRG 562b include an inorganic material, such as an inorganic material for manufacturing metasurfaces. The materials of the first SRG 562a or second SRG 562b may be isotropic or anisotropic. In some embodiments, the first SRG 562a or second SRG 562b may be nano-fabricated from a resist material that may be transparent or partially transparent to light beams in a range of electromagnetic frequencies, such as light beams in the visible wavelength range and/or infrared wavelength range. The resist material may be in a form of a thermoplastic, a polymer, an optically transparent photoresist, or a combination thereof. In some embodiments, after being set or cured, the resist material may provide an alignment to optically anisotropic molecules filled into the one or more first grooves 564a or second grooves 564b of the first SRG 562a or second SRG 562b.

The PVH 565 may include a birefringent medium layer, which may include LC molecules arranged in a suitable 3D orientation pattern, such as that shown in FIG. 1B, FIG. 1C or FIG. 1D. The PVH 565 may have a first surface 565-1 and a second surface 565-2 facing the first surface 565-1. In some embodiments, the first surface 565-1 may also be an interface between the PVH 565 and the first alignment structure 560a (or first SRG 562a), and the second surface 565-2 may also be an interface between the PVH 565 and the second alignment structure 560b (or second SRG 562b). Although the body of the PVH 565 is shown as flat for illustrative purposes, the body of the PVH 565 may have a curved shape. The first alignment structure 560a and second alignment structure 560b (or first SRG 562a and second SRG 562b in this embodiment) may be configured to provide a surface alignment to the LC molecules of the PVH 565 that are in close proximity to (including in contact with) the respective alignment structure (or respective interface). In some embodiments, the first alignment structure 560a and second alignment structure 560b (or first SRG 562a and second SRG 562b) may be configured to provide parallel surface alignments, anti-parallel surface alignments, or hybrid surface alignments (e.g., between parallel and anti-parallel surface alignments) to the LC molecules in contact with the alignment structure. In some embodiments, one of the first alignment structure 560a and the second alignment structure 560b (or one of the first SRG 562a and second SRG 562b) may be omitted.

The first SRG 562a and the second SRG 562b may be disposed at (e.g., bonded to or formed on) an inner surface of the first substrate 555a and the second substrate 555b. In some embodiments, at least one of the first SRG 562a or second SRG 562b may be integrally formed as a part of at least one of the first substrate 555a or second substrate 555b. In some embodiments, at least one of the first SRG 562a or second SRG 562b may be separately formed and disposed at (e.g., affixed to) an inner surface of at least one of the first substrate 555a or second substrate 555b. The first SRG 562a or second SRG 562b may include a first structure 563a or a second substrate 563b defining or having one or more first grooves 564a or second grooves 564b, respectively. A period of the first SRG 562a or second SRG 562b may be defined as a distance between centers of two adjacent grooves (e.g., two adjacent first grooves 564a or two adjacent second grooves 564b). At least one (e.g., each) of the one or more first grooves 564a or second grooves 564b may be at least partially provided (e.g., filled) with optically anisotropic molecules (e.g., LC molecules) included in the PVH 565.

In the disclosed embodiments, at least one of the first SRG 562a or second SRG 562b may be configured to provide a periodic surface alignment pattern (or periodic surface anchoring conditions) to the LC molecules of the PVH 565 that are in close proximity to (including in contact with) the alignment structure (the interface), thereby aligning the LC molecules of the PVH 515 that are in close proximity (including in contact with) to the alignment structure (or the interface) to have a periodic LC director in-plane orientation pattern, such as the pattern shown in FIG. 1E, FIG. 1F, or FIG. 1G. In some embodiments, a direction of periodicity of at least one of the first SRG 562a or second SRG 562b may determine the in-plane direction of the PVH 565. The periodicity of at least one of the first or second SRG 562a or 562b may determine the in-plane pitch $P_{in}$ of the PVH 565.

For example, in some embodiments, the in-plane direction of the PVH 565 may be parallel to the direction of periodicity of at least one of the first SRG 562a or second SRG 562b. In some embodiments, the in-plane pitch $P_{in}$ of the PVH 565 may be substantially the same as the period of at least one of the first SRG 562a or second SRG 562b. Thus, through adjusting the period of at least one of the first SRG 562a or second SRG 562b, the in-plane pitch $P_{in}$ of the PVH 565 may be tunable, which may result in a tunable diffraction angle of a diffracted light beam.

Returning to FIG. 5C, in some embodiments, each of the first SRG 562a and the second SRG 562b may be configured to provide a periodic surface alignment pattern (or periodic surface anchoring conditions) to LC molecules that are in close proximity (including in contact with) the respective SRG. That is, each of the first SRG 562a and the second SRG 562b may be configured to align the LC molecules of the PVH 565 that are in close proximity (including in contact with) to the respective SRG (or the respective interface) to have a periodic LC director in-plane orientation pattern. In some embodiments, the periodic LC director in-plane orientation patterns configured by the first SRG 562a and the second SRG 562b may have a substantially same in-plane pitch. The periodicity of the periodic surface alignment pattern (or periodic surface anchoring conditions) provided by each of the first SRG 562a and second SRG 562b may be tunable by an external field. In some embodiments, the first SRG 562a and the second SRG 562b may be stretchable or shrinkable by the external field (e.g., a mechanical force, an electric field) along the direction of periodicity of the respective SRG to tune periods of the first SRG 562a and the second SRG 562b, respectively. That is, the first SRG 562a and the second SRG 562b may have tunable periods. For example, when the first SRG 562a and the second SRG 562b are stretched or shrunk along the direction of periodicity of the respective SRG, the period of the first SRG 562a or second SRG 562b may be increased or decreased. Accordingly, the in-plane pitch $P_{in}$ of the PVH 565 may be increased or decreased, and the diffraction angle of a diffracted light beam may be decreased or decreased. The in-plane pitch $P_{in}$ of the PVH 565 may be linearly proportional to the period of the first SRG 562a or second SRG 562b. In some embodiments, the in-plane pitch $P_{in}$ of the PVH 565 may be substantially the same as the period of the first SRG 562a or second SRG 562b.

In some embodiments, the PVH 565 may include active LCs. In some embodiments, the PVH 565 may include passive LCs, e.g., polymerized RMs. In some embodiments, one of the first substrate 555a and the second substrate 555b may be omitted. In some embodiments, one of the first SRG 560a and the second SRG 560b may be omitted.

Figure 5D:
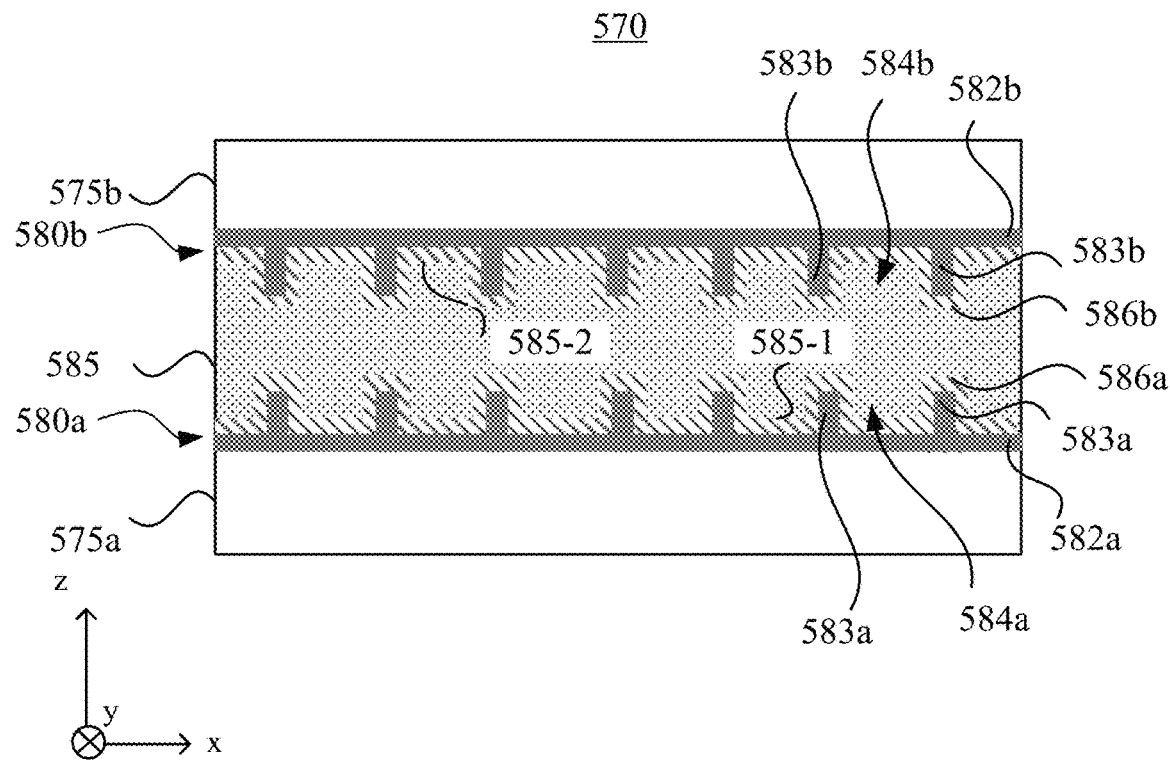
FIG. 5D illustrates a schematic diagram of a beam steering device, according to another embodiment of the present disclosure.

FIG. 5D illustrates a schematic diagram of a beam steering device 570, according to another embodiment of the present disclosure. The beam steering device 570 may include elements that are the same as or similar to those included in the beam steering device 400 shown in FIG. 4A, the beam steering device 500 shown in FIG. 5A, the beam steering device 530 shown in FIG. 5B, and/or the beam steering device 550 shown in FIG. 5C. Detailed descriptions of the same or similar elements may refer to the above descriptions rendered in connection with FIGS. 4A, 5A, 5B, and/or 5C. As shown in FIG. 5D, the beam steering device 570 may include a first substrate 575a and a second substrate 575b, and a PVH 585 disposed between the first substrate 575a and second substrate 575b. The first substrate 575a and second substrate 575b may be the same as or similar to the first substrate 405a and second substrate 405b shown in FIG. 4A.

In some embodiments, the beam steering device 570 may also include a first alignment structure 580a and a second alignment structure 580b, which may be disposed at two inner surfaces of the first and second substrates 575a and 575b that face each other, respectively. In this embodiment, the first alignment structure 580a may be provided by, or may include, a first SRG 582a and a first alignment layer 586a disposed on the first SRG 582a, and the second alignment structure 580b may be provided by, or may include, a second SRG 582b and a second alignment layer 586b disposed on the second SRG 582b. The first SRG 582a may include a first structure 583a defining a plurality of first grooves 584a. The second SRG 582b may include a second structure 583b defining a plurality of second grooves 584b. Optically anisotropic molecules may be filled into the first grooves 584a and second grooves 584b. In this embodiment, the first SRG 582a and second SRG 582b may not be configured to orient the directors of the optically anisotropic molecules filled into the first grooves of the SRG. Instead, the first alignment layer 586a and second alignment layer 586b may be respectively disposed (e.g., coated) on a surface of the first SRG 582a and second SRG 582b to orient the directors of the optically anisotropic molecules filled into the grooves. The first SRG 582a and the first alignment layer 586a together may form the alignment structure 580a to provide a surface alignment (e.g., periodic surface anchoring conditions) to the optically anisotropic molecules filled into the grooves of the SRG. Likewise, the second SRG 582b and the second alignment layer 586b together may form the alignment structure 580b to provide a surface alignment (e.g., periodic surface anchoring conditions) to the optically anisotropic molecules filled into the grooves of the SRG. The first alignment layer 586a and second alignment layer 586b may each include an alignment material, such as a polyimide.

The PVH 585 may include a birefringent medium layer, which may include optically anisotropic molecules (e.g., LC molecules) arranged in a suitable 3D orientation pattern, such as that shown in FIG. 1B, FIG. 1C, or FIG. 1D. The PVH 585 may have a first surface 585-1 and a second surface 585-2 facing the first surface 585-1. In some embodiments, the first surface 585-1 may also be an interface between the PVH 585 and the first alignment structure 580a, and the second surface 585-2 may also be an interface between the PVH 585 and the second alignment structure 580b. Although the body of the PVH 585 is shown as flat for illustrative purposes, the body of the PVH 585 may have a curved shape. The first alignment structure 580a and the second alignment structure 580b may be configured to provide a surface alignment to the LC molecules of the PVH 585 that are in close proximity to (including in contact with) the respective alignment structure (or respective interface). In some embodiments, the first alignment structure 580a and the second alignment structure 580b may be configured to provide parallel surface alignments, anti-parallel surface alignments, or hybrid surface alignments (e.g., between parallel and anti-parallel surface alignments) to the LC molecules in contact with the alignment structure. In some embodiments, one of the first alignment structure 580a and the second alignment structure 580b may be omitted.

In some embodiments, at least one of the first SRG 582a or the second SRG 582b may be integrally formed as a part of the first substrate 575a or the second substrate 575b. In some embodiments, at least one of the first SRG 582a or the second SRG 582b may be separately formed and disposed at (e.g., affixed to) the inner surface of the first substrate 575a or the second substrate 575b. Each of the first SRG 582a and the second SRG 582b may have a first surface facing the corresponding first substrate 575a or the second substrate 575b and a second surface facing the PVH 585.

In the disclosed embodiments, the first alignment layer 586a or the second alignment layer 586b may be a polyimide layer. At least one (e.g., each) of the first alignment layer structure 580a (including the first alignment layer 586a and the first SRG 582a) or the second alignment structure 580b (including the second alignment layer 586b and the second SRG 582b) may be configured to provide a periodic surface alignment pattern (or periodic surface anchoring conditions) to the LC molecules of the PVH 585 that are in close proximity to (including in contact with) the alignment layer (the interface. As a result, the LC molecules of the PVH 585 that are in close proximity (including in contact with) to the alignment layer (or the interface) may be aligned with LC directors arranged in a periodic LC director in-plane orientation pattern, such as the pattern shown in FIG. 1E, FIG. 1F, or FIG. 1G. In some embodiments, a direction of periodicity of the at least one of the first SRG 582a or second SRG 582b may determine the in-plane direction of the PVH 585, and the periodicity of at least one of the first SRG 582a or second SRG 582b may determine the in-plane pitch $P_{in}$ of the PVH 585. For example, in some embodiments, the in-plane direction of the PVH 585 may be parallel to the direction of periodicity of the at least one of the first SRG 582a or second SRG 582b. In some embodiments, the in-plane pitch $P_{in}$ of the PVH 585 may be linearly proportional to the period of the at least one of the first SRG 582a or second SRG 582b. For example, the in-plane pitch $P_{in}$ of the PVH 585 may be substantially the same as the period of the at least one of the first SRG 582a or second SRG 582b. Thus, through adjusting the pitch of at least one of the first SRG 582a or second SRG 582b, the in-plane pitch $P_{in}$ of the PVH 585 may be tunable, which may result in a tunable diffraction angle of a diffracted light beam.

In some embodiments, the first SRG 582a and the second SRG 582b may be stretchable or shrinkable along the direction of periodicity (e.g., by a mechanical force, an electric field) to adjust periods of the first SRG 562a and the second SRG 562b, respectively. That is, the first SRG 562a and the second SRG 562b may have adjustable periods. The first alignment layer 586a and the second alignment layer 586b respectively disposed at the first SRG 582a and the second SRG 582b may be stretchable or shrinkable along with the respective SRG. For example, when the first SRG 582a and the second SRG 582b are stretched along the direction of periodicity of the respective SRG, the first alignment layer 586a and the second alignment layer 586b respectively disposed at the first SRG 582a and the second SRG 582b may be stretched along the direction parallel to the in-plane direction of the PVH. The period of the first SRG 582a or the second 582b may be increased. Accordingly, the in-plane pitch $P_{in}$ of the PVH 585 may be increased, and the diffraction angle of a diffracted light beam may be decreased. Thus, the diffraction angle may be tunable. In some embodiments, the PVH 585 may include active LCs. In some embodiments, the PVH 585 may include passive LCs, e.g., polymerized RMs. In some embodiments, one of the first substrate 575a and the second substrate 575b may be omitted. In some embodiments, one of the first SRG 580a and the second SRG 580b may be omitted.

Figure 5E:
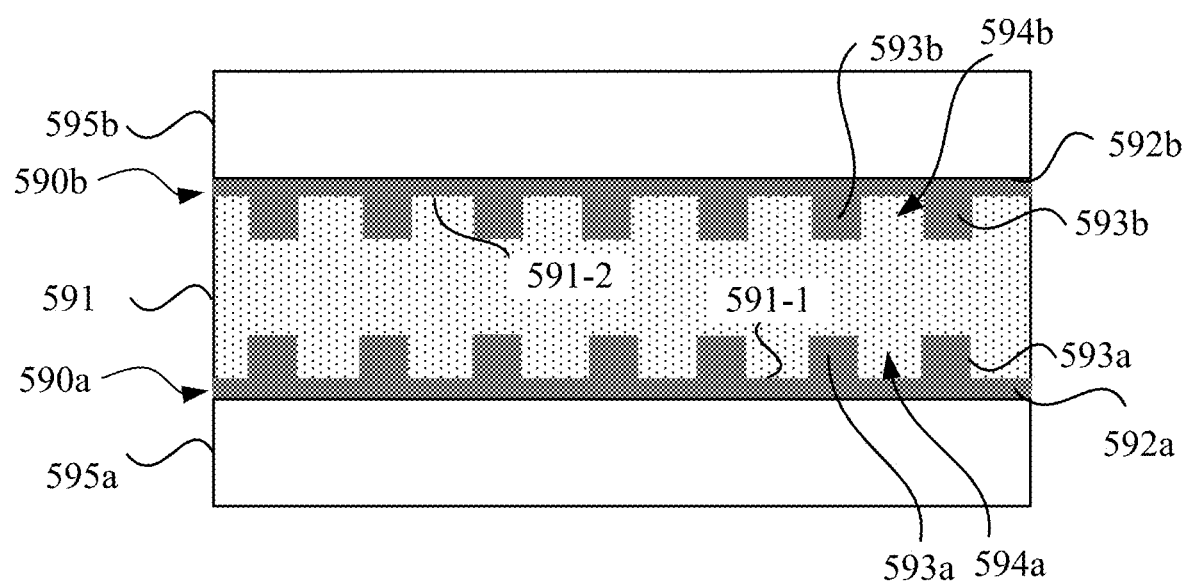
FIG. 5E illustrates a schematic diagram of a beam steering device, according to another embodiment of the present disclosure.
Figure 5E:
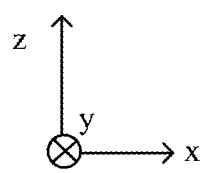

FIG. 5E illustrates a schematic diagram of a beam steering device 590, according to another embodiment of the present disclosure. The beam steering device 590 may include elements that are the same as or similar to those included in the beam steering device 400 shown in FIG. 4A, the beam steering device 500 shown in FIG. 5A, the beam steering device 530 shown in FIG. 5B, the beam steering device 550 shown in FIG. 5C, and/or the beam steering device 570 shown in FIG. 5D. Detailed descriptions of the same or similar elements may refer to the above descriptions rendered in connection with FIGS. 4A, 5A, 5B, 5C, and/or 5D. As shown in FIG. 5E, the beam steering device 590 may include a first substrate 595a and a second substrate 595b, and a PVH 591 disposed between the first substrate 595a and second substrate 595b. The first substrate 595a and second substrate 595b may be the same as or similar to the substrates shown in other figures, e.g., the first substrate 405a and the second substrate 405b shown in FIG. 4A.

In some embodiments, the beam steering device 590 may also include a first SRG 592a and a second SRG 592b, which may be disposed at inner surfaces of the first and second substrates 595a and 595b that face each other, respectively. The first SRG 592a may include a first structure 593a defining a plurality of first grooves 594a. The second SRG 592b may include a second structure 593b defining a plurality of second grooves 594b. Optically anisotropic molecules may be filled into the first grooves 594a and second grooves 594b. In this embodiment, the first SRG 592a and the second SRG 592b may not be configured to orient the directors of the optically anisotropic molecules filled into the first grooves of the SRG. That is, the first SRG 592a and second SRG 592b may not provide surface alignments to the optically anisotropic molecules. In some embodiments, at least one of the first SRG 592a or the second SRG 592b may be integrally formed as a part of the first substrate 595a or the second substrate 595b. In some embodiments, at least one of the first SRG 592a or the second SRG 592b may be separately formed and disposed at (e.g., affixed to) the inner surface of the first substrate 595a or the second substrate 595b. In some embodiments, one of the first substrate 595a and the second substrate 595b may be omitted. In some embodiments, one of the first SRG 592a and the second SRG 592b may be omitted.

The PVH 591 may include a birefringent medium layer, which may include photosensitive polymers configured with at least one of a photo-induced optical anisotropy or photo-induced local optic axis orientations, such as amorphous polymers, LC polymers, etc. Optically anisotropic molecules of the PVH 591 may be arranged in a suitable 3D orientation pattern, such as one or a combination of the patterns shown in FIGS. 1B-1G. The PVH 591 may have a first surface 591-1 and a second surface 591-2 facing the first surface 591-1. In some embodiments, the first surface 591-1 may also be an interface between the PVH 591 and the first SRG 592a, and the second surface 591-2 may also be an interface between the PVH 591 and the second SRG 592b. Although the body of the PVH 591 is shown as having a flat shape for illustrative purposes, the body of the PVH 591 may have a curved shape.

In some embodiments, a direction of periodicity of the at least one of the first SRG 592a or second SRG 592b may determine the in-plane direction of the PVH 591, and the periodicity of at least one of the first SRG 592a or the second SRG 592b may determine the in-plane pitch $P_{in}$ of the PVH 591. For example, in some embodiments, the in-plane direction of the PVH 591 may be parallel to the direction of periodicity of the at least one of the first SRG 592a or the second SRG 592b. In some embodiments, the in-plane pitch $P_{in}$ of the PVH 591 may be linearly proportional to the period of the at least one of the first SRG 592a or the second SRG 592b. For example, the in-plane pitch $P_{in}$ of the PVH 591 may be configured to be substantially the same as the period of the at least one of the first SRG 592a or the second SRG 592b. Thus, through adjusting the pitch of at least one of the first SRG 592a or the second SRG 592b, the in-plane pitch $P_{in}$ of the PVH 591 may be tunable, which may result in a tunable diffraction angle of a diffracted (or steered) light beam. In some embodiments, the first SRG 592a and the second SRG 592b may be stretchable or shrinkable by the external field (e.g., a mechanical force, an electric field) along the direction of periodicity of the respective SRG to tune periods of the first SRG 592a and the second SRG 592b, respectively. That is, the first SRG 592a and the second SRG 592b may have tunable periods. For example, when the first SRG 592a and the second SRG 592b are stretched or shrunk (e.g., through a mechanical force) along the direction of periodicity of the respective SRG, the period of the first SRG 592a or second SRG 592b may be increased or decreased. Accordingly, the in-plane pitch $P_{in}$ of the PVH 591 may be increased or decreased, and the diffraction angle of a diffracted light beam may be decreased or increased.

Figure 10:
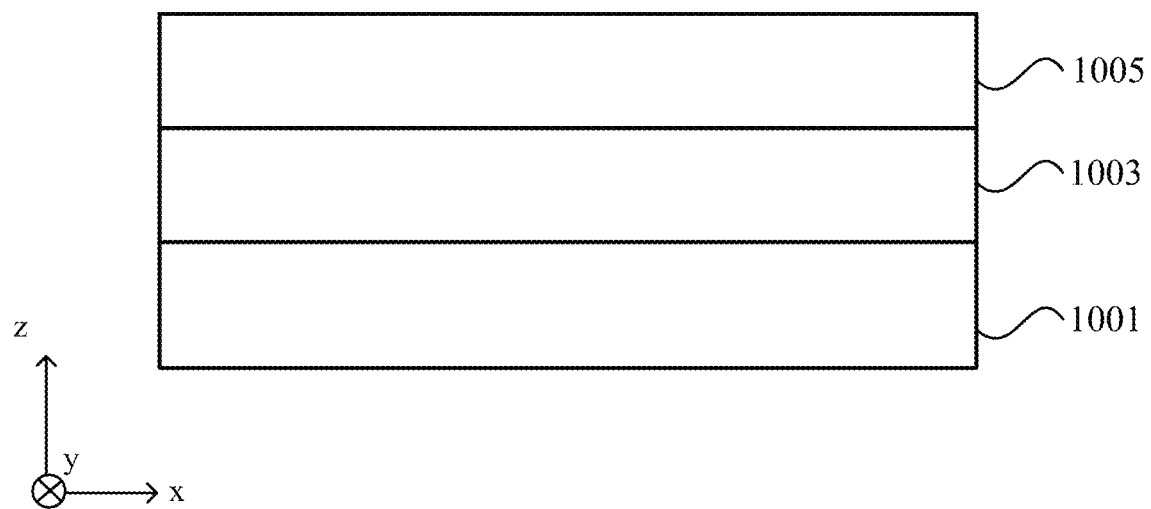
FIG. 10 illustrates a schematic diagram of a beam steering device, according to another embodiment of the present disclosure.

In some embodiments, the beam steering range may be further increased by stacking two or more disclosed beam steering devices having PVHs with tunable in-plane pitches $P_{in}$. The tunable in-plane pitches $P_{in}$ may be tuned in different and non-overlapping ranges, in a same range, or in different and overlapping ranges. As a result, beam steering ranges provided by the two or more beam steering devices may be the same, be different non-overlapping ranges, or be different and overlapping ranges. In some embodiments, 2D beam steering may be provided by stacking two beam steering devices configured to steer a light beam in two different axes. FIG. 10 illustrates a schematic diagram of a beam steering device 1000, according to another embodiment of the present disclosure. The beam steering device 1000 shown in FIG. 10 may include elements that are the same as or similar to those included in the beam steering device 400 shown in FIG. 4A, the beam steering device 500 shown in FIG. 5A, the beam steering device 530 shown in FIG. 5B, the beam steering device 550 shown in FIG. 5C, the beam steering device 570 shown in FIG. 5D, and/or the beam steering device 590 shown in FIG. 5E. Detailed descriptions of the same or similar elements may refer to the above descriptions rendered in connection with FIGS. 4A, 5A, 5B, 5C, 5D, and/or 5E.

As shown in FIG. 10, the beam steering device 1000 may include a plurality of PVH cells stacked together, for example, a first PVH cell 1001, a second PVH cell 1003, and a third PVH cell 1005. The number of PVH cells can be any suitable number, such as two, four, five, six, etc. In some embodiments, at least two of the cells 1001, 1003, and 1005 may be of the same or different embodiments of the disclosed beam steering devices with PVHs having tunable in-plane pitches $P_{in}$, such as the beam steering device 400 shown in FIG. 4A, the beam steering device 500 shown in FIG. 5A, the beam steering device 530 shown in FIG. 5B, the beam steering device 550 shown in FIG. 5C, the beam steering device 570 shown in FIG. 5D, or the beam steering device 590 shown in FIG. 5E. In some embodiments, the at least two tunable PVH cells may include two or more beam steering devices 400 (which may or may not be configured with the same optical property), or two or more beam steering devices 500 (which may or may not be configured with the same optical property), or two or more beam steering devices 530 (which may or may not be configured with the same optical property), or two or more beam steering devices 550 (which may or may not be configured with the same optical property), two or more beam steering devices 570 (which may or may not be configured with the same optical property), or two or more beam steering devices 590 (which may or may not be configured with the same optical property). In some embodiments, the at least two tunable PVH cells may include any combination of the beam steering devices 400, 500, 530, 550, 570, and 590. For discussion purposes, each of the PVH cells 1001, 1003, and 1005 is presumed to be a disclosed beam steering device with PVHs having tunable in-plane pitches $P_{in}$. In some embodiments, each of the PVH cells 1001, 1003, and 1005 may have separate pairs of substrates. In some embodiments, two adjacent PVH cells of the PVH cells 1001, 1003, and 1005 may share a sub state. That is, a substrate disposed between two adjacent PVHs may be shared by two adjacent PVH cells.

In some embodiments, the PVH cells 1001, 1003, and 1005 may include PVHs of the same handedness, e.g., right-handed PVHs or left-handed PVHs. In some embodiments, the at least two of the PVH cells 1001, 1003, and 1005 may include PVHs having different handednesses. For example, one or more of the PVH cells 1001, 1003, and 1005 may include right-handed PVH(s), and the remaining PVH cell(s) may include left-handed PVH(s). In some embodiments, at least one of the PVH cells 1001, 1003, and 1005 may include a PVH with a reduced polarization selectively. In some embodiments, the PVH cells 1001, 1003, and 1005 may include the same type of PVHs, e.g., transmissive PVHs or reflective PVHs. In some embodiments, the PVH cells 1001, 1003, and 1005 may include different types of PVHs. For example, one or more of the PVH cells 1001, 1003, and 1005 may include transmissive PVH(s), and the remaining cell(s) may include reflective PVH(s). In some embodiments, the PVH cells 1001, 1003, and 1005 may include PVHs having a substantially same initial in-plane pitch. The initial in-plane pitch refers to an in-plane pitch of the PVH without an external field applied, which may change the in-plane pitch of the PVH. In some embodiments, the PVH cells 1001, 1003, and 1005 may include PVHs having different initial in-plane pitches. For example, at least two of the PVH cells 1001, 1003, and 1005 may include PVHs having different initial in-plane pitches.

In some embodiments, the PVH cells 1001, 1003, and 1005 may be configured to provide a continuous beam steering or a discrete beam steering. In some embodiments, when the PVH cells 1001, 1003, and 1005 are configured to provide a discrete beam steering, the step sizes (e.g., angular increments) of the discrete beam steering provided by the PVH cells 1001, 1003, and 1005 may be substantially the same or different. In some embodiments, one or more of the PVH cells 1001, 1003, and 1005 may provide a continuous beam steering, and the remaining PVH cell(s) may provide a discrete beam steering. In some embodiments, the PVH cells 1001, 1003, and 1005 may include PVHs having a substantially same in-plane direction, and may be configured to steer a light beam in a substantially same axis, e.g., an x-axis direction shown in FIG. 10. An overall beam steering range of the beam steering device 1000 may be a combination of individual beam steering ranges of the PVH cells 1001, 1003, and 1005. In some embodiments, the PVH cells 1001, 1003, and 1005 may include PVHs having different in-plane directions. For example, at least two of the PVH cells 1001, 1003, and 1005 may be configured to steer a light beam in two different axes, e.g., an x-axis direction and a y-axis direction shown in FIG. 10. Thus, the beam steering devices 1000 may be configured to provide 2D beam steering.

In the disclosed beam steering devices, the in-plane pitch of the PVH may be tunable, which results in a tunable diffraction angle of a diffract light beam of the PVH. Thus, a disclosed beam steering device may steer an input light beam in a beam steering angular range. PVHs with a variable (or tunable) in-plane pitch may be implemented in systems or devices for manipulating light beams, such as diffraction optics, laser displays, beam shaping or steering devices, switchable holograms, and adaptive micro devices, etc. Beam steering devices based on PVHs with a tunable in-plane pitch may include features such as compactness, a high power efficiency, a large steering range with continuous beam steering or discrete beam steering, wavelength selectivity, angular selectivity and/or polarization selectivity, and polarization conversion in addition to beam steering.

Beam steering devices based on PVHs with a tunable in-plane pitch may have numerous applications in a large variety of fields. For example, beam steering devices based on PVHs with a tunable in-plane pitch may be implemented in display and optics module to enable pupil steered augmented reality ("AR"), virtual reality ("VR"), and/or mixed reality ("MR") display systems including, but not limited to, holographic near eye displays, retinal projection eyewear, and wedged waveguide displays. Conventional pupil steered AR, /VR, and/or MR display systems include features such as compactness, a large field of view ("FOV"), a high system efficiency, and a small eye-box. Beam steering devices based on PVHs with a tunable in-plane pitch may be implemented in the pupil steered AR, VR, and/or MR display systems to enlarge the eye-box spatially and/or temporally. In some embodiments, beam steering devices based on PVHs with a tunable in-plane pitch may be implemented in AR, VR, and/or MR sensing modules to detect objects in a wide angular range to enable other functions. In some embodiments, beam steering devices based on PVHs with a tunable in-plane pitch may be implemented in AR, VR, and/or MR sensing modules to extend the FOV (or detecting range) of the sensors, improve detecting resolution or accuracy of the sensors, and/or reduce the signal processing time. Beam steering devices based on PVHs with a tunable in-plane pitch may also be used in optical communications, e.g., to provide Gigabyte/second speeds and kilometers of ranges, microwave communications, 3D imaging and sensing (e.g., light beam detection and ranging), lithography, and 3D printing, etc. Some exemplary applications in AR, VR and MR fields will be explained below.

Figure 6A:
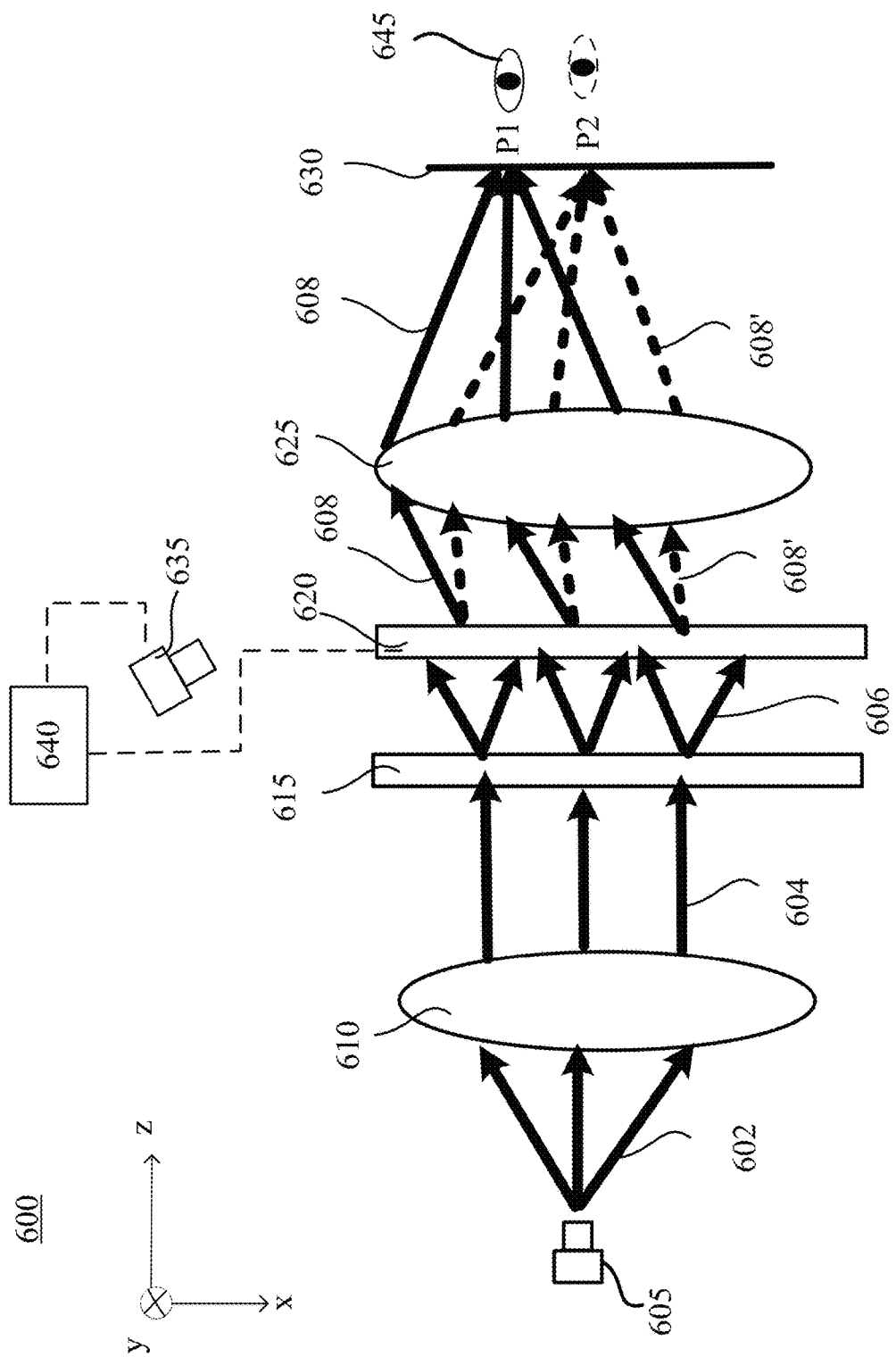
FIG. 6A illustrates a schematic diagram of an optical assembly including a beam steering device, according to an embodiment of the present disclosure.

FIG. 6A illustrates a schematic diagram of an optical assembly or system 600 including a beam steering device 620, according to an embodiment of the present disclosure. The beam steering device 620 may be any disclosed beam steering device, such as the beam steering device 400 shown in FIG. 4A, the beam steering device 500 shown in FIG. 5A, the beam steering device 530 shown in FIG. 5B, the beam steering device 550 shown in FIG. 5C, the beam steering device 570 shown in FIG. 5D, the beam steering device 590 shown in FIG. 5E, or the beam steering device 1000 shown in FIG. 10. In the embodiment shown in FIG. 6A, the beam steering device 620 may provide continuous or discrete beam steering. The optical assembly 600 may be a part of a near-eye display ("NED") and may enable the pupil steering of the NED for AR, VR or MR applications. As shown in FIG. 6A, the optical assembly 600 may include a light source 605, a first optical lens 610, an optical diffuser 615, the beam steering device 620, and a second optical lens 625 arranged in an optical series. It should be appreciated by those skilled in the art that the optical elements described in the above optical assembly may be configured in a different sequence in the optical series, and such different configurations are all within the scope of the present disclosure.

Referring to FIG. 6A, the optical assembly 600 may include an eye-tracking device 635 and a controller 640 communicatively coupled with the eye-tracking device 635. The controller 640 may be configured to control the operations of the eye-tracking device 635, receive data from the eye-tracking device 635, and/or transmit data to the eye-tracking device 635. The controller 640 may be communicatively coupled with one or more of the other devices, such as the optical diffuser 615, the light source 605, and/or the beam steering device 620 (the coupling or connections are not shown in FIG. 6A for the simplicity of the illustration). The optical assembly 600 may include other elements not shown in FIG. 6A. In some embodiments, the light source 605 may include a light source (e.g., a point light source) configured to generate coherent or partially coherent lights (or light beams) that are converging or diverging. The light source 605 may include, e.g., a laser diode, a fiber laser, a vertical cavity surface emitting laser, and/or a light emitting diode. In some embodiments, the light source 605 may be a component included in the optical assembly 600. In some embodiments, the light source 605 may be a part of another optical assembly or another system that generates coherent or partially coherent light beams. In some embodiments, the optical assembly 600 may further include one or more optical components configured to condition the light beam generated by the light source 605. Conditioning the light beam performed by the optical components may include, e.g., polarizing, and/or adjusting orientation of the light beam in accordance with instructions from the controller 640. In some embodiments, the light source 605 may include an optical fiber coupled to three laser diodes configured to emit red, green, and blue light beams, each light beam having a central wavelength of about 448 nm, 524 nm, and 638 nm, respectively. In some embodiments, the light beam generated by the light source 605 may be circularly polarized.

The first optical lens 610, the optical diffuser 615, the beam steering device 620, and the second optical lens 625 arranged in an optical series may direct the light beam generated by the light source 605 toward an eye-box 630 of the optical assembly 600. The first optical lens 610 may be arranged relative to the light source 605 to convert a divergent light beam 602 output from the light source 605 into a collimated light beam 604 propagating toward the optical diffuser 615. The optical diffuser 615 may be configured to primarily forward scatter the collimated light beam 604 as a plurality of scattered light beams 606 toward the beam steering device 620. The optical diffuser 615 may diffuse an incident light beam uniformly in a plurality of directions, thereby enlarging the field of view ("FOV") of the optical assembly 600. The optical diffuser 615 may include any suitable optical diffusers, such as a glass diffuser, or a holographic diffuser, etc. In some embodiments, the optical diffuser 615 may be a holographic diffuser 615. The functions of the holographic diffuser 615 may be provided by a holographic optical element ("HOE") that may be produced at a thin film of holographic materials, i.e., a holographic film, via a holographic recording. The HOE may be configured with a plurality of grating structures (e.g., Bragg grating structures) in the holographic recording. The holographic diffuser 615 may be configured to diffuse a light beam primarily by Bragg diffraction (i.e., diffract a light beam that satisfies a Bragg condition). The holographic diffuser 615 may be highly efficient at diffusing a light beam that satisfies the Bragg condition. In some embodiments, the holographic diffuser 615 may include a polarization non-selective Bragg grating holographically recorded at an isotropic recording material. In some embodiments, the holographic diffuser 615 may include a polarization volume grating ("PVG") holographically recorded at a polarization sensitive recording material. In some embodiments, to broaden a wavelength spectrum of the holographic diffuser 615 (e.g., to diffract a collimated incident light beam in various visible wavelengths), wavelength multiplexing for full-color recording may be used in the holographic recording.

The beam steering device 620 may be configured to steer, via diffraction, the scattered light beams 606 that satisfy a diffraction condition (e.g., the Bragg condition) as diffracted light beams 608. The second optical lens 625 may be configured to focus the diffracted light beams 608 to one or more light beam spots at a surface where an exit pupil of the optical assembly 600 (or an exit pupil of an NED including the optical assembly 600) is located. An exit pupil may be a location where an eye pupil 645 of a user is positioned at the eye-box 630. The one or more light beam spots may be considered as one or more exit pupils available at the eye-box 630. When an exit pupil available at the eye-box 630 substantially coincides with the position of the eye pupil 645, the light beam 602 output from the light source 605 may be ultimately directed to the eye pupil 645.

In some embodiments, the controller 640 may control the operation of the beam steering device 620 to provide a plurality of steering states to an incident light beam. For example, the beam steering device 620 may be electrically switchable among the plurality of steering states by switching the driving voltage. In some embodiments, the controller 640 may control a power source (not shown) electrically coupled with the beam steering device 620 (e.g., the electrodes included therein) to control the voltage supplied to the beam steering device 620 from the power source, thereby controlling the steering states of the beam steering device 620. The plurality of steering states may result in a plurality of steering angles (or diffraction angles) of the incident light beam at a light exit surface of the beam steering device 620. In some embodiments, the plurality of steering angles may be continuous. That is, the beam steering device 620 may provide a range of continuous adjustments of a steering angle to an incident light beam, which may enable a continuous shift of the exit pupil of the optical assembly 600. In some embodiments, the plurality of steering angles may be discrete. That is, the beam steering device 620 may provide a range of discrete adjustments of a steering angle to an incident light beam, which may enable a discrete shift of the exit pupil of the optical assembly 600.

Still referring to FIG. 6A, the eye-tracking device 635 may be any suitable eye-tracking device. The eye-tracking device 635 may include, e.g., one or more sources (e.g., infrared light sources) that illuminate one or both eyes of the user, and one or more imaging devices (e.g., cameras) configured to capture images of one or both eyes of the user. In some embodiments, the eye-tracking device 635 may be configured to obtain, in real time, the eye-tracking information relating to the eye pupil 645 by analyzing the captured images of the eye pupil 645. The eye-tracking information may include at least one of a position (or location), a moving direction, a size, or a viewing direction of the eye pupil 645. The position, moving direction, size, or viewing direction of the eye pupil 645 may be dynamically changing. Thus, the eye-tracking device 635 may dynamically capture the images of the eye pupil 645 and dynamically obtain the eye-tracking information in real time. In some embodiments, the eye-tracking device 635 may measure or determine the position and/or movement of the eye pupil 645 up to six degrees of freedom (i.e., 3D position, roll, pitch, and yaw). In some embodiments, the eye-tracking device 635 may transmit the eye-tracking information to the controller 640. In some embodiments, the eye-tracking device 635 may transmit the images (i.e., image data) of the eye pupil 645 to the controller 640, and the controller 640 may analyze the images to obtain the eye-tracking information in real time. The controller 640 may determine, based on one or more types of the eye-tracking information (e.g., based on the position of the eye pupil 645), the steering state of the beam steering device 620.

Based on the eye-tracking information, the controller 640 may be configured to control the beam steering device 620 to adjust the steering angle of the light beam, such that the positions of the one or more exit pupils available at the eye-box 630 may be adjusted to substantially coincide with the position of the eye pupil 645. For example, the controller 640 may adjust the voltage of the power source 430 shown in FIGS. 4A and 4C to tune the in-plane pitch of the PVH, thereby adjusting the steering angle of the light beam directed to the eye pupil 645. The second optical lens 625 may focus the light beam output from the beam steering device 620 into the eye pupil 645. That is, the beam steering device 620 and the second optical lens 625 may continuously or discretely shift the exit pupil of the optical assembly 600 to cover an expanded eye-box area based on the eye-tracking information.

For illustrative purposes, FIG. 6A shows two steering states of the beam steering device 620. For example, the eye-tracking device 635 may detect that the eye pupil 645 is located at a position P1 at the eye-box 630. Based on the eye-tracking information, the controller 640 may control the beam steering device 620 to switch to a first steering state, such that the scattered light beams 606 that satisfy a diffraction condition (e.g., the Bragg condition) may be steered by the beam steering device 620 via diffraction as the light beams 608.

The second optical lens 625 may focus the diffracted light beams 608 at an exit pupil that substantially coincides with the position P1 of the eye pupil 645. At another time instance, the eye-tracking device 635 may detect that the eye pupil 645 has moved to a new position P2 at the eye-box 630. The eye-tracking device 635 may provide the new position information (as part of the eye-tracking information) to the controller 640, or the controller 640 may determine the new eye-tracking information based on images of the eye pupil 645 received from the eye-tracking device 635. The controller 640 may control the beam steering device 620 to switch to a second steering state from the first steering state to steer, via diffraction, the scattered light beams 606 that satisfy a diffraction condition (e.g., Bragg condition) as light beams 608'. The second optical lens 625 may focus the diffracted light beam 608' at an exit pupil that substantially coincides with the new position P2 of the eye pupil 645. That is, the exit pupil of the NED may be shifted from the position P1 to the position P2 in accordance with a movement of the eye pupil 645. As a result, the eyes can move in a wider range without losing sight of the virtual image.

In the disclosed embodiments, the beam steering device 620 may be configured to provide a plurality of steering states to the diffused light beams received from the optical diffuser 615. The plurality of steering states may correspond to a range of continuous or discrete adjustments of a steering angle (or diffraction angle) provided to the diffused light beams received from the optical diffuser 615. Thus, a continuous or discrete shift of the exit pupil of the optical assembly 600 may be provided to cover an expanded eye-box based on the eye-tracking information. The beam steering device 620 may be compact with a thickness of a few millimeters to reduce the form factor of the NED. In addition, the beam steering device 620 may have a fast switching speed when switching between different steering states. For example, a switching between states may take a few milliseconds, which may be sufficiently fast to keep pace with the movement of the eye pupil 645. Thus, the real-time eye tracking and real-time shifting of the exit pupil positions may be provided.

Figure 6B:
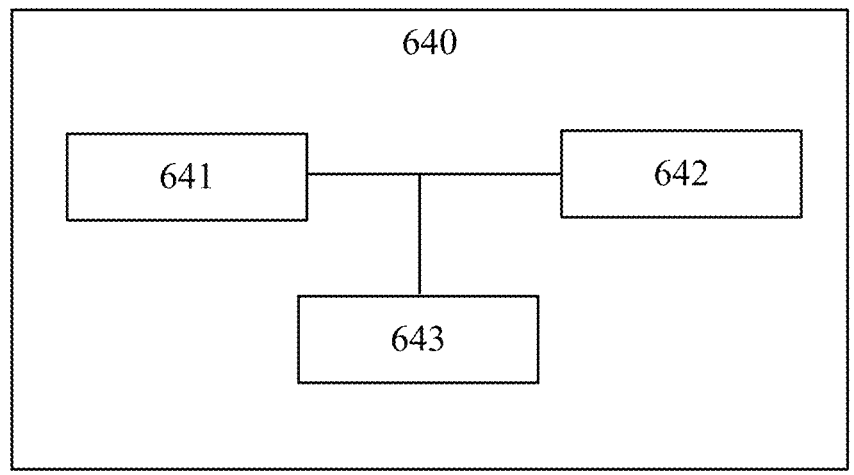
FIG. 6B illustrates a schematic diagram of a controller shown in FIG. 6A, according to an embodiment of the present disclosure.

FIG. 6B illustrates a schematic diagram of the controller 640 shown in FIG. 6A. The controller 640 may include a processor 641, a storage device 642, and an input/output interface 643. The processor 641 may include any suitable processor, such as a central processing unit, a microprocessor, an application-specific integrated circuit, a programmable logic device, a complex programmable logic device, a field-programmable gate array, etc. The processor 641 may be specially programmed to control the beam steering device 620 to adjust a steering angle of the light beam passing through the beam steering device 620 based on eye-tracking information provided by the eye-tracking device 635 or obtained based on image data provided by the eye-tracking device 635. In other words, the processor 641 may be configured to change the location of one or more exit pupils available at the eye-box 630 based on the eye-tracking information (e.g., the position and/or movement) of the eye pupil 645. The locations of the of one or more exit pupils may be shifted such that at any time instance, at least one exit pupil of the one or more exit pupils may be provided at a location corresponding to the location of the eye pupil 645.

The storage device 642 may be configured to store data, signal, information, or computer-readable codes or instructions. The storage device 642 may include a non-transitory computer-readable storage medium, such as a magnetic disk, an optical disk, a flash memory, a read-only memory ("ROM"), or a random-access memory ("RAM"), etc. The processor 641 may access the storage device 642 and retrieve data or instructions from the storage device 642. In some embodiments, the storage device 642 may store feedback data (e.g., the eye-tracking information, the image data) provided by the eye-tracking device 635. The processor 641 may retrieve the feedback data provided by the eye-tracking device 635 for analysis. In some embodiments, the storage device 642 may store the steering states of the beam steering device 620, and the processor 641 may retrieve the current steering states when determining a next steering state for the beam steering device 620.

The input/output interface 643 may be any suitable data or signal interface. The input/output interface 643 may be an interface configured for wired or wireless communication. Thus, the input/output interface 643 may also function as a communication device. In some embodiments, the input/output interface 643 may include a transceiver configured to receive and transmit signals. In some embodiments, the input/output interface 643 may be configured to communicate with the eye-tracking device 635 and the beam steering device 620, and may receive data or signal (or transmit data or signal) from (or to) the eye-tracking device 635 and the beam steering device 620.

Figure 7:
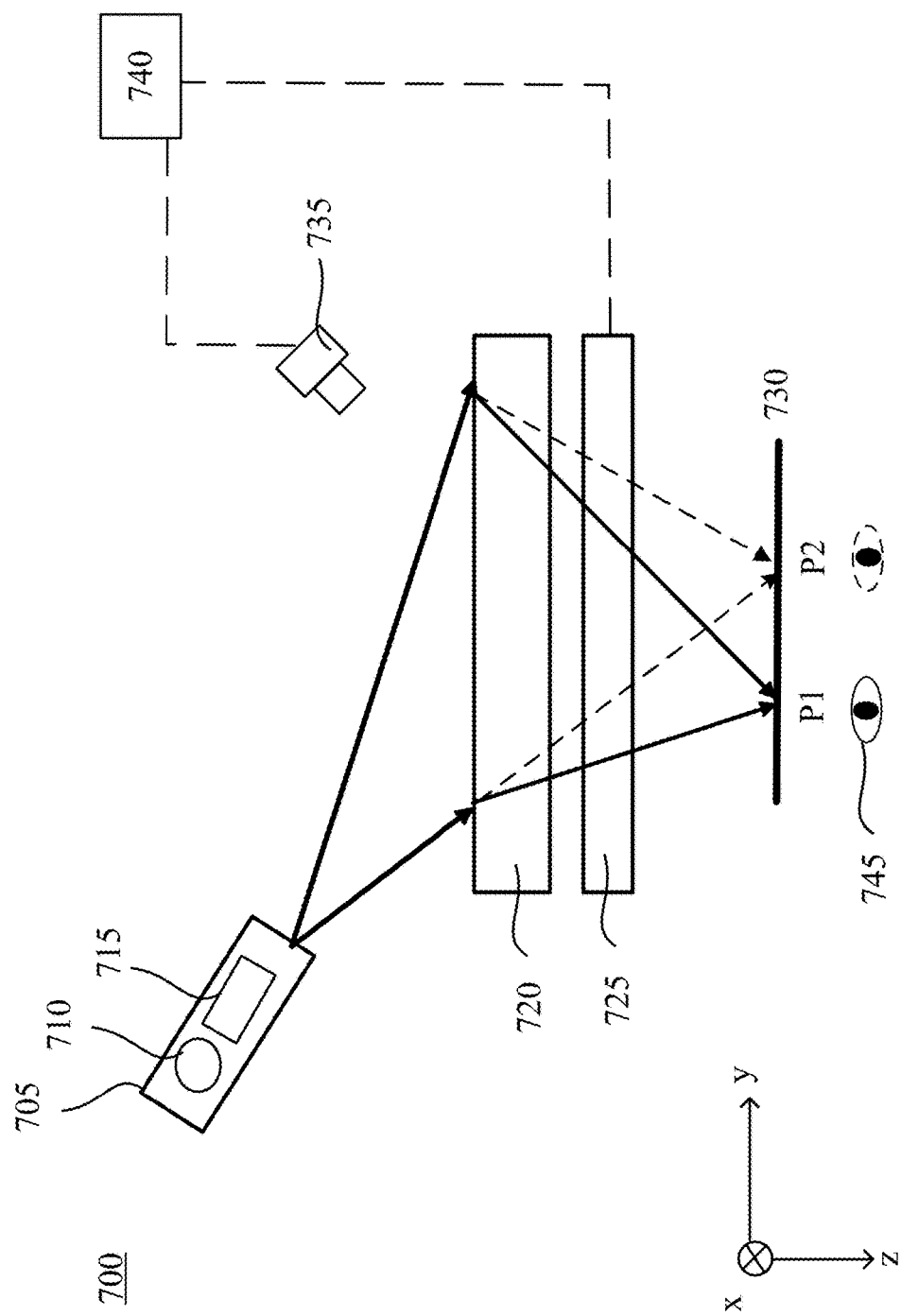
FIG. 7 illustrates a schematic diagram of an optical assembly including a beam steering device, according to another embodiment of the disclosure.

FIG. 7 illustrates a schematic diagram of an optical assembly or system 700 including a beam steering device 725, according to another embodiment of the disclosure. The beam steering device 725 may be any beam steering device disclosed herein, such as the beam steering device 400 shown in FIG. 4A, the beam steering device 500 shown in FIG. 5A, the beam steering device 530 shown in FIG. 5B, the beam steering device 550 shown in FIG. 5C, the beam steering device 570 shown in FIG. 5D, the beam steering device 590 shown in FIG. 5E, or the beam steering device 1000 shown in FIG. 10. In some embodiments, the beam steering device 725 may be configured to provide a continuous or discrete beam steering. The optical assembly 700 may be a part of an NED and may achieve a pupil steering of the NED for AR, VR or MR applications. As shown in FIG. 7, the optical assembly 700 may include a projector 705 configured to generate an image light beam, an image combiner 720, and a beam steering device 725 arranged in an optical series to direct the image light beam toward an eye-box 730 of the optical assembly 700. The optical assembly 700 may further include an eye-tracking device 735 and a controller 740. The controller 740 may be communicatively coupled with one or more of the other devices, such as the eye-tracking device 735 and the beam steering device 725. The optical assembly 700 may include other elements not shown in FIG. 7. The eye-tracking device 735 may be the same as or similar to the eye-tracking device 635 shown in FIG. 6A, and the controller 740 may be the same as or similar to the controller 640 shown in FIG. 6A and FIG. 6B. Detailed descriptions of the eye-tracking device 735 and the controller 740, as well as the eye-tracking information and the control of the beam steering device based on the eye-tracking information, can refer to the above descriptions rendered in connection with FIGS. 6A and 6B.

The projector 705 may include a light source 710 and a light conditioning system 715. The light source 710 may be configured to generate a coherent or partially coherent light beam. The light source 710 may include, e.g., a laser diode, a vertical cavity surface emitting laser, and/or a light emitting diode. In some embodiments, the light source 710 may be a display panel, such as a liquid crystal display ("LCD") panel, an liquid-crystal-on-silicon ("LCoS") display panel, an organic light emitting diode ("OLED") display panel, a micro-LED (micro light emitting diode) display panel, a digital light processing ("DLP") display panel, or some combination thereof. In some embodiments, the light source 710 may be a self-emissive panel, such as an OLED display panel or a micro-LED display panel. In some embodiments, the light source 710 may be a display panel that is illuminated by an external source, such as an LCD panel, an LCoS display panel, or a DLP display panel. Examples of an external sources may include a laser, an LED, an OLED, or some combination thereof. The light conditioning system 715 may include one or more optical components configured to condition the light beam from the light source 710. Conditioning a light beam from the light source 710 may include, e.g., polarizing, attenuating, expanding, collimating, and/or adjusting orientation of the light beam. In some embodiments, the image light beam output from the projector 705 may be circularly polarized.

The image combiner 720 may be configured to focus the image light beam received from the projector 705 to one or more light beam spots at a surface where an exit pupil of the NED is located. An exit pupil may be a location where an eye pupil 745 of a user is positioned at the eye-box 730. In other words, the image combiner 720 may focus the image light beam received from the projector 705 to one or more exit pupils of the NED at the eye-box 730. When configured for AR applications, the image combiner 720 may combine an image light beam received from the projector 705 and a light beam from a real-world environment (not shown in FIG. 7), and direct both light beams toward the eye-box 730 of the NED. In some embodiments, the image combiner 720 may include a holographic optical element ("HOE") having a wide FOV, and the image combiner 720 may be referred to as an HOE image combiner. In some embodiments, the HOE may include a fixed hologram configured to focus an off-axis light beam (e.g., a highly off-axis light beam) into an on-axis light beam in front of the eye pupil 745. In some embodiments, the HOE may include a volume (or Bragg) hologram, and may redirect and focus the light beam received from the projector 705 over a narrow range of angles and wavelengths to provide a clear, highly transparent see-through view to the user. In some embodiments, the HOE may be multiplexed to have a high diffraction efficiency at a plurality of wavelengths, (e.g., red, green, and blue wavelengths), thereby enabling a full color display.

The beam steering device 725 may be the same as or similar to the beam steering device 620 shown in FIG. 6A. Detailed descriptions of the beam steering device 725 may refer to the descriptions of the beam steering device 620. In an operation, based on the eye-tracking information, the controller 740 may control the beam steering device 725 to change the positions of the one or more exit pupils via beam steering, such that at least of the one or more exit pupils may substantially coincide with the position of the eye pupil 745. That is, the image light beam emitted from the projector 705 may be directed into the eye pupil 745. Because the beam steering device 725 is configured to provide a range of continuous or discrete adjustments of a steering angle of an incident light beam, the exit pupil of the optical assembly 700 may be continuously or discretely shifted to cover an expanded eye-box based on the eye-tracking information.

For illustrative purposes, FIG. 7 shows two steering states of the beam steering device 725. For example, at a first time instance, the eye-tracking device 735 may detect that the eye pupil 745 of the user is located at a position P1 at the eye-box 730. Based on the eye-tracking information, the controller 740 may control the beam steering device 725 to switch to a first steering state to steer at least one of the one or more exit pupils via diffraction to substantially coincide with the position P1 of the eye pupil 745. At a second time instance, the eye-tracking device 735 may detect that the eye pupil 745 of the user has moved to a new position P2 at the eye-box 730. Based on new eye-tracking information relating to the new position P2, the controller 740 may control the beam steering device 725 to switch to a second steering state from the first steering state to steer at least one of the one or more exit pupils via diffraction to substantially coincide with the new position P2 of the eye pupil 745. In some embodiments, the controller 740 may be communicatively coupled with the power source 430 shown in FIGS. 4A and 4C to adjust the voltage applied to the beam steering device 725.

FIG. 6A and FIG. 7 illustrate two optical assemblies that can achieve the pupil steering of NEDs by using a beam steering device disclosed herein. The two optical assemblies are for illustrative purposes and do not limit the scope of the present disclosure. Optical assemblies including the disclosed beam steering device but having different configurations may also achieve the pupil steering of NEDs.

Figure 8A:
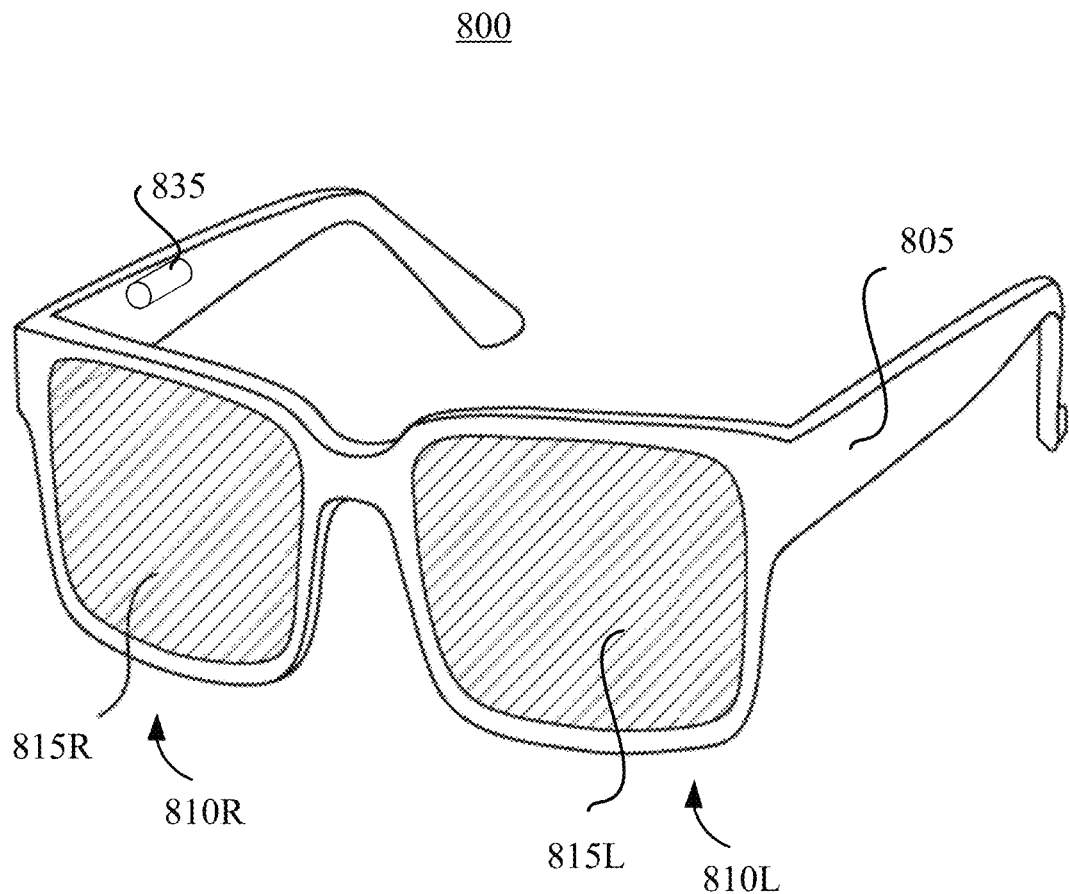
FIG. 8A illustrates a schematic diagram of a near-eye display ("NED"), according to an embodiment of the present disclosure.
Figure 8B:
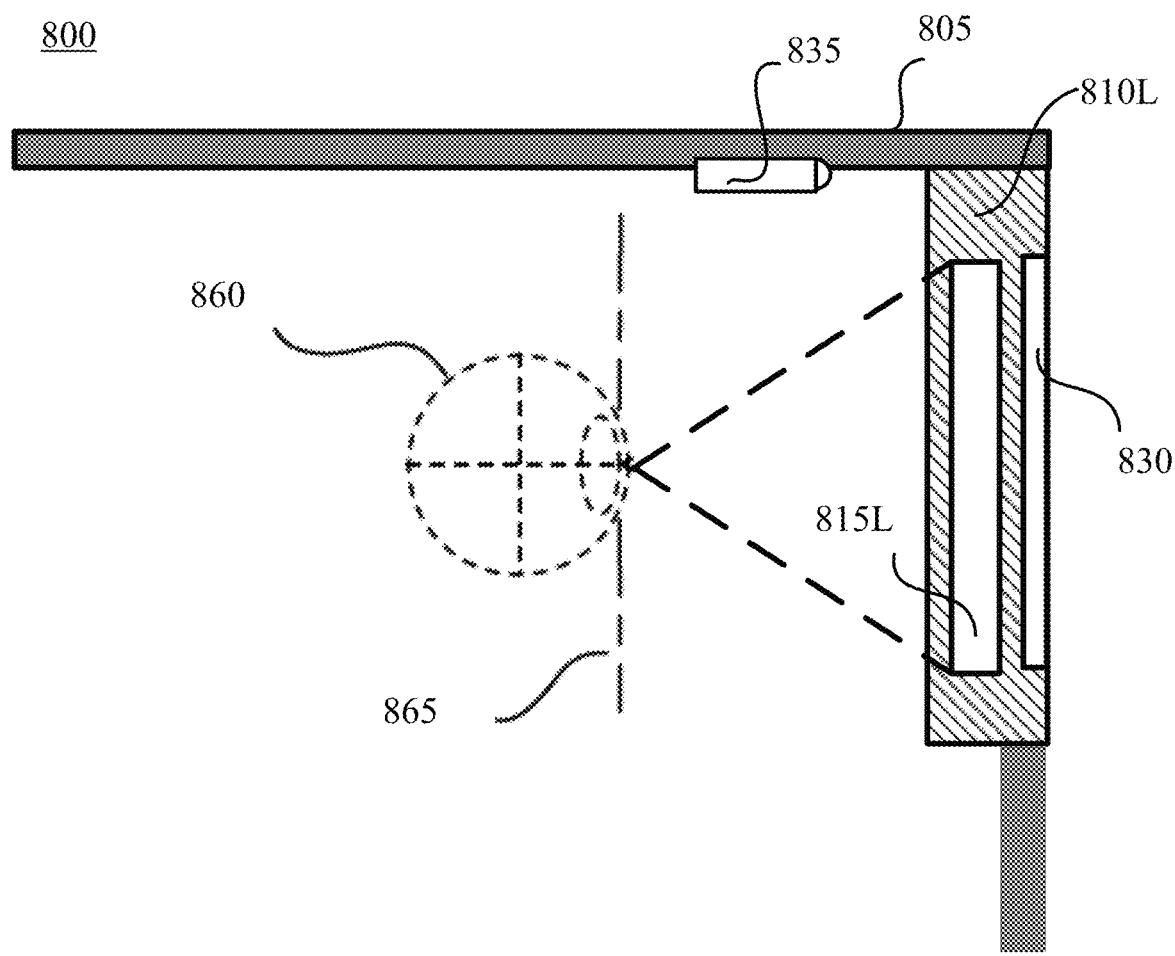
FIG. 8B illustrates a schematic cross sectional view of half of the NED shown in FIG. 8A, according to an embodiment of the present disclosure.

FIG. 8A illustrates a schematic diagram of an NED 800 according to an embodiment of the present disclosure. FIG. 8B is a cross-sectional view of the NED 800 shown in FIG. 8A according to an embodiment of the disclosure. For purposes of illustration, FIG. 8B shows the cross-sectional view associated with a left-eye display system 810L. The NED 800 may include the controller 640 or 740 and the eye-tracking device 635 or 735, which are not shown in FIG. 8A or 8B. As shown in FIGS. 8A and 8B, the NED 800 may include a frame 805 configured to be worn on a user's head, a left-eye display system 810L and a right-eye display system 810R mounted to the frame 805. Each of the left-eye display system 810L and the right-eye display systems 810R may include image display components configured to project computer-generated virtual images into a left display window 815L and a right display window 815R in the user's FOV. An exemplary display system representative of the left-eye display system 810L and the right-eye display system 810R may include the optical assembly 600 shown in FIG. 6A or the optical assembly 700 shown in FIG. 7. In some embodiments, the NED 800 may include a projection system.

For illustrative purposes, FIG. 8A shows that the projection system may include a projector 835 coupled to the frame 805. The projector 835 may function as a light source and may generate an image light. The image light may be guided by the left-eye display system 810L to an eye 860 through an exit pupil 865. Based on dynamically obtained eye-tracking information, the optical assembly 600 or 700 including a beam steering device disclosed herein may steer the image light to different angles, thereby changing the position of the exit pupil 865 to match with the changing positions of an eye pupil of the eye 860. The NED 800 may function as a VR device, an AR device, an MR device, or any combination thereof. In some embodiments, when the NED 800 functions as an AR or an MR device, the right and left display windows 815R and 815L may be at least partially transparent from the perspective of the user, to provide the user a view of a surrounding real-world environment. In some embodiments, when the NED 800 functions as a VR device, the right and left display windows 815R and 815L may be opaque, such that the user may be immersed in the VR imagery provided via the NED. In some embodiments, the NED 800 may include an adaptive dimming element 830, which may be configured to dynamically adjust the transmittance of the real-world lights, thereby switching the NED between a VR device and an AR device or between a VR device and an MR device. In some embodiments, in addition to switching between the AR/MR device and the VR device, the adaptive dimming element may be configured to mitigate a difference in brightness between real-world lights and virtual image lights.

Figure 9:
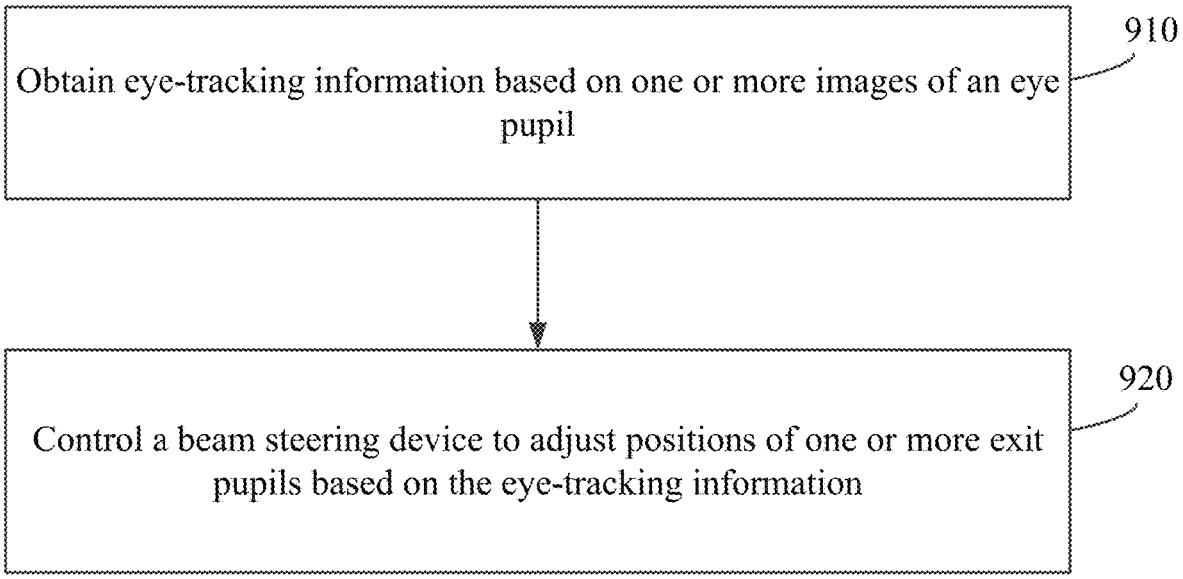
FIG. 9 is a flowchart illustrating a method, according to an embodiment of the present disclosure.

FIG. 9 is a flowchart illustrating a method 900 according to an embodiment of the present disclosure. Method 900 may be performed by the controller 640 or 740 disclosed herein. The method 900 may be performed to dynamically adjust a position of one or more exit pupils of an optical assembly. The optical assembly may include any of the beam steering devices disclosed herein. The method 900 may include obtaining eye-tracking information based on one or more images of an eye pupil (Step 910). For example, the eye-tracking device 635 or 735 may obtain one or more images of the eye pupil in real time. In some embodiments, the eye-tracking device 635 or 735 may analyze the images to obtain the eye-tracking information and transmit the eye-tracking information to the controller 640 or 740. In some embodiments, the eye-tracking device 635 or 735 may transmit the images to the controller 640 or 740, and the controller 640 or 740 may analyze the images to obtain the eye-tracking information. The method 900 may include controlling the beam steering device to adjust positions of one or more exit pupils based on the eye-tracking information (Step 920). The beam steering device may include a birefringent medium layer having optically anisotropic molecules. Orientations of directors of the optically anisotropic molecules located at a surface of the birefringent medium layer may vary periodically in a predetermined direction with an in-plane pitch. The in-plane pitch may be tunable by an external field, such as an electrical field, a magnetic field, a mechanical force field, etc. The controller 640 or 740 may control the external field to tune the in-plane pitch, thereby tuning the diffraction angle of the image light beam diffracted by the birefringent medium layer. As a result, the position of the one or more exit pupils may be adjusted dynamically to match with the changing position of the eye pupil.

The foregoing description of the embodiments of the disclosure have been presented for the purpose of illustration. It is not intended to be exhaustive or to limit the disclosure to the precise forms disclosed. Persons skilled in the relevant art can appreciate that modifications and variations are possible in light of the above disclosure.

Some portions of this description may describe the embodiments of the disclosure in terms of algorithms and symbolic representations of operations on information. These operations, while described functionally, computationally, or logically, may be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware and/or software modules, alone or in combination with other devices. In one embodiment, a software module is implemented with a computer program product including a computer-readable medium containing computer program code, which can be executed by a computer processor for performing any or all of the steps, operations, or processes described. In some embodiments, a hardware module may include hardware components such as a device, a system, an optical element, a controller, an electrical circuit, a logic gate, etc.

Embodiments of the disclosure may also relate to an apparatus for performing the operations herein. This apparatus may be specially constructed for the specific purposes, and/or it may include a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. The non-transitory computer-readable storage medium can be any medium that can store program codes, for example, a magnetic disk, an optical disk, a read-only memory ("ROM"), or a random access memory ("RAM"), an Electrically Programmable read only memory ("EPROM"), an Electrically Erasable Programmable read only memory ("EEPROM"), a register, a hard disk, a solid-state disk drive, a smart media card ("SMC"), a secure digital card ("SD"), a flash card, etc. Furthermore, any computing systems described in the specification may include a single processor or may be architectures employing multiple processors for increased computing capability.

The processor may be a central processing unit ("CPU"), a graphics processing unit ("GPU"), or any processing device configured to process data and/or performing computation based on data. The processor may include both software and hardware components. For example, the processor may include a hardware component, such as an application-specific integrated circuit ("ASIC"), a programmable logic device ("PLD"), or a combination thereof. The PLD may be a complex programmable logic device ("CPLD"), a field-programmable gate array ("FPGA"), etc.

Embodiments of the disclosure may also relate to a product that is produced by a computing process described herein. Such a product may include information resulting from a computing process, where the information is stored on a non-transitory, tangible computer readable storage medium and may include any embodiment of a computer program product or other data combination described herein.

Further, when an embodiment illustrated in a drawing shows a single element, it is understood that the embodiment or another embodiment not shown in the figures but within the scope of the present disclosure may include a plurality of such elements. Likewise, when an embodiment illustrated in a drawing shows a plurality of such elements, it is understood that the embodiment or another embodiment not shown in the figures but within the scope of the present disclosure may include only one such element. The number of elements illustrated in the drawing is for illustration purposes only, and should not be construed as limiting the scope of the embodiment. Moreover, unless otherwise noted, the embodiments shown in the drawings are not mutually exclusive, and they may be combined in any suitable manner. For example, elements shown in one figure/embodiment but not shown in another figure/embodiment may nevertheless be included in the other figure/embodiment. In any optical device disclosed herein including one or more optical layers, films, plates, or elements, the numbers of the layers, films, plates, or elements shown in the figures are for illustrative purposes only. In other embodiments not shown in the figures, which are still within the scope of the present disclosure, the same or different layers, films, plates, or elements shown in the same or different figures/embodiments may be combined or repeated in various manners to form a stack.

Various embodiments have been described to illustrate the exemplary implementations. Based on the disclosed embodiments, a person having ordinary skills in the art may make various other changes, modifications, rearrangements, and substitutions without departing from the scope of the present disclosure. Thus, while the present disclosure has been described in detail with reference to the above embodiments, the present disclosure is not limited to the above described embodiments. The present disclosure may be embodied in other equivalent forms without departing from the scope of the present disclosure. The scope of the present disclosure is defined in the appended claims.

What is claimed is:

1. A device, comprising:
a first substrate;
a second substrate; and
a polarization volume hologram ("PVH") disposed between the first substrate and the second substrate, directors of optically anisotropic molecules included in the PVH being configured to rotate periodically in a predetermined direction with an in-plane pitch, wherein the optically anisotropic molecules form a plurality of flexodomains arranged in a spatially periodic pattern with a uniform pitch that is equal to the in-plane pitch, and wherein the in-plane pitch is tunable by an external field to adjust a diffraction angle of a light beam diffracted by the PVH.

2. The device of claim 1, wherein:

the external field comprises at least one of an electric field, a light field, a magnetic field, or a mechanical force field.

3. The device of claim 1, wherein:

the optically anisotropic molecules are arranged to form a plurality of parallel Bragg planes and a plurality of parallel molecule director planes within a volume of the PVH, and an angle between at least one of the Bragg planes and at least one of the molecule director planes is an acute angle.

4. The device of claim 3, wherein:

the PVH comprises a plurality of helical structures, and is configured to substantially diffract a polarized input light beam having a handedness that is the same as a handedness of the helical structures, and substantially transmit a polarized input light beam having a handedness that is opposite to the handedness of the helical structures.

5. The device of claim 1, wherein:

the optically anisotropic molecules are arranged to form a plurality of parallel Bragg planes and a plurality of parallel molecule director planes within a volume of the PVH, and at least one of the Bragg planes is substantially parallel with at least one of the molecule director planes.

6. The device of claim 5, wherein:

the PVH comprises a plurality of helical structures, and is configured to substantially diffract a polarized input light beam having a handedness that is the same as a handedness of the helical structures, and substantially transmit a polarized input light beam having a handedness that is opposite to the handedness of the helical structures.

7. The device of claim 1, wherein:

the optically anisotropic molecules are arranged to form a plurality of parallel Bragg planes and a plurality of parallel molecule director planes within a volume of the PVH, and at least one of the Bragg planes is substantially perpendicular to at least one of the molecule director planes.

8. The device of claim 7, wherein:

in at least one of the molecule director planes, the directors of the optically anisotropic molecules rotate in a predetermined rotation direction that defines a handedness of rotation of the directors, and the PVH is configured to substantially diffract a polarized input light beam having a handedness that is the same as the handedness of the rotation of the directors in the at least one of the molecule director planes, and substantially transmit a polarized input light beam having a handedness that is opposite to the handedness of the rotation of the directors in the at least one of the molecule director planes.

9. The device of claim 1, wherein the PVH comprises at least one of nematic liquid crystals ("LCs"), twist-bend LCs, or chiral nematic LCs.

10. The device of claim 1, further comprising:

an alignment structure disposed at at least one of the first substrate and the second substrate, and configured to align the optically anisotropic molecules disposed in contact with the alignment structure to render the directors of the optically anisotropic molecules rotating periodically with the in-plane pitch.

11. The device of claim 10, wherein the alignment structure comprises at least one of a polyimide layer, a photo-alignment material layer, a plurality of nanostructures, a plurality of microstructures, or an alignment network.

12. The device of claim 11, wherein the photo-alignment material layer comprises a polarization sensitive and rewritable organic material.

13. The device of claim 10, wherein the alignment structure comprises a surface relief grating ("SRG") having an adjustable period and configured to align the optically anisotropic molecules disposed in contact with the SRG to render the directors of the optically anisotropic molecules rotating periodically with the in-plane pitch.

14. The device of claim 10, wherein the alignment structure comprises a surface relief grating ("SRG") with an adjustable period and an alignment material layer disposed at a surface of the SRG, and the SRG and the alignment material layer are configured to align the optically anisotropic molecules disposed in contact with the alignment material layer to render the directors of the optically anisotropic molecules rotating periodically with the in-plane pitch.

15. The device of claim 1, further comprising:

an alignment structure disposed at each of the first substrate and the second substrate and configured to align the optically anisotropic molecules disposed in contact with the alignment structure to render the directors of the optically anisotropic molecules rotating periodically with the in-plane pitch, wherein the alignment structures are configured to provide parallel surface alignments, anti-parallel surface alignments, or hybrid surface alignments to the optically anisotropic molecules disposed in contact with the alignment structures.

16. The device of claim 1, further comprising:

a first electrode and a second electrode disposed at at least one of the first substrate or the second substrate, wherein each of the first electrode and the second electrode is configured as a continuous planar electrode, a patterned electrode, or a protrusion electrode.

17. A device, comprising:

a polarization volume hologram ("PVH") comprising optically anisotropic molecules with directors rotating periodically in a predetermined direction with an in-plane pitch, wherein the optically anisotropic molecules form a plurality of flexodomains arranged in a spatially periodic pattern with a uniform pitch that is equal to the in-plane pitch, and wherein the in-plane pitch is tunable by an external field to adjust a diffraction angle of a light beam diffracted by the PVH.

18. The device of claim 17, wherein the PVH comprises a photosensitive polymer configured with at least one of a photo-induced optical anisotropy or a photo-induced local optic axis orientation.

19. The device of claim 17, wherein the PVH comprises a liquid crystal polymer.

20. The device of claim 17, further comprising:
a surface relief grating ("SRG") with an adjustable period coupled to the PVH.

\* \* \* \* \*